United States Patent
O'Brien

(10) Patent No.: US 12,069,050 B1
(45) Date of Patent: Aug. 20, 2024

(54) RECIPROCAL AUTHENTICATION OF DIGITAL TRANSMISSIONS AND METHOD

(71) Applicant: Strat ID GIC, Inc., Tampa, FL (US)

(72) Inventor: James W. O'Brien, Tampa, FL (US)

(73) Assignee: STRAT ID GIC, INC., Tampa, FL (US)

(*) Notice: Subject to any disclaimer, the term of this patent is extended or adjusted under 35 U.S.C. 154(b) by 442 days.

(21) Appl. No.: 17/564,584

(22) Filed: Dec. 29, 2021

Related U.S. Application Data

(60) Provisional application No. 63/131,452, filed on Dec. 29, 2020.

(51) Int. Cl.
  H04L 29/00 (2006.01)
  H04L 9/40 (2022.01)

(52) U.S. Cl.
  CPC ...... H04L 63/0876 (2013.01); H04L 63/0442 (2013.01); H04L 63/06 (2013.01); H04L 63/126 (2013.01); H04L 63/1466 (2013.01)

(58) Field of Classification Search
  CPC . H04L 63/0876; H04L 63/0442; H04L 63/06; H04L 63/126; H04L 63/1466
  See application file for complete search history.

(56) References Cited

U.S. PATENT DOCUMENTS

| | | | |
|---|---|---|---|
| 5,778,065 A | 7/1998 | Hauser et al. | |
| 8,468,244 B2 | 6/2013 | Redlich et al. | |
| 8,843,997 B1 | 9/2014 | Hare | |
| 8,923,186 B1 | 12/2014 | daCosta | |
| 9,503,526 B2 | 11/2016 | Daoud et al. | |
| 9,633,197 B2 | 4/2017 | Lakshmanan et al. | |
| 9,698,997 B2 | 7/2017 | Arteaga-King et al. | |
| 10,044,705 B2 | 8/2018 | Wang et al. | |
| 2006/0026042 A1 | 2/2006 | Awaraji | |
| 2007/0160022 A1 | 7/2007 | McCoy et al. | |
| 2009/0006467 A1 | 1/2009 | Visscher | |
| 2009/0222659 A1 | 9/2009 | Miyabayashi et al. | |
| 2010/0017596 A1 | 1/2010 | Schertzinger | |
| 2010/0299517 A1 | 11/2010 | Jukic et al. | |
| 2012/0215560 A1 | 8/2012 | Ofek et al. | |
| 2012/0309352 A1 | 12/2012 | Fang | |
| 2014/0287723 A1 | 9/2014 | LaFever et al. | |
| 2015/0074259 A1 | 3/2015 | Ansari et al. | |

(Continued)

FOREIGN PATENT DOCUMENTS

WO  WO2018/126077  7/2018

*Primary Examiner* — Jeffrey C Pwu
*Assistant Examiner* — Helai Salehi
(74) *Attorney, Agent, or Firm* — Frijouf, Rust & Pyle, P.A.

(57) ABSTRACT

A secure authentication between a network server and a network client. The secure authentication being achieved using server and client table objects only known to the server and client. The server and client table objects maintain equivalency. The server and client table objects have a table label for identifying working server and client table. The server and client table objects contain a label group, a data group, and a time group. The server and client contain a duplicate set of arithmetic formulas. The formulas use data from the table objects to send a solution to a receiving node. The receiving node arithmetically reverses the solution to verify sending node. The receiving node then responds using a different formula and different data from the table objects to verify itself to the original sending node. Once a server and client trust are established additional formula are then used to encrypt data.

24 Claims, 90 Drawing Sheets

(56) References Cited

U.S. PATENT DOCUMENTS

| | | |
|---|---|---|
| 2015/0245203 A1 | 8/2015 | Tyson et al. |
| 2016/0219024 A1 | 7/2016 | Verzun et al. |
| 2017/0006411 A1 | 1/2017 | Zakaria et al. |
| 2017/0177798 A1 | 6/2017 | Samuel et al. |

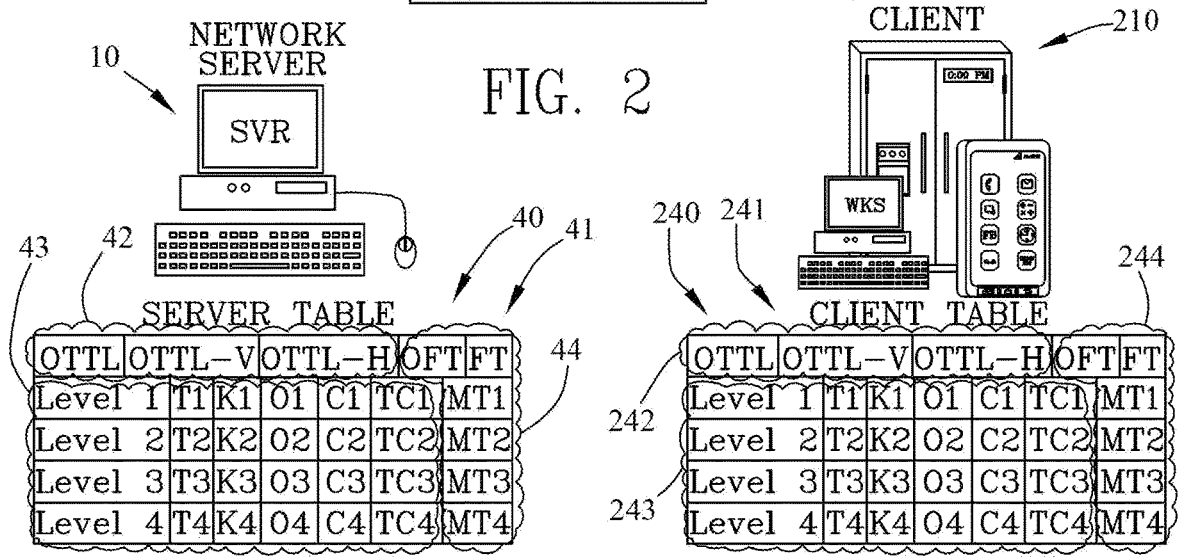
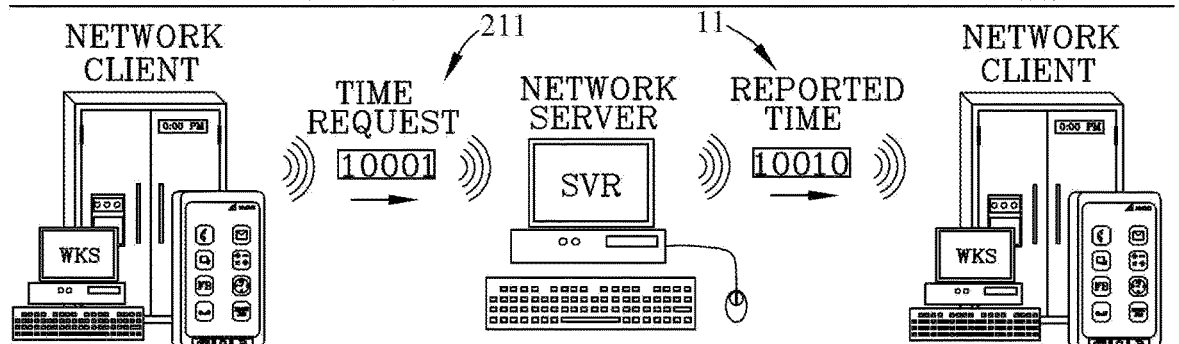
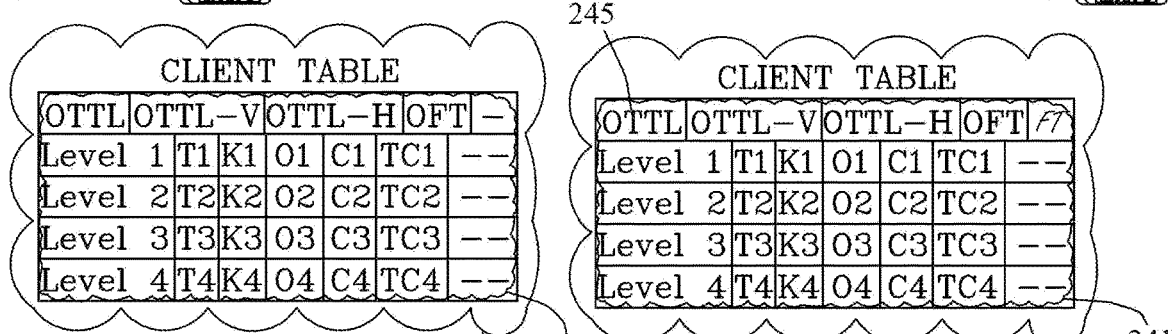
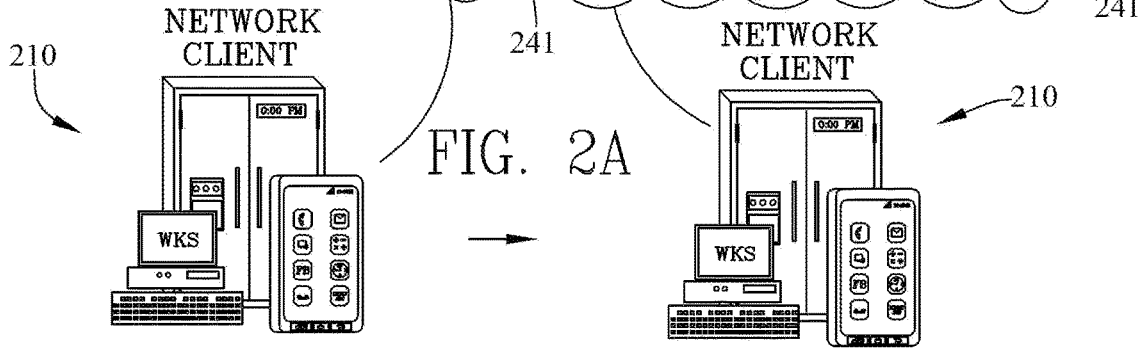

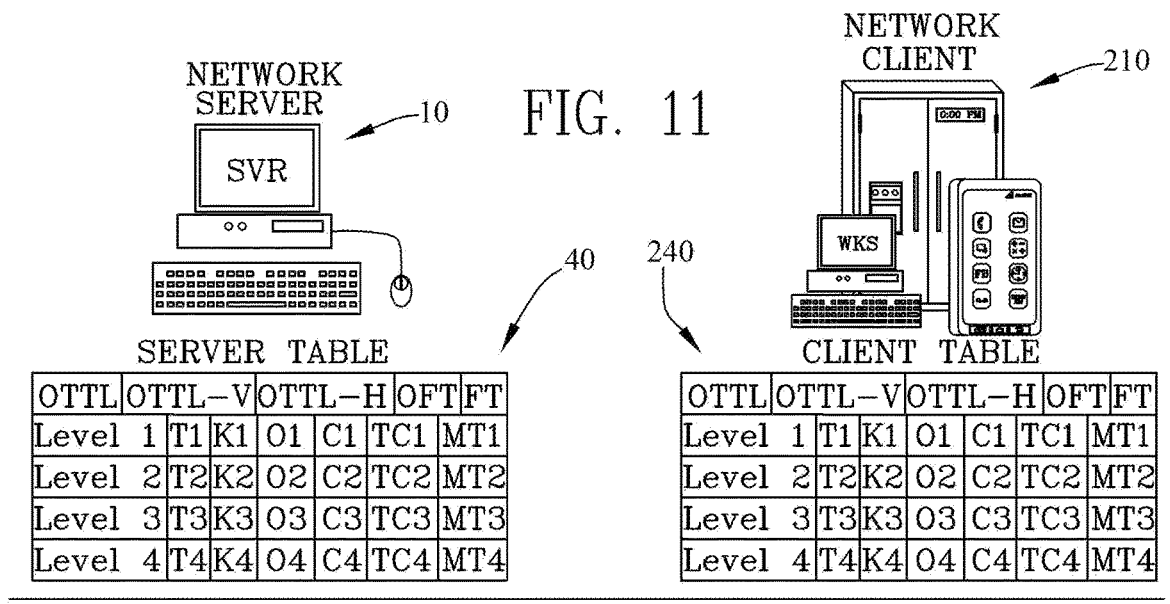
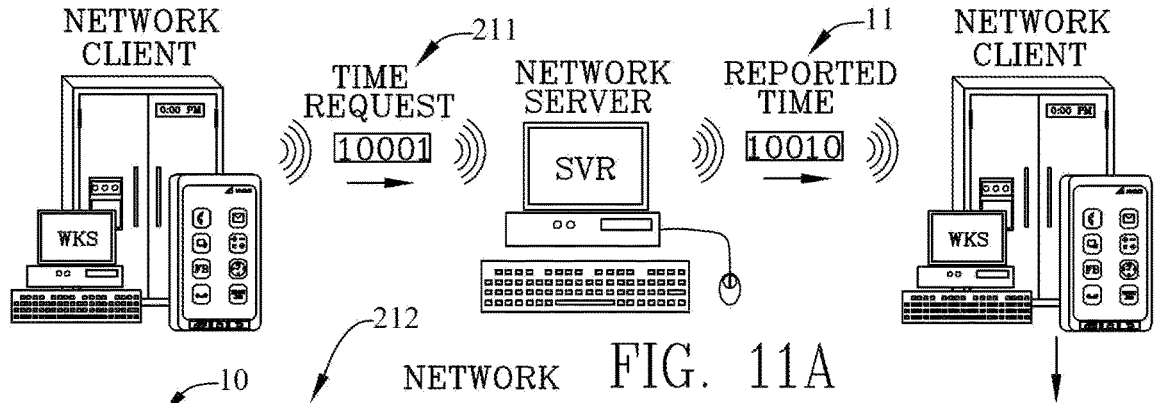
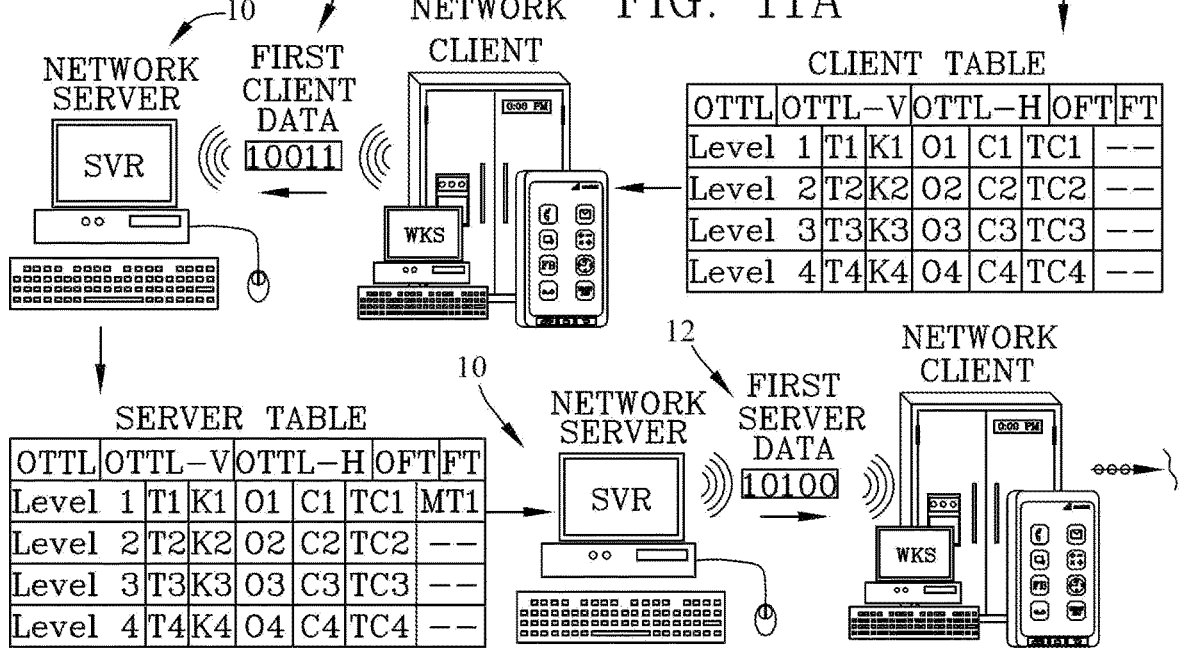

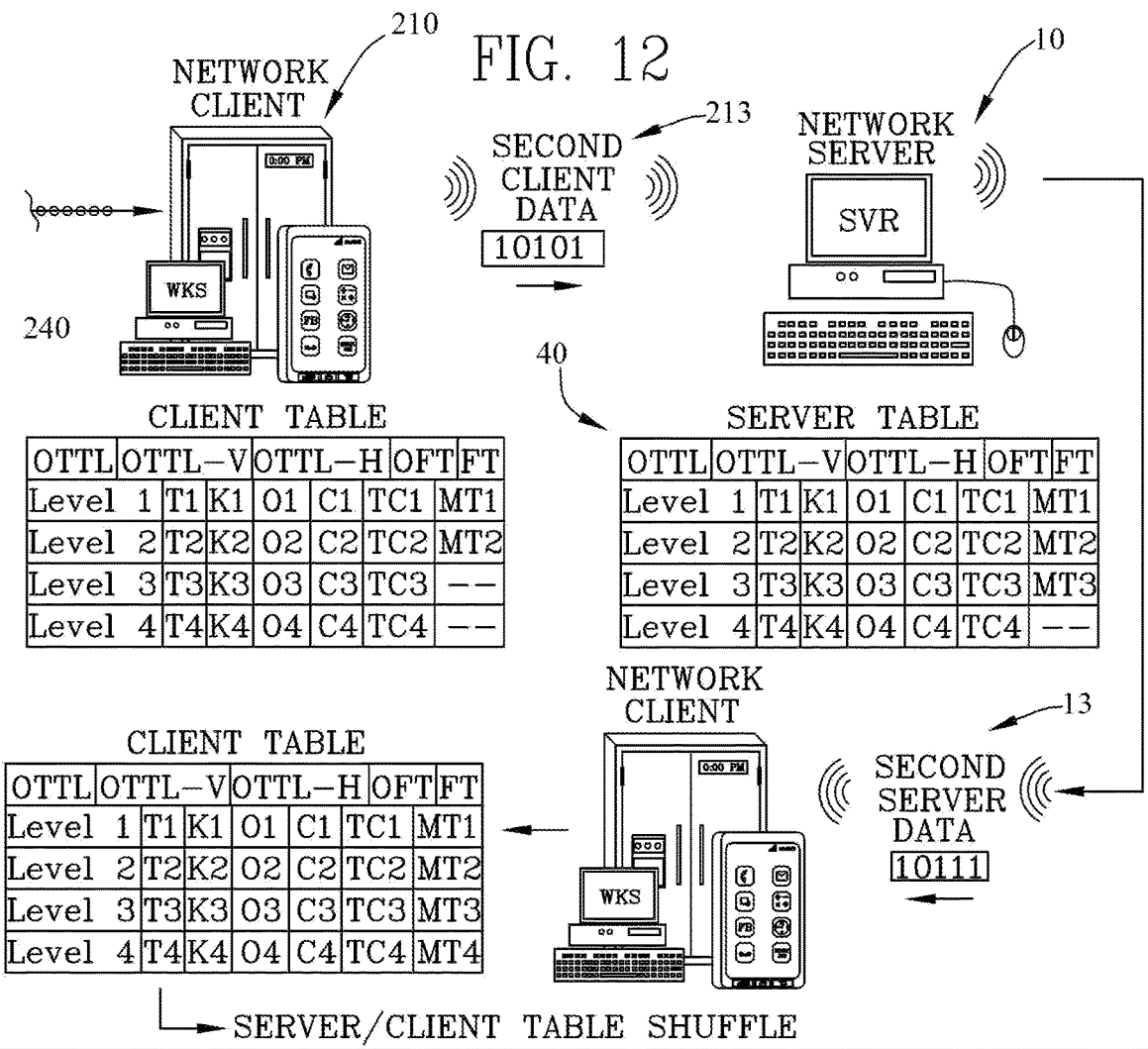
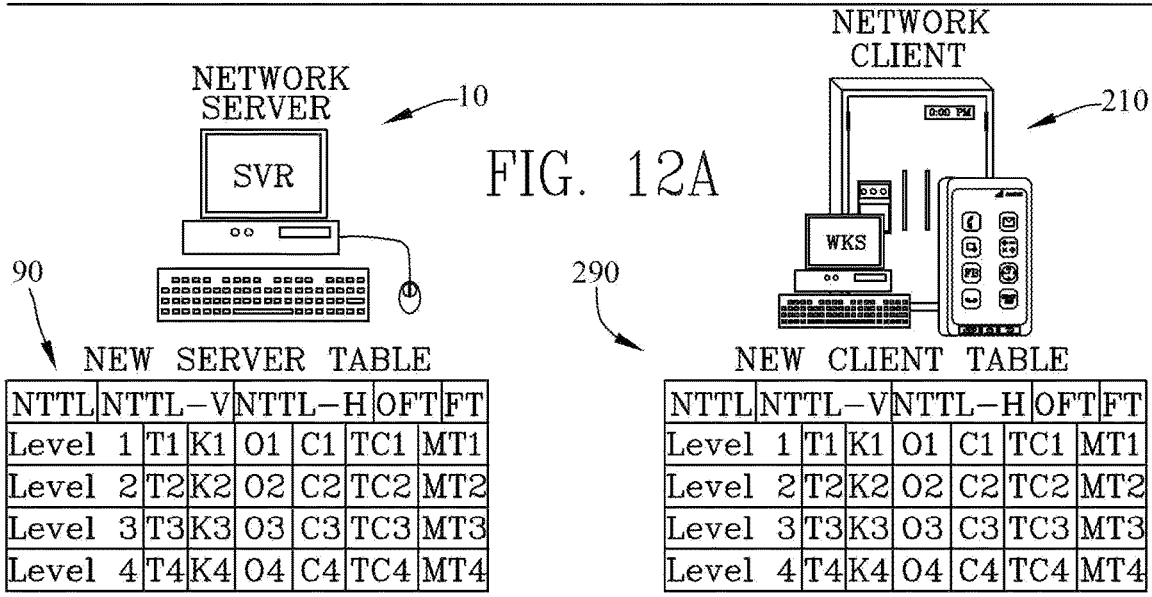
FIG. 12
FIG. 12A

IMAGE IDENTIFICATION

MANUFACTURE SIGNIN/ENROLLMENT —310

HIDDIN.NET | + |
← → http://www.hiddin.net/manufacturersignin

MANUFACTURER'S SIGN IN WEBSITE

EMAIL ADDRESS bestbuilt@my19mail.com
PASSWORD ***********
[LOGIN]

FORGOT PASSWORD [RESET]
CLICK HERE TO CREATE ACCOUNT [ENROLL]

—310

HIDDIN.NET | + |
← → http://www.hiddin.net/manufacturerinventoryfile

MANUFACTURER'S ADMIN SITE

CHANGE PASSWORD

VIEW ACCOUNT SETTINGS

UPLOAD INVENTORY FILE

INVENTORY FILE [_____] [UPLOAD] [SUBMIT]

SAVE
← → c:\downloads\

| | Name | Date | Type | Size |
|---|---|---|---|---|
| Desktop Pictures Music | inventoryfile.txt | 3/13/2019 | db file | 33k |

—320

File Name [inventoryfile.txt]   [Custom Files ▽]
                                [Save] [Cancel]

FIG. 19

MANUFACTURE SIGNIN/ENROLLMENT
FIG. 20
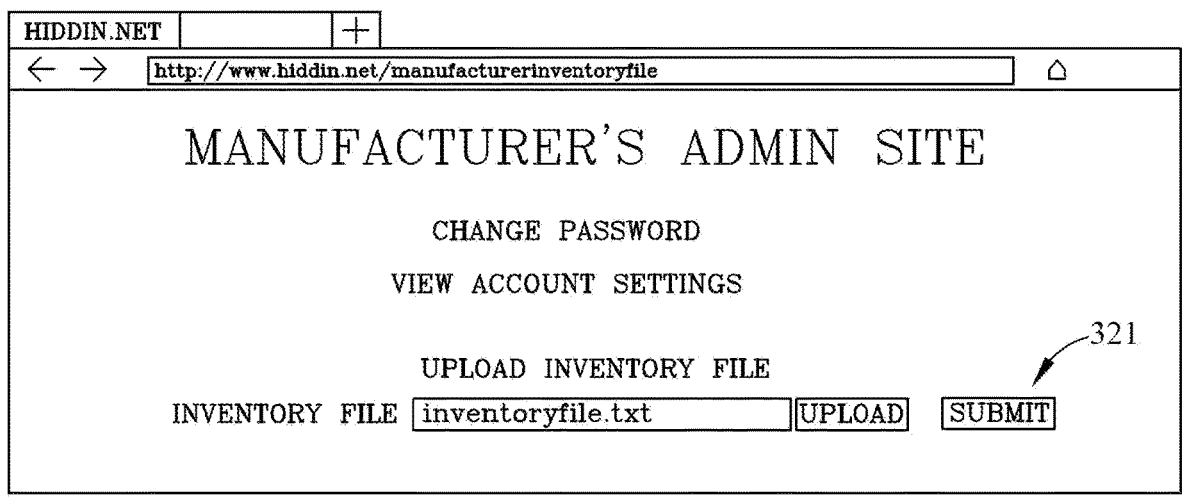
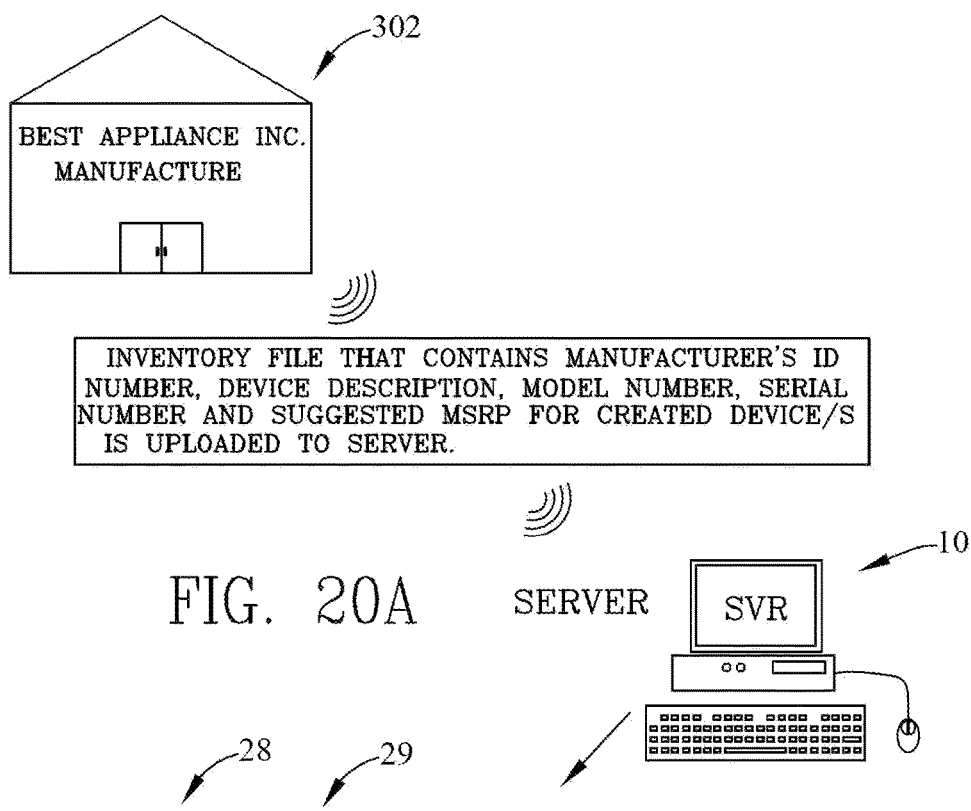
FIG. 20A

INDIVIDUAL ENROLLMENT PROCESS

─318

HIDDIN.NET | +
← → http://www.hiddin.net/enrollment

INDIVIDUAL ENROLLMENT WEBSITE

FIRST NAME [ ]
LAST NAME [ ]
EMAIL ADDRESS [ ]
CELL PHONE NUMBER [ ]
SECURITY QUESTION [Favoraite Food? ▽]
SECURITY ANSWER [ ]
NEW PASSWORD [ ]
CONFIRM PASSWORD [ ]

[SUBMIT]

─318

HIDDIN.NET | +
← → http://www.hiddin.net/enrollment

INDIVIDUAL ENROLLMENT WEBSITE

FIRST NAME [Jim]
LAST NAME [Brien]
EMAIL ADDRESS [Jim.brien@my19mail.com]
CELL PHONE NUMBER [813-555-2541]
SECURITY QUESTION [Favoraite Food? ▽]
SECURITY ANSWER [Pizza]
NEW PASSWORD [**********]
CONFIRM PASSWORD [**********]

[SUBMIT]

FIG. 26

INDIVIDUAL ENROLLMENT PROCESS

```
HIDDIN.NET  [+]
← →  http://www.hiddin.net/enrollment                    ⌂
```

INDIVIDUAL ENROLLMENT WEBSITE

| | | |
|---|---|---|
| ACCOUNT TYPE | ○ SAVINGS  ● CHECKING | |
| ACCOUNT NUMBER | 1234567891123456789 | MAKE THIS PRIMARY ☑ |
| BANK NAME | The Bank of Banks | AUTO PAY ☑ |
| ROUTING NUMBER | 001546832486365 | |
| FIRST NAME | JIM | |
| LAST NAME | BRIEN | |
| BILLING ADDRESS | 222 W. MILLER STREET | |
| CITY | ANYTOWN | |
| STATE | FLORIDA | |
| POSTAL/ZIP CODE | 33629 | |
| COUNTRY | USA | [SUBMIT] |
| CHECK IMAGE | | [UPLOAD] |

CHECK IMAGE UPLOAD

```
OPEN
← →  c:\pictures\                                        ⌂
```

| | Name | Date | Type | Size |
|---|---|---|---|---|
| Desktop<br>Pictures<br>Music | Check.jpg | 3/13/2019 | JPEG image | 33k |

File Name  [Check.jpg]    [Custom Files ▼]
                          [Open]  [Cancel]

FIG. 27

INDIVIDUAL ENROLLMENT PROCESS

HIDDIN.NET
http://www.hiddin.net/enrollment

INDIVIDUAL ENROLLMENT WEBSITE

| | | |
|---|---|---|
| ACCOUNT TYPE | ○ SAVINGS  ● CHECKING | |
| ACCOUNT NUMBER | 1234567891123456789 | MAKE THIS PRIMARY ☑ |
| BANK NAME | The Bank of Banks | AUTO PAY ☑ |
| ROUTING NUMBER | 001546832486365 | |
| FIRST NAME | JIM | |
| LAST NAME | BRIEN | |
| BILLING ADDRESS | 222 W. MILLER STREET | |
| CITY | ANYTOWN | |
| STATE | FLORIDA | |
| POSTAL/ZIP CODE | 33629 | |
| COUNTRY | USA | SUBMIT |
| CHECK IMAGE | c:\pictures\Check.jpg | UPLOAD |

—323

HIDDIN.NET
http://www.hiddin.net/enrollment

INDIVIDUAL ENROLLMENT WEBSITE

THANK YOU MR. BRIEN YOUR ACCOUNT HAS BEEN CREATED

YOU WILL RECEIVE AN ACTIVATION EMAIL SHORTLY.

If you did not receive your activation email please click Resend.

RESEND

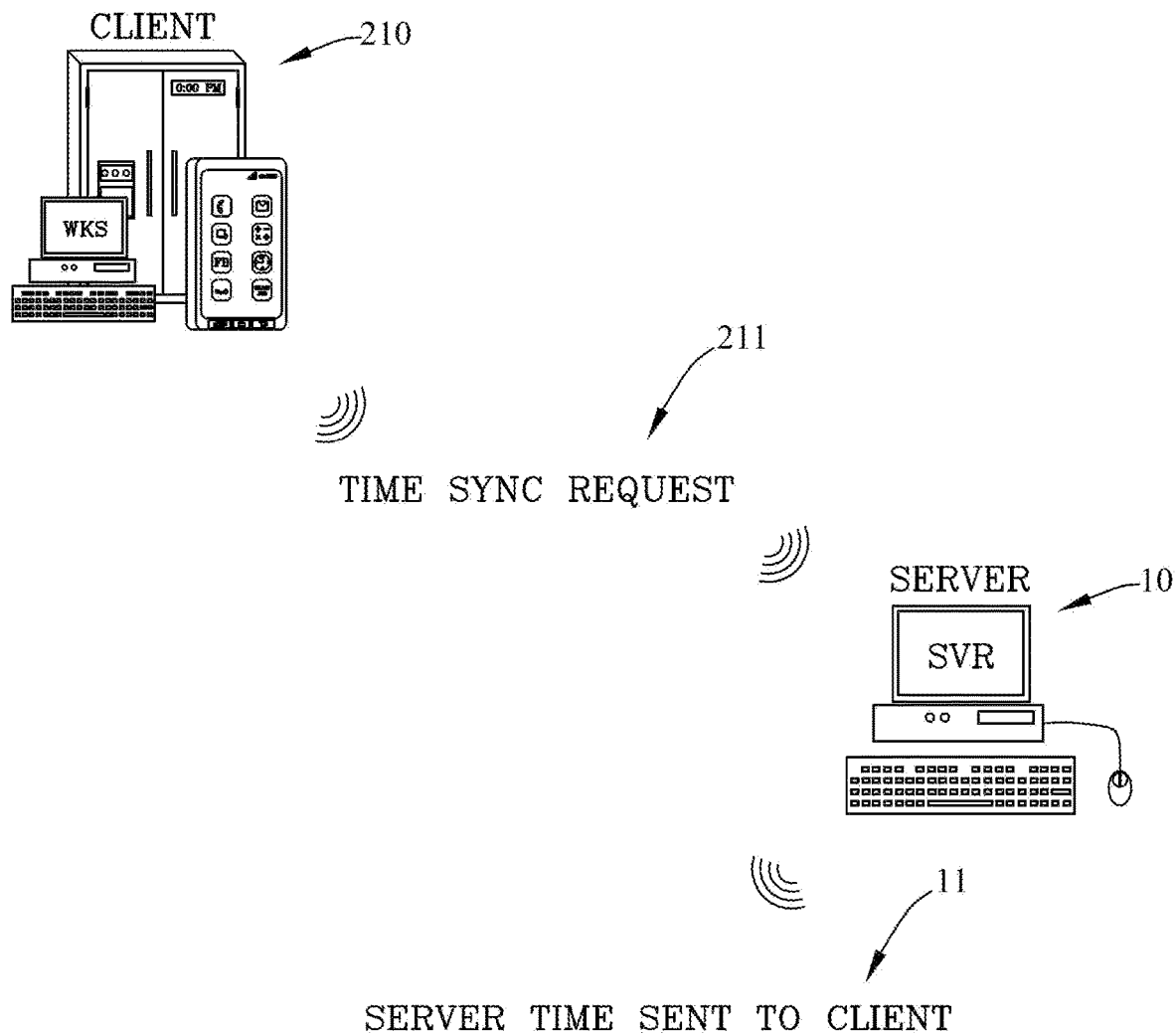
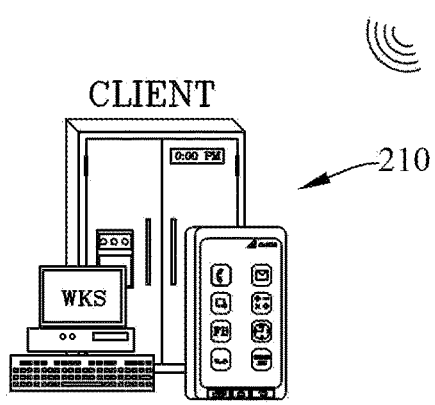
FIG. 34

THE SERVER PREPAIRS TO SEND SECOND PACKET

SERVER CREATES SECOND PACKET TO

SEND TO CLIENT USING FORMULA FROM OTT

| OTTL | OTTL-V | OTTL-H | OFT | FT |
|---|---|---|---|---|
| Level 1 | T1 | K1 | O1 | C1 | TC1 | MT1 |
| Level 2 | T2 | K2 | O2 | C2 | TC2 | MT2 |
| Level 3 | T3 | K3 | O3 | C3 | TC3 | MT3 |
| Level 4 | T4 | K4 | O4 | C4 | TC4 | MT4 |

| OT5215 | OTTL-V | | OTTL-H | | 830 | 432 |
|---|---|---|---|---|---|---|
| Level 1 | 100 | 101 | 102 | 103 | 104 | 433 |
| Level 2 | 200 | 201 | 202 | 203 | 204 | MT2 |
| Level 3 | 300 | 301 | 302 | 303 | 304 | MT3 |
| Level 4 | 400 | 401 | 402 | 403 | 404 | MT4 |

OT5215, OT2, CAL#3, CAL#4

OT5215, OT2, MT1+O2, (MT1+TC2)#C2

OT5215, 200, 433+202, (433+204)#203

OT5215, 200, 635, (129311)#

SERVER SENDS SECOND PACKET AND BEGINS WITHIN TIME RESPONSE

NETWORK SERVER/CLIENT TABLE CONVERSION

CALCULATION S1

T1, T2, T3 AND T4 CONVERSION

| OTTL | OTTL-V | OTTL-H | OFT | FT |
|---|---|---|---|---|
| Level 1 | T1 K1 | O1 C1 | TC1 | MT1 |
| Level 2 | T2 K2 | O2 C2 | TC2 | MT2 |
| Level 3 | T3 K3 | O3 C3 | TC3 | MT3 |
| Level 4 | T4 K4 | O4 C4 | TC4 | MT4 |

— 91
— 291

| OT5215 | OTTL-V | | OTTL-H | | 830 | 432 |
|---|---|---|---|---|---|---|
| Level 1 | (100) | (101) | 102 | (103) | 104 | 433 |
| Level 2 | (200) | (201) | 202 | (203) | 204 | MT2 |
| Level 3 | (300) | (301) | 302 | (303) | 304 | MT3 |
| Level 4 | (400) | (401) | 402 | (403) | 404 | MT4 |

$(T1+K1)\#C1=T1$   $(T2+K2)\#C2=T2$   $(T3+K3)\#C3=T3$   $(T4+K4)\#C4=T4$

— 340   — 341   — 342   — 343

$(100+101)\#103=ABC$ $(200+201)\#203=BCD$ $(300+301)\#303=CDE$ $(400+401)\#403=DEF$

| | | | | | 0 | 0 |
|---|---|---|---|---|---|---|
| 60 — | Level 1 | ABC | 0 | 0 | 0 | 0 |
| 260 — 61 — | Level 2 | BCD | 0 | 0 | 0 | 0 |
| 261 — 62 — | Level 3 | CDE | 0 | 0 | 0 | 0 |
| 262 — 63 — | Level 4 | DEF | 0 | 0 | 0 | 0 |
| 263 — | | | | | | |

NETWORK SERVER/CLIENT CALCULATION S2

K1, K2, K3 AND K4 CREATION

| OTTL | OTTL-V | OTTL-H | OFT | FT |
|---|---|---|---|---|
| Level 1 | T1 | K1 | O1 | C1 | TC1 | MT1 |
| Level 2 | T2 | K2 | O2 | C2 | TC2 | MT2 |
| Level 3 | T3 | K3 | O3 | C3 | TC3 | MT3 |
| Level 4 | T4 | K4 | O4 | C4 | TC4 | MT4 |

91
291

| OT5215 | OTTL-V | | OTTL-H | | 830 | 432 |
|---|---|---|---|---|---|---|
| Level 1 | 100 | 101 | 102 | 103 | 104 | 433 |
| Level 2 | 200 | 201 | 202 | 203 | 204 | MT2 |
| Level 3 | 300 | 301 | 302 | 303 | 304 | MT3 |
| Level 4 | 400 | 401 | 402 | 403 | 404 | MT4 |

| | | | | | 0 | 0 |
|---|---|---|---|---|---|---|
| 72 | Level 1 | ABC | 201 | 0 | 0 | 0 | 0 |
| 272 73 | Level 2 | BCD | 301 | 0 | 0 | 0 | 0 |
| 273 74 | Level 3 | CDE | 1 | 0 | 0 | 0 | 0 |
| 274 75 | Level 4 | DEF | 501 | 0 | 0 | 0 | 0 |
| 275 | | | | | | | |

NETWORK SERVER/CLIENT CALCULATION S3
O1, O2, O3 AND O4 CREATION

| OTTL | OTTL-V | OTTL-H | OFT | FT |
|---|---|---|---|---|
| Level 1 | T1 K1 | O1 C1 | TC1 | MT1 |
| Level 2 | T2 K2 | O2 C2 | TC2 | MT2 |
| Level 3 | T3 K3 | O3 C3 | TC3 | MT3 |
| Level 4 | T4 K4 | O4 C4 | TC4 | MT4 |

| OT5215 | OTTL-V | | OTTL-H | | 830 | 432 |
|---|---|---|---|---|---|---|
| Level 1 | 100 | 101 | (102) | 103 | 104 | 433 |
| Level 2 | 200 | 201 | (202) | 203 | 204 | MT2 |
| Level 3 | 300 | 301 | (302) | 303 | 304 | MT3 |
| Level 4 | 400 | 401 | (402) | 403 | 404 | MT4 |

O1−O2+O3=O1   O2−O3+O4=O2   O3−O4+O1=O4   O4−O1+O2=O4

102−202+302=202     —350
202−302+402=302     —351
302−402+102=2       —352
402−102+202=502     —353

| | | | | | 0 | 0 |
|---|---|---|---|---|---|---|
| Level 1 | ABC | 201 | (202) | 0 | 0 | 0 |
| Level 2 | BCD | 301 | (302) | 0 | 0 | 0 |
| Level 3 | CDE | 1 | (2) | 0 | 0 | 0 |
| Level 4 | DEF | 501 | (502) | 0 | 0 | 0 |

NETWORK SERVER/CLIENT CALCULATION S6

NEW TTL-V CREATION

| OTTL | OTTL-V | OTTL-H | OFT | FT | |
|---|---|---|---|---|---|
| Level 1 | T1 | K1 | O1 | C1 | TC1 | MT1 |
| Level 2 | T2 | K2 | O2 | C2 | TC2 | MT2 |
| Level 3 | T3 | K3 | O3 | C3 | TC3 | MT3 |
| Level 4 | T4 | K4 | O4 | C4 | TC4 | MT4 |

| OT5215 | OTTL-V | | OTTL-H | | 830 | 432 |
|---|---|---|---|---|---|---|
| Level 1 | 100 | 101 | 102 | 103 | 104 | 433 |
| Level 2 | 200 | 201 | 202 | 203 | 204 | MT2 |
| Level 3 | 300 | 301 | 302 | 303 | 304 | MT3 |
| Level 4 | 400 | 401 | 402 | 403 | 404 | MT4 |

"OTTL-V"+K1−K2="NTTL-V"   ←366

"OTTL-V"+101−201="NTTL-V"

FIG. 52

| | NTTL-V | | | | 0 | 0 |
|---|---|---|---|---|---|---|
| Level 1 | ABC | 201 | 202 | 203 | 204 | 0 |
| Level 2 | BCD | 301 | 302 | 303 | 304 | 0 |
| Level 3 | CDE | 1 | 2 | 3 | 4 | 0 |
| Level 4 | DEF | 501 | 502 | 503 | 504 | 0 |

NETWORK SERVER/CLIENT CALCULATION S8

NEW TTL-H CREATION

| | OTTL | OTTL-V | OTTL-H | OFT | FT |
|---|---|---|---|---|---|
| Level 1 | T1 | K1 | O1 | C1 | TC1 | MT1 |
| Level 2 | T2 | K2 | O2 | C2 | TC2 | MT2 |
| Level 3 | T3 | K3 | O3 | C3 | TC3 | MT3 |
| Level 4 | T4 | K4 | O4 | C4 | TC4 | MT4 |

| OT5215 | OTTL-V | | OTTL-H | | 830 | 432 |
|---|---|---|---|---|---|---|
| Level 1 | 100 | 101 | 102 | (103) | 104 | 433 |
| Level 2 | 200 | 201 | 202 | (203) | 204 | MT2 |
| Level 3 | 300 | 301 | 302 | 303 | 304 | MT3 |
| Level 4 | 400 | 401 | 402 | 403 | 404 | MT4 |

"OTTL-H"+C1−C2="NTTL-H"

| NT5215 | NTTL-V | | NTTL-H | | 0 | 0 |
|---|---|---|---|---|---|---|
| Level 1 | ABC | 201 | 202 | 203 | 204 | 0 |
| Level 2 | BCD | 301 | 302 | 303 | 304 | 0 |
| Level 3 | CDE | 1 | 2 | 3 | 4 | 0 |
| Level 4 | DEF | 501 | 502 | 503 | 504 | 0 |

FIG. 54

NETWORK SERVER/CLIENT HASHES NEWLY CREATED NTTL5215

| OTTL | OTTL-V | OTTL-H | OFT | FT |
|---|---|---|---|---|
| Level 1 | T1 K1 | O1 C1 | TC1 | MT1 |
| Level 2 | T2 K2 | O2 C2 | TC2 | MT2 |
| Level 3 | T3 K3 | O3 C3 | TC3 | MT3 |
| Level 4 | T4 K4 | O4 C4 | TC4 | MT4 |

| NT5215 | NTTL-V | NTTL-H | 0 | 0 | |
|---|---|---|---|---|---|
| Level 1 | ABC | 201 | 202 | 203 | 204 | 0 |
| Level 2 | BCD | 301 | 302 | 303 | 304 | 0 |
| Level 3 | CDE | 1 | 101 | 3 | 4 | 0 |
| Level 4 | DEF | 501 | 502 | 503 | 504 | 0 |

NT5215NTTL-VNTTL-HABC201202203204BCD
301302303304CDE001101003004DEF501502503504

↓

SHA 512 HASH GENERATOR —115

↓

825A2A16C2971EB95360CAE53EE8F60AC85C2DF11F0
172B9C79DF8EA8A6D1D9BC2DE3080C925FE5A89F810
6FE941FDADA01DFEFDF4F688D587D61A77F37D7C8A

FIG. 55

NETWORK SERVER'S LOCAL COPY OF OT5215 TO PROCESS

| OT5215 | OTTL-V | | OTTL-H | | 830 | 432 |
|---|---|---|---|---|---|---|
| Level 1 | 100 | 101 | 102 | 103 | 104 | 433 |
| Level 2 | 200 | 201 | 202 | 203 | 204 | MT2 |
| Level 3 | 300 | 301 | 302 | 303 | 304 | 435 |
| Level 4 | 400 | 401 | 402 | 403 | 404 | MT4 |

PACKET RECEIVED FROM DEVICE TO PROCESS

SERVER USES LOCAL COPY OF O3 TO FIND DEVICE's MT2.  MT2+O3=737
MT2+303=737 ⟶ MT2=434

SERVER UPDATES LOCAL COPY OF OT5215 WITH CALCULATED MT2

| OT5215 | OTTL-V | | OTTL-H | | 830 | 432 |
|---|---|---|---|---|---|---|
| Level 1 | 100 | 101 | 102 | 103 | 104 | 433 |
| Level 2 | 200 | 201 | 202 | 203 | 204 | 434 |
| Level 3 | 300 | 301 | 302 | 303 | 304 | 435 |
| Level 4 | 400 | 401 | 402 | 403 | 404 | MT4 |

7:44 PM  4/8/2019

HIDDIN COMMUNICATION CONTACT LOG

| Order# | Initiator D# | Recipient D# | Time | Type | Status |
|---|---|---|---|---|---|
| 0000001 | XXXXXXXX | XXXXXXXX | XXXX | XXXX | XXXXXX |
| 0000002 | XXXXXXXX | XXXXXXXX | XXXX | XXXX | XXXXXX |
| 0000003 | XXXXXXXX | XXXXXXXX | XXXX | XXXX | XXXXXX |
| 0000004 | XXXXXXXX | XXXXXXXX | XXXX | XXXX | XXXXXX |
| 0000005 | XXXXXXXX | XXXXXXXX | XXXX | XXXX | XXXXXX |
| 0000006 | 174859632 | 598764332 | 06:32:22 | Text | Sent |
| 0000007 | 365247495 | 689524777 | 06:51:44 | H-Mail | Sent |
| 0000008 | 957638422 | 356498665 | 07:43:35 | H-Mail | Sent |
| 0000009 | ------- | ------- | --- | --- | ----- |
| 0000010 | ------- | ------- | --- | --- | ----- |
| 0000011 | ------- | ------- | --- | --- | ----- |
| 0000012 | ------- | ------- | --- | --- | ----- |
| 0000013 | ------- | ------- | --- | --- | ----- |
| 0000014 | ------- | ------- | --- | --- | ----- |
| 0000015 | ------- | ------- | --- | --- | ----- |
| 0000016 | ------- | ------- | --- | --- | ----- |

HIDDIN COMMUNICATION CONTACT LOG

| Order# | Initiator D# | Recipient D# | Time | Type | Status |
|---|---|---|---|---|---|
| 0000001 | XXXXXXXX | XXXXXXXX | XXXX | XXXX | XXXXXX |
| 0000002 | XXXXXXXX | XXXXXXXX | XXXX | XXXX | XXXXXX |
| 0000003 | XXXXXXXX | XXXXXXXX | XXXX | XXXX | XXXXXX |
| 0000004 | XXXXXXXX | XXXXXXXX | XXXX | XXXX | XXXXXX |
| 0000005 | XXXXXXXX | XXXXXXXX | XXXX | XXXX | XXXXXX |
| 0000006 | 174859632 | 598764332 | 06:32:22 | Text | Sent |
| 0000007 | 365247495 | 689524777 | 06:51:44 | H-Mail | Sent |
| 0000008 | 957638422 | 356498665 | 07:43:35 | Phone | ----- |
| 0000009 | -------- | -------- | --- | --- | ----- |
| 0000010 | -------- | -------- | --- | --- | ----- |
| 0000011 | -------- | -------- | --- | --- | ----- |
| 0000012 | -------- | -------- | --- | --- | ----- |
| 0000013 | -------- | -------- | --- | --- | ----- |
| 0000014 | -------- | -------- | --- | --- | ----- |
| 0000015 | -------- | -------- | --- | --- | ----- |
| 0000016 | -------- | -------- | --- | --- | ----- |

YES ← RECIPIENT SIGNED-IN? → NO

77-J        79

7:44 PM           4/8/2019

HIDDIN COMMUNICATION CONTACT LOG

| Order# | Initiator D# | Recipient D# | Time | Type | Status |
|---|---|---|---|---|---|
| 0000001 | XXXXXXXX | XXXXXXXX | XXXX | XXXX | XXXXXX |
| 0000002 | XXXXXXXX | XXXXXXXX | XXXX | XXXX | XXXXXX |
| 0000003 | XXXXXXXX | XXXXXXXX | XXXX | XXXX | XXXXXX |
| 0000004 | XXXXXXXX | XXXXXXXX | XXXX | XXXX | XXXXXX |
| 0000005 | XXXXXXXX | XXXXXXXX | XXXX | XXXX | XXXXXX |
| 0000006 | 174859632 | 598764332 | 06:32:22 | Text | Sent |
| 0000007 | 365247495 | 689524777 | 06:51:44 | H-Mail | Sent |
| 0000008 | 957638422 | 356498665 | 07:43:35 | Phone | Hooked |
| 0000009 | ------- | ------- | --- | --- | ----- |
| 0000010 | ------- | ------- | --- | --- | ----- |
| 0000011 | ------- | ------- | --- | --- | ----- |
| 0000012 | ------- | ------- | --- | --- | ----- |
| 0000013 | ------- | ------- | --- | --- | ----- |
| 0000014 | ------- | ------- | --- | --- | ----- |
| 0000015 | ------- | ------- | --- | --- | ----- |
| 0000016 | ------- | ------- | --- | --- | ----- |

HIDDIN COMMUNICATION CONTACT LOG

| Order# | Initiator D# | Recipient D# | Time | Type | Status |
|---|---|---|---|---|---|
| 0000001 | XXXXXXXXX | XXXXXXXXX | XXXX | XXXX | XXXXXX |
| 0000002 | XXXXXXXXX | XXXXXXXXX | XXXX | XXXX | XXXXXX |
| 0000003 | XXXXXXXXX | XXXXXXXXX | XXXX | XXXX | XXXXXX |
| 0000004 | XXXXXXXXX | XXXXXXXXX | XXXX | XXXX | XXXXXX |
| 0000005 | XXXXXXXXX | XXXXXXXXX | XXXX | XXXX | XXXXXX |
| 0000006 | 174859632 | 598764332 | 06:32:22 | Text | Sent |
| 0000007 | 365247495 | 689524777 | 06:51:44 | H-Mail | Sent |
| 0000008 | 957638422 | 356498665 | 07:43:35 | Phone | Voicemail |
| 0000009 | ------- | ------- | --- | --- | ----- |
| 0000010 | ------- | ------- | --- | --- | ----- |
| 0000011 | ------- | ------- | --- | --- | ----- |
| 0000012 | ------- | ------- | --- | --- | ----- |
| 0000013 | ------- | ------- | --- | --- | ----- |
| 0000014 | ------- | ------- | --- | --- | ----- |
| 0000015 | ------- | ------- | --- | --- | ----- |
| 0000016 | ------- | ------- | --- | --- | ----- |

NETWORK SERVER PERFORMS TABLE SHUFFLE
NETWORK SERVER PREPARES SECOND SERVER DATA PACKET TO SEND TO CLIENT WITH ANY UPDATED LABELS AND DATA
85
| NETWORK SERVER'S LOCAL COPY OF OT5215 |||||||
|---|---|---|---|---|---|---|
| OT5215 | OTTL-V || OTTL-H || 830 | 432 |
| Level 1 | 100 | 101 | 102 | 103 | 104 | 433 |
| Level 2 | 200 | 201 | 202 | 203 | 204 | 434 |
| Level 3 | 300 | 301 | 302 | 303 | 304 | 435 |
| Level 4 | 400 | 401 | 402 | 403 | 404 | MT4 |
NETWORK SERVER CREATES SECOND SERVER DATA PACKET TO SEND USING VALUE — 26
— 27
45 — OTTL, T4, CAL#7, CAL#8
OTTL, T4, MT3+O4, (MT3+TC4)#C4
OT5215,400,435+402,(435+404)#403
OT5215,400,837,(338117)#
45  63  126  127
FIG. 80

HASHED VALUES

| |
|---|
| PG8 (140698)H = 40432BB623CA286E8E93ACE162DEB95F04448F68E60830677EB3893FABEA7D7AAD0B80FB8DD672823767D6F85670EB20D7ECB4B3C54949B0B99546C29A4E7274 |
| PG13 (129311)H = 1F1E81FC50DE95C9878180D55AE448407613A3FDC59D76F3A8DC1F1CB28DABDE0D365900838CEBDE99A4BA274A8B4D6EEB1CD56097D1B1A26FA49EC2B16CD23B |
| PG27 (223,614)H = 04306F914D379C64E394EEBAD354AD43F4E8779139F780587DCA1A320F1226CA526F371D2C1BF69D30C10B3978E6428FBC6805BFD0C71DDAC876B5013606A0CB |
| PG33 (338117)H = 26CBDA8A870C75C3A4ED0C6D24E51F9B741BBF90F1271260A8129202B0E45F1109AF1A33D2580DB22A84321AE47E760C938607243DBA1BE6D0D653121522D699 |
| PG51 (140720.66)H = 7268C5917BDB94D7576E827D1D8101857467F59347F8791C01052BD22C89CBFD4B063532BF28203CB116B01E2F2E5AF0C6A06D3574B42FD8516DBC422C3F29F8 |
| PG53 (140725.81)H = 6D050562F078A56ABBE3182E5110CF518ECB825A769626B12070026C04901559FB9FA68C25833A941D6B7CE32BFAEEF1807D7DDD63816A5B8CA52C803B402B58 |
| PG58 (140698)H = 40432BB623CA286E8E93ACE162DEB95F04448F68E60830677EB3893FABEA7D7AAD0B80FB8DD67282376 7D6F85670EB20D7ECB4B3C54949B0B99546C29A4E7274 |
| PG64 (129311)H = 1F1E81FC50DE95C9878180D55AE448407613A3FDC59D76F3A8DC1F1CB28DABDE0D365900838CEBDE99A4BA274A8B4D6EEB1CD56097D1B1A26FA49EC2B16CD23B |
| PG68 (223614)H = 04306F914D379C64E394EEBAD354AD43F4E8779139F780587DCA1A320F1226CA526F371D2C1BF69D30C10B3978E6428FBC6805BFD0C71DDAC876B5013606A0CB |
| PG75 (337714)H = CAC3A89CCCA0D63F06D9C722FF88A66AF4214B4CDD44C10919A66773EA9C44D030F2095ACE355094B089062EDD3CC78B9BD4A092DBC6F72CB9BBFC0790A67634 |

FIG. 90

RECIPROCAL AUTHENTICATION OF DIGITAL TRANSMISSIONS AND METHOD

CROSS-REFERENCE TO RELATED APPLICATIONS

This application claims benefit of U.S. Patent Provisional Application No. 63/131,452 filed Dec. 29, 2020. All subject matter set forth in Provisional Application No. 63/131,452 is hereby incorporated by reference into the present application as if fully set forth herein.

BACKGROUND OF THE INVENTION

Field of the Invention

This invention relates to the reciprocal authentication of the identities of the parties involved in identified and de-identified digital transmissions and more particularly to reciprocal authentication transmissions and method between network peers.

Background of the Invention

Authenticating that the parties initiating or receiving communications or transactions are who they say they are to be able to trust one another is a persistent problem for everyone trying to send and receive digital transmissions securely today. Authenticating the parties in de-identified transmissions where no one is saying who they are in the data transmitted is even more difficult. The integrity of the data sent is another persistent concern for the parties attempting to securely maintain that trust once established between the sending and receiving parties in the data they send and store.

Security today typically relies on a combination of asymmetric encryption and symmetric encryption to establish and maintain the trust necessary for our digital transmissions. A digital certificate authority provides an asymmetric private key public key matching set for an intended recipient to publish the public key so anyone can use the public key to encrypt and send identified digital transmissions to the publisher so they can use their secret private key to decrypt those identified transmissions. The asymmetric public private key system provides the sender with the trust they need that only the intended recipient can decrypt what they sent. Certificate authorities also issue digital certificates that are sent in transmissions and used by recipients to prove the identity of the sender with the third-party certificate authority to establish the trust the recipient needs that the sender is who they say they are. Hashing techniques are used to prove that the information being sent is trust worthy and has not been molested. Mutual trust is reciprocated through the combination of these three separate actions in the data sent and stored with these processes in the transmissions between identified parties. De-identified transmissions are more difficult.

The math behind asymmetric encryption is based on the factoring of large prime numbers making it less secure requiring keys that are 4096 characters compare to symmetric keys that are currently 128 characters. Symmetric encryption uses the same key for the sender to encrypt and the recipient to decrypt which is ok when it is only a few parties. When you want to securely communicate with 1000 different people you need a 1000 different symmetric keys and if they want to communicate with those same people each of them would need another 999 keys creating a key management problem for everyone and if your key gets out any communications with that key are no longer secure and you would need yet another key to replace the one compromised. The answer today has been to use the less efficient asymmetric key to share the more efficient symmetric key between the sender and recipient for them to encrypt and decrypt the transmissions with that key in just this one transmission. Hashing is used within the transmission to prove that the data as sent has not been changed by any unauthorized party.

All forms of encryption in use today and currently under development by the National Institute for Standards and Technology use advanced math to hide everything until decryption technologies catch up and simplify that math to reveal everything once hid. Encryption only provides temporary protection which is a current and consistent failure of the state of the art to address our needs for permanent protection solutions.

The quantum computers that are coming will destroy the asymmetric encryption we currently depend on. This decryption event will require that we use symmetric encryption keys and hashes that are much larger to remain secure. It will force us to choose from the quantum resistant encryption methods the NIST is developing and they still fail to provide any permanent protection solutions. There have been many in the prior art who have attempted to solve these problems with varying degrees of success. None, however completely satisfies the requirements for a complete solution to the aforestated problem. The following U. S. Patents are attempts of the prior art to solve this problem.

U.S. Pat. No. 5,778,065 to Hauser et al. discloses a robust and secure password (or key) change method between a user and an authentication server in a distributed communication network is disclosed The protocol requires the exchange of only two messages between the user desiring the key change and the server, the user's request including, at least partly encrypted, an identification of the sending user. old and new keys and two nonces, at least one including a time indication. The authentication server's response includes a possibly encrypted accept/reject indication and the regularly encrypted request from the user.

United States Patent 2006/0026042 A1 to Awaraji et al. discloses an information management system for restricting access to personal data in compliance with law or regulation includes a database having restricted records stored therein, at least one of the records including an identification of a client or group of clients about whom said record concerns. A computer system under the control of a trusted information broker is configured to receive via a communication medium a request initiated by a requester for access to at least one of the restricted records in the database, the request including an identification of the requester. The computer system is further configured to transmit a request for consent to the client and receive an indication from the client that the client consents or does not consent to access to the restricted record by the requestor. The computer system grants or denies access to the restricted records based upon the indication from the client.

United States Patent 2009/0006467 A1 to Visscher discloses a uniform subject and object oriented data structure adopted in computing device to efficiently store, distribute and process data in a variety of applications. Said data structure comprised of multiple complementary subparts that together and independently facilitate communication (of inputs and outputs) through one or more defined interfaces to facilitate secure access and coordination between given individual subject(s) and other real (physical or metaphysical) entities. Methods are also disclosed that work in tandem with the data structure and interface components to enable and require a single or given human user or other individual personal subject (belonging to a secure AFFIRM network) to maintain exclusive (private) self-control over at least one virtual domain that represents themselves (their actions and their relationships).

United States Patent 2010/0017596 A1 to Schertzinger discloses a system and method for managing authentication cookie encryption keys. The system comprises a computing device including a memory with authentication data having a key identifier and encrypted data with a session identifier. The key identifier references a key having a validity period, the key capable of decrypting the authentication data. A processor of the computing device can respond to user requests for information by retrieving the authentication data and transmitting it to a server. The server can then authenticate the user by verifying the encrypted session identifier using the referenced key. There is also provided a method by which a key server can manage encryption keys. The key server receives an encryption key having a validity period, receives a validity request, confirms or rejects the validity of the encryption key, and automatically invalidates the encryption key upon expiration of the validity period.

United States Patent 2012/0215560 A1 to Ofek et al. discloses A method for using a health information exchange system which stores patient record data regarding a multiplicity of patients, to serve a first plurality of EMRs each interacting with an EMR community including a set of at least one EMR, the method comprising: for each individual EMR within the first plurality of EMRs, performing a computerized context interception process using a processor to intercept context from the individual EMR and to identify therewithin an event whereby a health provider using the individual EMR calls up an individual patient's record from said individual EMR; and responsive to identification of the event, using a computerized output device for providing patient record data, pertaining to the individual patient, to the health provider.

U.S. Pat. No. 8,468,244 to Redlich et al. discloses a distributed computer system processes data having select content (SC) represented by one or more predetermined words, characters, etc. The system has a plurality of SC data stores in a server cloud for respective security designated (Sec-D) data and granular data, each with respective access controls thereat. The data stores are operatively coupled over a network. An identification module identifies SC data and granular data stores for in the server cloud. A processor activates data stores in the server cloud thereby permitting access to the SC data and granular data stores based upon an application of access controls thereat. The processor has a reconstruction module operating as a data process employing the respective access controls to combine one or more of the Sec-D data and granular data.

U.S. Pat. No. 8,843,997 to Hare discloses a Resilient Trust Network (RTN) is a set of servers that provide: an application integration platform for developing and publishing services and user interface for services, building derived services, subscribing to services, and embedding services into host applications, and building composite applications composed from multiple diverse services. The RST can also provide a platform for defining security requirements and accessing shared trust services that implement those requirements for services regardless of where or how those services are used.

United States Patent 2014/0287723 to LaFever et al. discloses Various systems, computer-readable media, and computer implemented methods of providing improved data privacy and security by enabling subjects to which data pertains to remain "dynamically anonymous." i.e., anonymous for as long as is desired-and to the extent that is desired-are disclosed herein. Embodiments may include systems that create, access, use (e.g., by collecting, processing, copying, analyzing, combining, modifying or disseminating, etc.), store and/or erase data with increased privacy and security, thereby facilitating the availability of more qualified and accurate information. When data is authorized by subjects to be shared with third parties, embodiments may facilitate sharing information in a dynamically controlled manner that enables delivery of temporally-, geographically-, and/or purpose-limited information to the receiving party. In one example, mobile/wearable/portable applications implementing a system or aspects thereof as disclosed herein may provide a controlling entity with control over both the timing and level of participation in location- and time-sensitive applications.

United States Patent 2015/0074259 to Ansari et al. discloses an intelligent gateway device provided at a premise (home or business) for providing and managing application services associated with use and support of a plurality of digital endpoint devices associated with the premises. The device includes a communications and processing infrastructure integrated with a peer and presence messaging based communications protocol for enabling communications between the device and an external support network and between the device and connected digital endpoint devices. A services framework at the gateway device implements the communications and processing infrastructure for enabling service management, service configuration, and authentication of user of services at the intelligent gateway. The framework provides a storage and execution environment for supporting and executing received service logic modules relating to use, management, and support of the digital endpoint devices. Thus, the gateway device provides a network-based services point of presence for a plurality of digital endpoint devices at the premises.

U.S. Pat. No. 10,044,705 to Wang et al. discloses a directed to security management in communications involving computing devices, e.g. Internet of Things (IoT) devices. An IoT device can perform various activities, e.g., social networking activities, for or on behalf of a user. An IoT device is typically insecure, especially when accessing user data. To control the type of activities that can be performed by various types of devices, a server device ("server") can issue different types of tokens to different IoT devices. Which token an IoT device has determines the types of activities the IoT device can perform. For example, the server can issue a restricted token, which restricts the type of activities an IoT device can perform, and an unrestricted token to a more secure device, e.g., a smartphone, that can perform a broader range of activities. For example, the restrictive token may not permit the IoT device to change the password of a user.

Although the aforementioned prior art has contributed to the development of the art of authentication and trust development between an network server and a network client, both the current asymmetric and symmetric encryption technologies and the quantum resistant encryption technologies the NIST is developing do not provide permanent protection solutions to address our critical trust requirements.

Therefore, it is an object of the present invention to provide permanent protection solutions for the identities of the network server and network clients as they reciprocally authenticate to one another establishing the trust they require in the digital transmissions between them.

Another object of this invention is to provide permanent protection solutions for the payment details involved in the transactions between the network server and network clients after they have reciprocally authenticated one another and established the trust they require to conduct their business.

Another object of this invention is to record the time at key processing and data exchange points in order to establish benchmarks that can be used to identify and react to potential man in the middle attacks.

Another object of this invention is to create and maintain tables at both the network client and server that start equivalent, that independently change completely, that are proven to end equivalent and do so without copying, sharing or in any other way exposing any of these required changes so that they can provide the raw data used in the mathematical computations our authentication and symmetric encryption processes require.

Another object of this invention is to provide our authentication and encryption capabilities to the simplest of client devices such as found in the IOT that suffer from limited power, limited computational capabilities, and limited communicational capabilities that make them incapable of conducting bidirectional communications.

Another object of this invention is to provide a temporary protection solution for all the data we do not provide permanent protections for by deploying a quantum resistant symmetric encryption solution that is consistent with the goals of perfect forward security and overcomes most of the traditional symmetric encryption key management problems.

Another object of this invention is to enable the network server to establish multiple network client authenticated connections between the network server and these network clients and then link any of these network clients through these independently maintained authenticated, symmetrically encrypted, de-identified or identified connections.

Another object of this invention is to create a self healing mechanism capable of encountering failure and restoring itself to it's prior status quo.

Another object of this invention is to provide our authentication and encryption capabilities to all devises from the simplest of client devices such as found in the IOT all the way to the most sophisticated devises capable of conducting bidirectional communications with their own security such as cell phones computers, deep space craft, drones, automated vehicles and the alike.

Another object of this invention is to establish a process that installs a generic device template for mass manufacturing of devices that can latter be reconfigured to establish the equivalence with this devises network server counterpart that makes our authentication and encryption capabilities possible between them.

Another object of this invention is to establish a process that allows an end user to download an App to their device that installs and configures their device to establish equivalence with their network server counterpart making our authentication and encryption capabilities possible between them.

Another object of this invention is to record and measure the time at key processing and data exchange points in order to so narrowly define acceptable intervals of time to conduct these operations that no attacking force will be able to first decipher and then replicate these single use functions before exceeding the time allowed, thereby rendering time as a weapon against such attacks.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved secure authentication between network peers. The peers comprise a network server for identifying, authenticating, sending and receiving data from a network client. A network client for identifying, authenticating, sending and receiving data from the network server. A server table stored in the network server for storing server table objects. The server table objects include a server label group, a server data group and a server time group. A client table stored on the network client for storing client table objects. The client table objects include a client label group, a client data group, and a client time group. The server table objects and the client table objects maintain equivalency. A client time sync packet for requesting current time from the network server by the network client. A server report time packet that contains the current time of the network server for updating a client flag time object as a session start time in the client time group.

A first arithmetic formula, a second arithmetic formula, a third arithmetic formula, a fourth arithmetic formula, a fifth arithmetic formula, a sixth arithmetic formula, a seventh arithmetic formula, and an eighth arithmetic formula stored on both the network server and the network client for concealing transmitted data. The first arithmetic formula and the second arithmetic formula are used for concealing the network client table objects to be sent within a first client data packet. The first client data packet also includes a client table label and a first client level value exposed. The network server updates a first server match time in the server time group after matching a valid client table label to a corresponding valid server table label and matching a valid first client level value to a corresponding valid first server level value.

The network server uses the first client data packet against the server table objects and the first arithmetic formula for deriving and recording the client flag time object into the server flag time object. The network server inserts the server table objects into the second arithmetic formula for comparing and validating the first client data packet and the identity of the network client.

The third arithmetic formula and said fourth arithmetic formula is used for concealing the network server table objects to be sent within a first server data packet to the network client. The first server data packet also includes the server table label and a second server level value exposed. The network client updates a second client match time in the client time group after matching a valid server table label to a corresponding valid client table label and a valid second server level value to a corresponding valid second client level value.

The network client uses the first server data packet against the client table objects and the third arithmetic formula for deriving and recording the first server match time into a first client match time. The network client inserts the client table objects into the fourth arithmetic formula for comparing and validating the first server data packet and the identity of the network server. The fifth arithmetic formula and the sixth arithmetic formula is used for concealing the client table objects to be sent within a second client data packet. The second client data packet also includes the client table label and a third client table level value exposed.

The network server updates a third server match time in the server time group after matching a valid client table label to a corresponding valid server table label and a valid third client level value to a corresponding valid third server level value. The network server uses the second client data packet against the server table objects and the fifth arithmetic formula for deriving and recording the second client match time object into a second server match time. The network server inserts the server table objects into the sixth arithmetic formula for comparing and validating the second client data packet and the identity of the network client.

The network client may consist of a home appliance, such as a refrigerator, thermostat, alarm system, surveillance system, or a simple IOT device with limited power, range, and computational capabilities and the second client data packet may also includes a first client data to report that would be left exposed. This data packet may contain data such as the refrigerator temperature, the room temperature, alarm system status, or surveillance system images.

The secure authentication between network peers both the network client and network server maintain equivalent tables of data objects. The values of these table objects change completed with this authentication process at both locations using the same calculation rules leaving the final values at both the network client and network server equivalent once again. Sending a hash of the newly changed client values to the server to compare against the hash of the server newly changed values proves the equivalence of the client new table values to the server new table values and that both are prepared for the next transmission event.

The values in these tables at the start of the authentication process are used in this transmission event and the changed values still remaining equivalent are to be used in the next transmission event to provide the mathematical components to conduct the authentication and our symmetric encryption processes in that next transmission event. Creating completely new values at both locations that remain equivalent conforms to the goal of perfect forward secrecy and enables the generation of multiple symmetric encryption keys. One key is used to encrypt and decrypt the data to report in the current transmission and the rest of the keys are used to establish secure VPN protocols for the next transmission event.

In another embodiment of the secure authentication between network peers that also includes the aforementioned encryption technology the network client devices posses bidirectional communication capabilities such as cell phones, computers, drones, automated vehicles and satellites. The network server upon establishing multiple network client authenticated connections between the network server and these network clients would then link any of these network clients through these independently maintained authenticated, symmetrically encrypted, de-identified or identified connections.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 2 is a view a network server and network client, both having a locally stored table;

FIG. 2A is an illustration showing a network client requesting current time by sending a time request packet to the network server and the network server responding with a reported time packet;

FIG. 5 is an illustration of the server compiling a first server data packet to send to the network client using data from its locally stored table and the network client receiving the packet;

FIG. 6 is an illustration showing the network client retrieving data from the first server data packet and updating the corresponding client table and verifying the network server identity, FIG. 7 show what the server table includes after the first two transmissions between the network server and the network client;

FIG. 8 is the network client sending a second data packet to the network server with data to report included;

FIG. 9 illustrates the network server processing the second client data packet and saving the data to report from the network client;

FIG. 11 is similar to FIG. 2 showing a network server and network client, both having a locally stored table;

FIG. 11A is similar to FIG. 2A except FIG. 11A shows a brief summary of FIG. 2A through FIG. 5 of the process from the time request to the first server data packet;

FIG. 12 shows a brief summary of FIGS. 6-10;

FIG. 12A shows the network server and network client both locally stored new tables that are populated with new values;

FIG. 19 is an illustration of a website for a manufacture to login with an existing account and upload a new device inventory file to the HIDDIN server;

FIG. 20 shows the inventory file ready to be uploaded and sent to the HIDDIN server;

FIG. 20A shows the process of the inventory file being sent to the HIDDIN server and the HIDDIN server processing the manufactured devices listed in the inventory file;

FIG. 26 is an illustration of a new end-user filling in required information for the HIDDIN service;

FIG. 27 is a continuation of FIG. 26 where the new end-user is selecting check as a payment method and uploading an image of check from the end-user for HIDDIN service to use for billing;

FIG. 28 is a continuation of FIG. 27 showing the completed fields and a "Thank you" page showing a sent email to continue end-user activation;

FIG. 34 illustrates the present invention of reciprocal authentication of digital transmission start process, wherein the network client is requesting the current time and the network server responding with the current time;

FIG. 42 shows the server creating a response packet for the network client using data stored locally to the network server, the network server sends the packet and then waiting for a response;

FIG. 44 shows the network client verifying the identity of the network server then the network client records the match time;

FIG. 45 illustrates the network client using the first server data packet and calculations to update the first client match time in the local client table;

FIG. 46 illustrates the network client computing the expected travel time then verifies the identity of the network server;

FIG. 47 shows the start of the table conversion done by both the network server and network client, wherein the data from multiple fields in the table are used to compute the T column;

FIG. 48 is similar to FIG. 47 except FIG. 48 the network server and network client use data from multiple fields in the table are used to compute the K column;

FIG. 52 illustrates the network server and network client using data from multiple fields in the table to compute the new label salt value in the second part of the label group;

FIG. 53 illustrates the network server and network client using data from multiple fields in the table to compute the first part of the label group;

FIG. 54 is similar to FIG. 53 except FIG. 54 illustrates the network server and network client using data from multiple fields in the table to compute the new hash salt value in the third part of the label group;

FIG. 55 illustrates the network server and a network client hashing a newly created new table;

FIG. 75 illustrates an example of a communication log stored on the network server of the communication between a workstation showing the H-mail sent Betty Howell via computer;

FIG. 78 illustrates an example of a communication log stored on the network server recording that Betty Howell answered the call from Jim Brien on her smart phone;

FIG. 79 illustrates an example of a communication log stored on the network server recording that Betty Howell did not answer the call from Jim Brien and that he left a voice message;

FIG. 80 shows the network server performing a table shuffle and preparing a second server packet and any available label or data updates to send to the network client;

FIG. 90 shows full hash values that were abbreviated in earlier figures.

Similar reference characters refer to similar parts throughout the several Figures of the drawings.

DETAILED DISCUSSION

Figure 1:
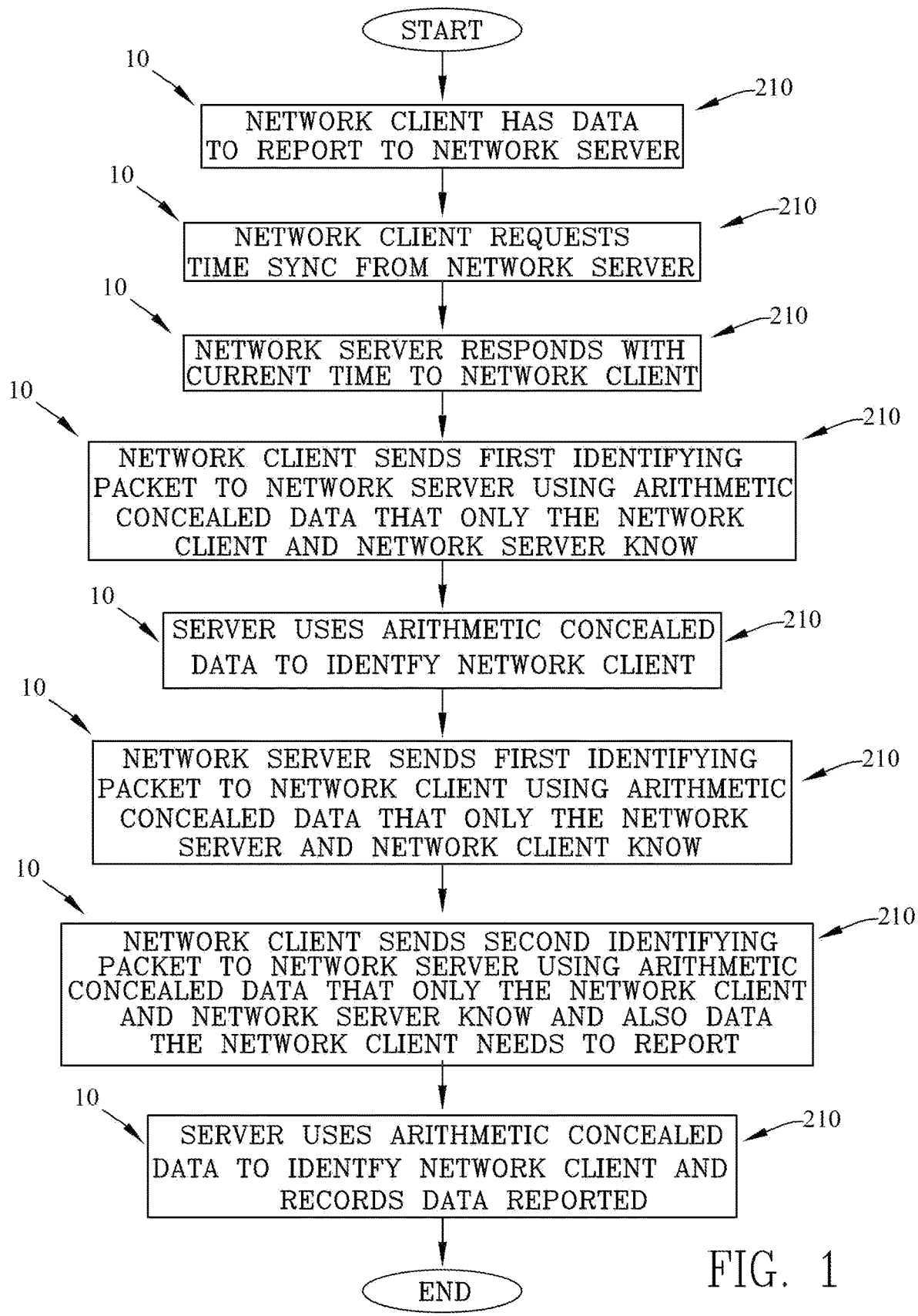
FIG. 1 illustrates a simple flow diagram of an authentication processing method according to the first embodiment of the present invention.

FIG. 1 illustrates a simple flow diagram of the apparatus and method of secure authentication between network peers including a network server 10 and a network client 210.

FIGS. 2-12A illustrates a brief overview first embodiment of the present invention wherein the network client 210 reports data to the network server 10.

FIG. 2 is a view a network server 10 and network client 210, both having a locally stored table. The network server 10 contains a server table 40 for storing server table objects 41. The server table objects 41 are made up of a server label group 42, a server data group 43 and a server time group 44.

The network client 210 contains a client table 240 for storing client table objects 241. The client table objects 241 are made up of a client label group 242, a client data group 243 and a client time group 244.

FIG. 2A is an illustration showing network client 210 requesting current time by sending a time request packet 211 to the network server 10 and the network server 10 responding with a reported time packet 11. After the network client 210 receives the reported time packet 11, the network client 210 adds the network server 10 current time obtained in the reported time packet 11 to the client flag time object 246 that is located within the client time group 244 of the client table 240.

Figure 3:
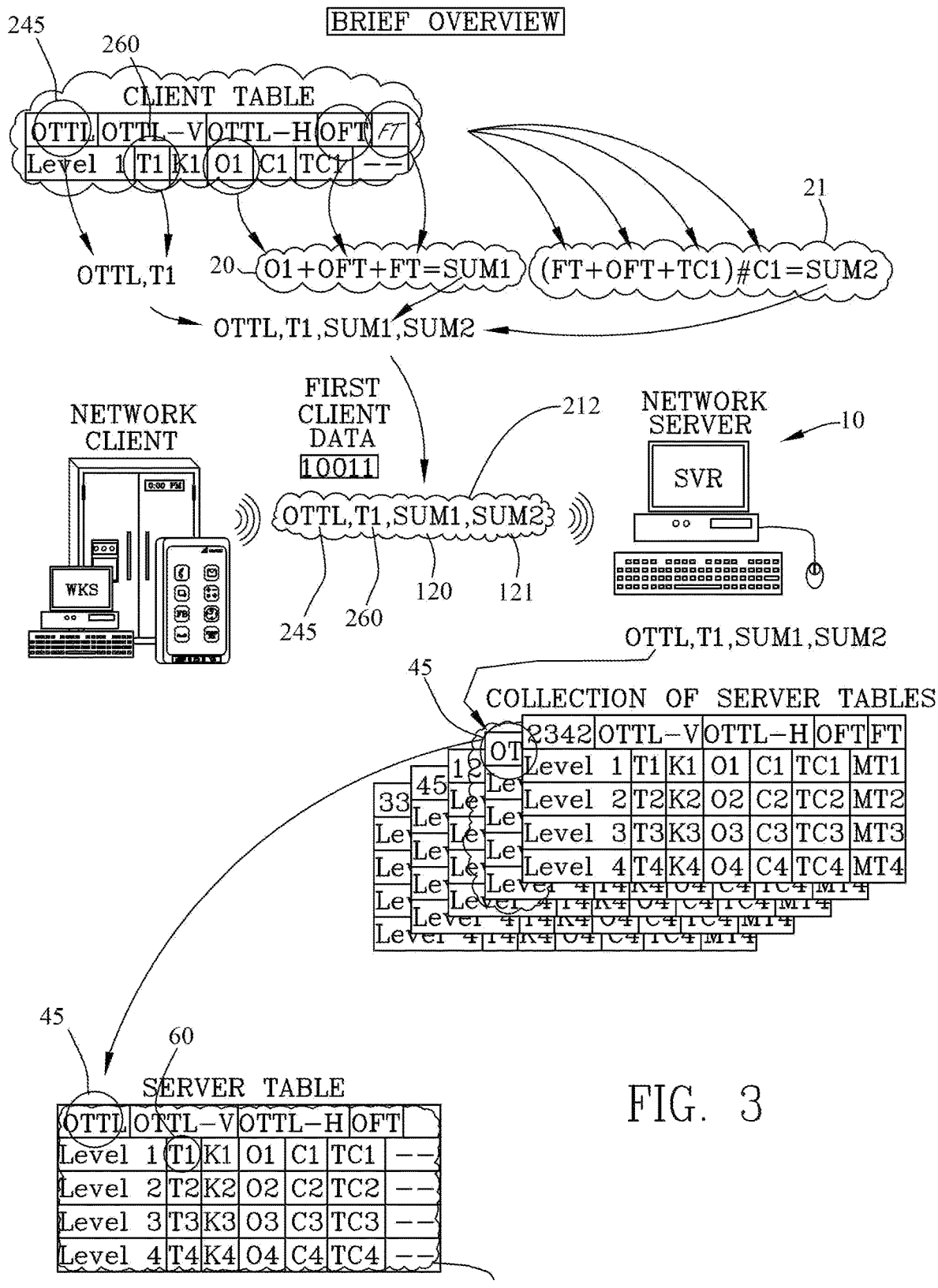
FIG. 3 is an illustration showing the network client compiling a first client data packet to send to the network server using data from its locally stored table and the network server receiving the packet and retrieving the corresponding server table for the network client.

FIG. 3 illustrates how the network client 210 prepares and sends the first client data packet 212. In the process of creating the first client data packet 212, the network client 210 fills in both the first arithmetic formula 20 and the second arithmetic formula 21 using values stored in the client table 240. The network client 210 also uses the client table label 245 and the first client level value 260 to include in the first client data packet 212. The first client data packet 212 is now ready to send. The first client data packet 212 contains the client table label 245, the first client level value 260, and the sums of the first arithmetic formula 20 and the second arithmetic formula 21.

The network server 10 receives the first client data packet 212 with the client table label 245, the first client level value 260, first arithmetic formula 20 and the second arithmetic formula 21 non-encrypted. Using the client table label 245, the network server 10 retrieves a matching server table label 45 that corresponds with that network client 210. The network server 10 then uses the first client level value 260 contained in the first client data packet 212 to match to a corresponds first server level value 60.

Figure 4:
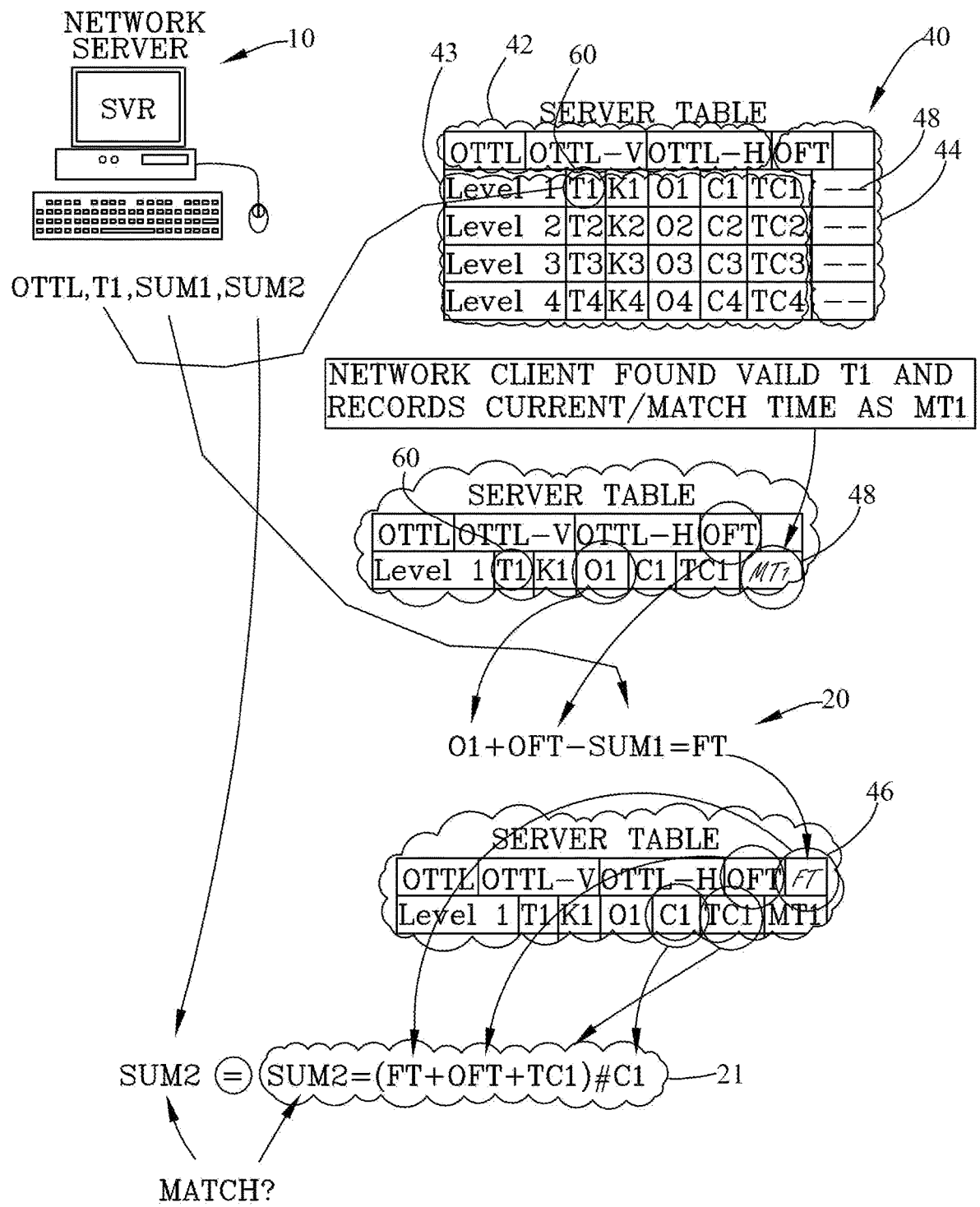
FIG. 4 is an illustration showing the network server retrieving the data from the first client data packet and updating the corresponding server table and verifying the network client identity.

As best shown in FIG. 4 after matching the first server level value 60 with the corresponding first client level value 260 the resulting match time is recorded in the first server match time or MT1 48. The network server 10 then using a restated version the first arithmetic formula 20, the sum of the first arithmetic formula 120 sent in first client data packet 212, and the values within the server table 40 to derive the client flag time object 246 and save the client flag time object 246 in the server flag time object 46. With more of the values in the server table 40 filled, the network server 10 can solve the second arithmetic formula 21 and compare that second sum of the arithmetic formula 121 verse the sum of the second arithmetic formula 121 sent in the first client data packet 212 thereby confirming the identity of the network client 210.

Figure 5:
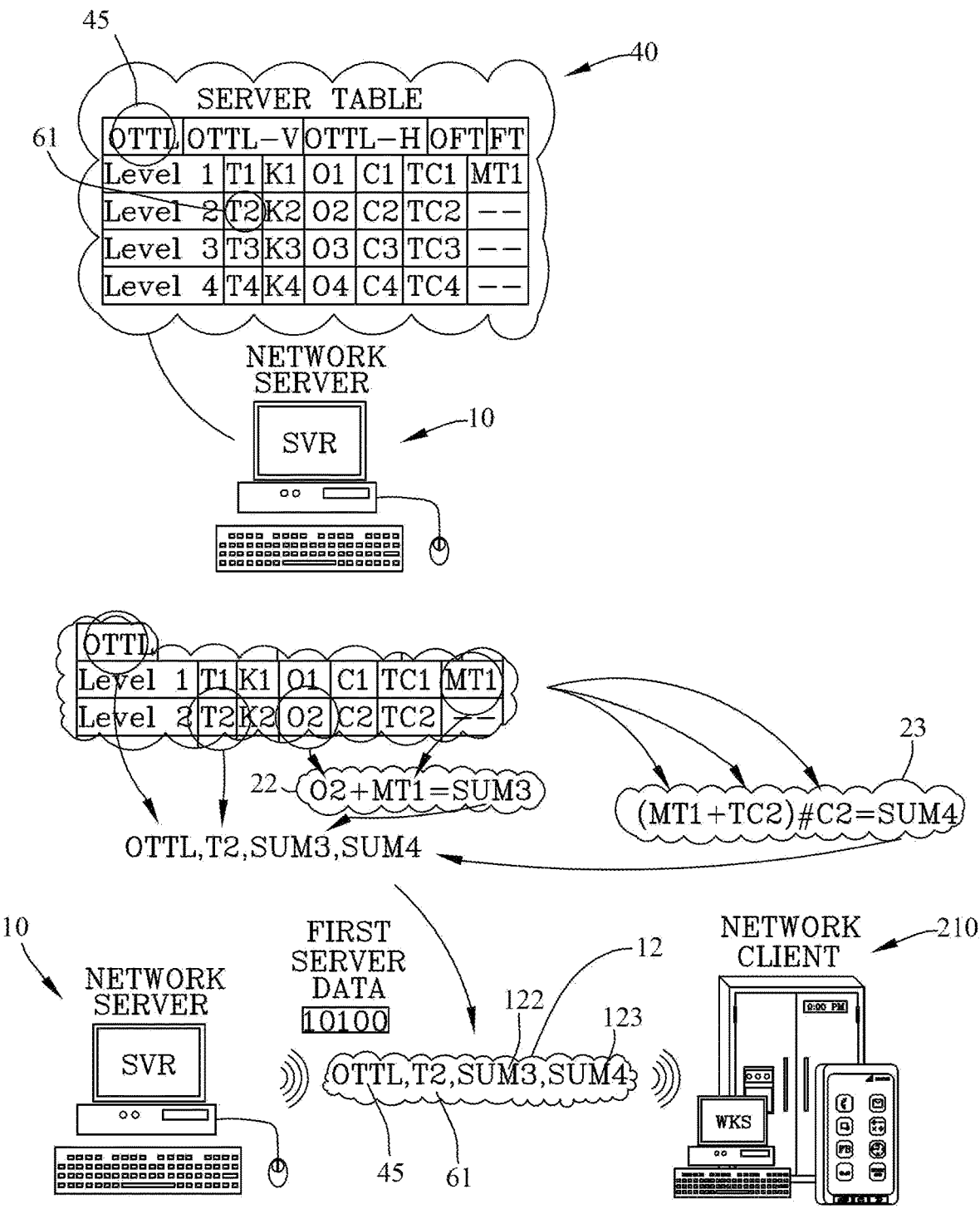
FIG. 5 is similar to FIG. 3 except

FIG. 5 is similar to the process described in FIG. 3 except the network server 10 prepares to send a first server data packet 12. In the process of creating the first server data packet 12, the network server 10 fills in both a third arithmetic formula 22 and a fourth arithmetic formula 23 using values stored in the server table 40. The network server 10 also uses the server table label 45 and the second server level value 61 to include in the first server data packet 12. The first server data packet 12 is now ready to send. The first server data packet 12 contains the server table label 45, the second server level value 61, and the sum of the third arithmetic formula 122 and the sum of the fourth arithmetic formula 123.

Figure 6:
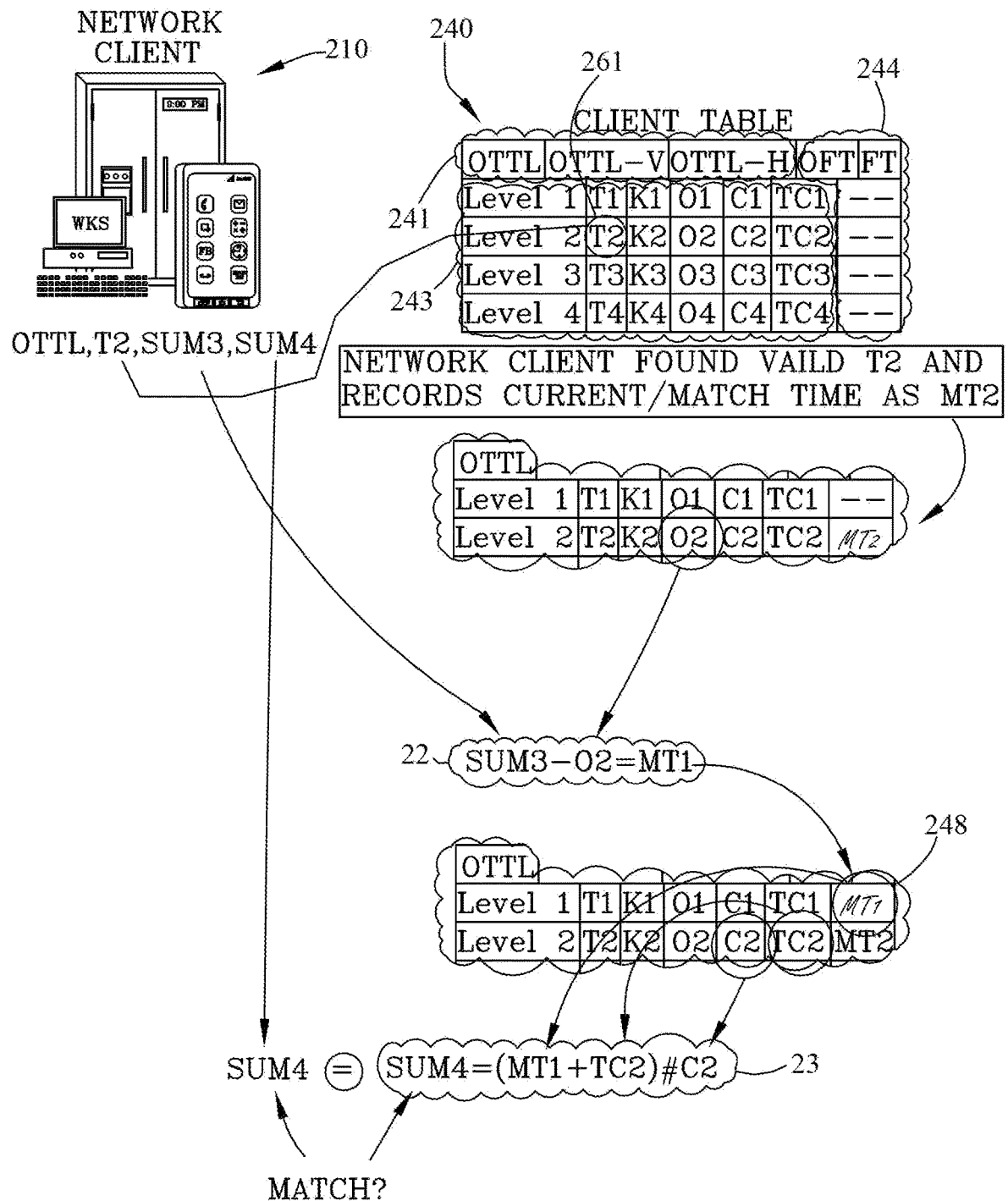
FIG. 6 is similar to FIG. 5 except

As best shown in FIG. 6 after matching the second client level value 261 with the corresponding second server level value 61 the resulting match time is recorded in the second client match time 249 shown as MT2. The network client 210 then using third arithmetic formula 22, the sum of the third arithmetic formula 122 send in first server data packet 12, and the values in the client table 240 can derive the first server match time 48 and save the server match time 48 in the first client match time 248. With more of the values in the client table 240 filled, the network client 210 can solve the fourth arithmetic formula 23 and compare that sum of the fourth arithmetic formula 123 verse the sum of the fourth arithmetic formula 123 the network server 10 sent in the first server data packet 12 thereby confirming the identity of the network server 10.

Figure 7:
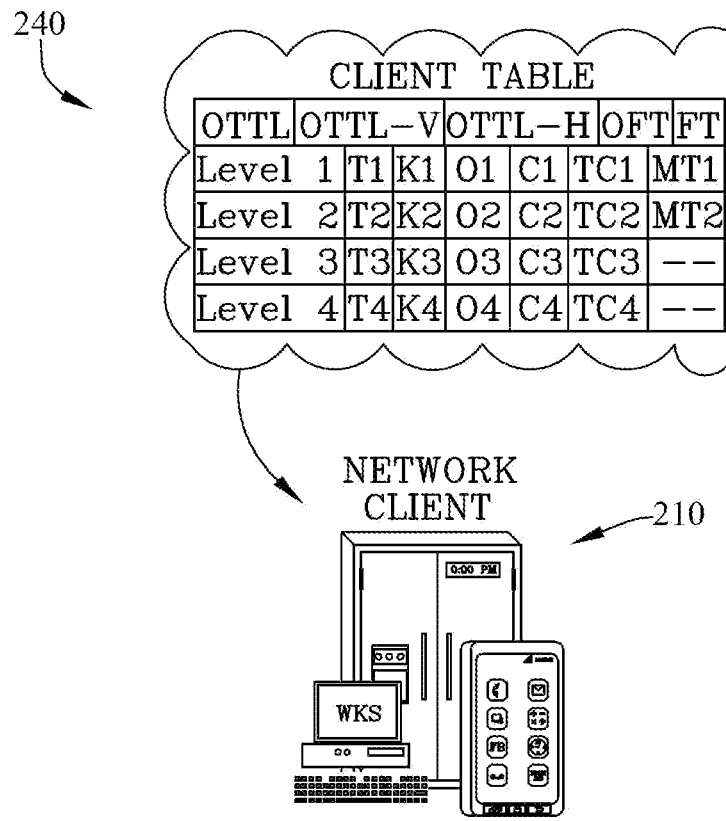

FIG. 7 shows the partially completed client table 240 stored within the network client 210.

Figure 8:
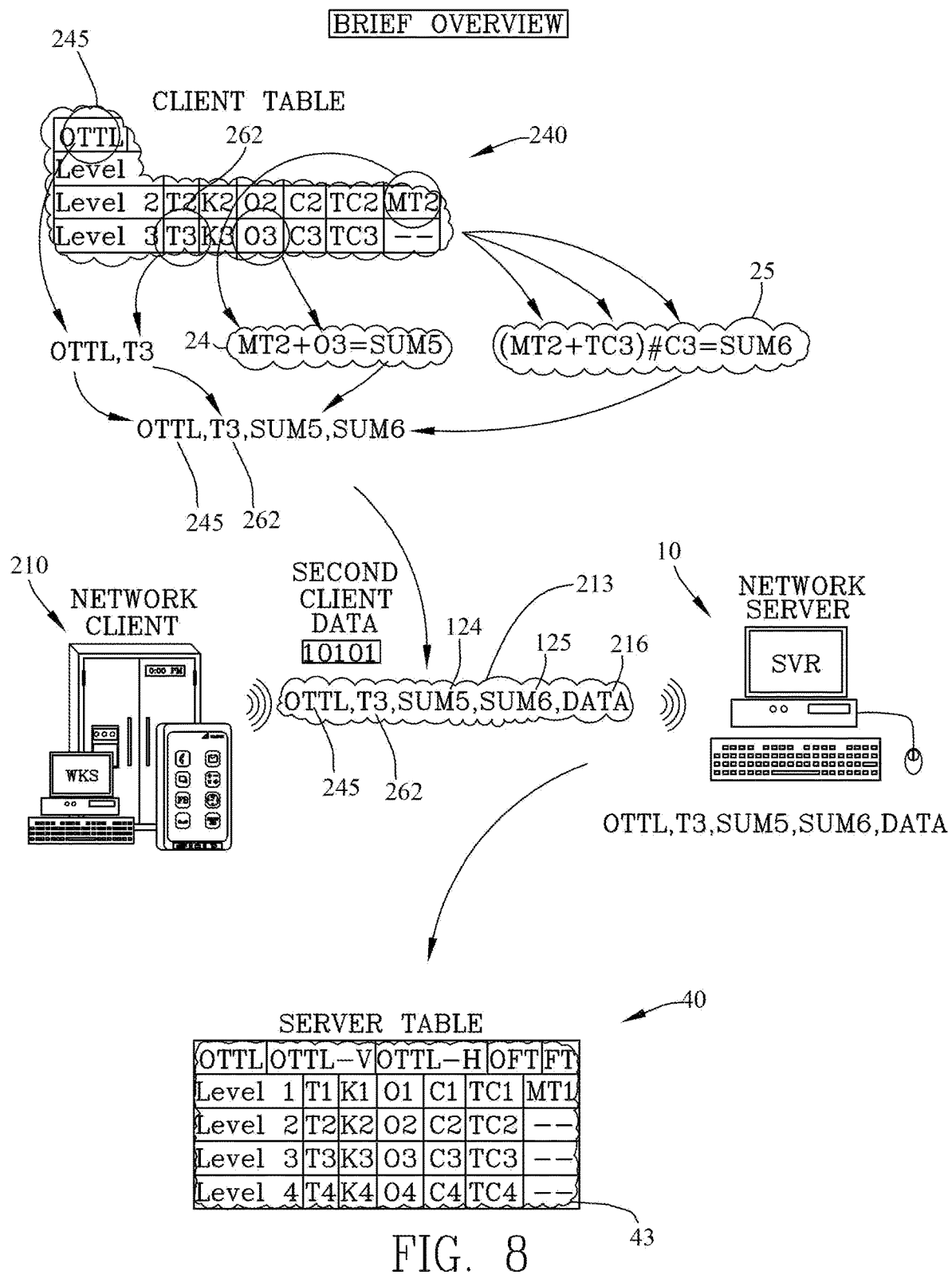
FIG. 8 is similar to FIG. 3 except

FIG. 8 is similar to the process described in FIG. 5 except the network client 210 prepares to send a second client data packet 213. In the process of creating the second client data packet 213, the network client 210 fills in both a fifth arithmetic formula 24 and a sixth arithmetic formula 25 using values stored in the client table 240. The network client 210 also uses the client table label 245 and the third client level value 262 to be included in the second client data packet 213. The second client data packet 213 is now ready to send. The second client data packet 213 contains the client table label 245, the third client level value 262, the sums of the fifth arithmetic formula 24 and a sixth arithmetic formula 25 and any client data to report 216.

Figure 9:
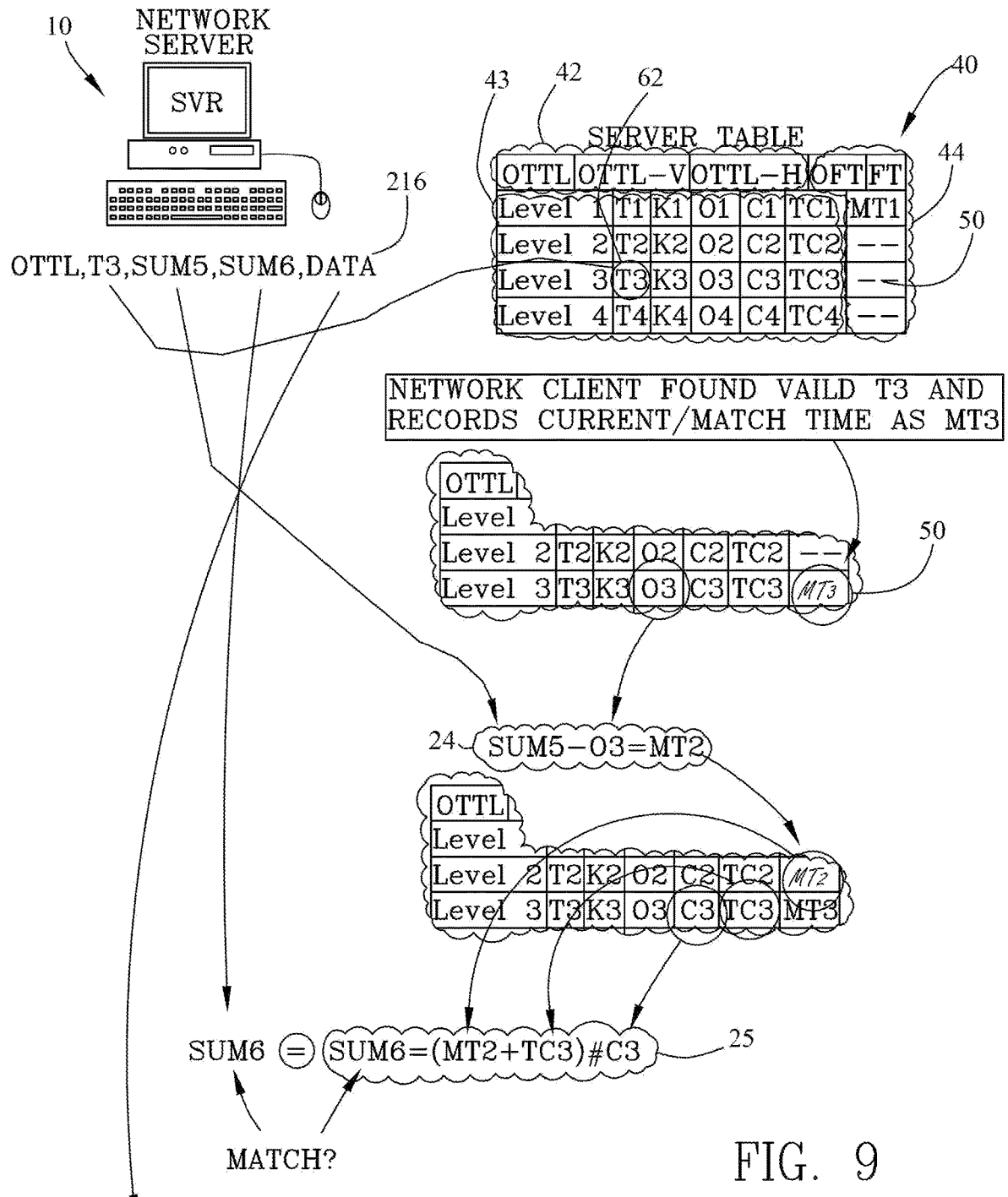
FIG. 9 is similar to FIG. 4 except

As best shown in FIG. 9 after matching the third server level value 62 with the corresponding third client level value 262 the resulting match time is recorded in the third server match time 50 shown as MT3. The network server 10 then using the fifth arithmetic formula 24 and the sum of the fifth arithmetic formula 124 send in second client data packet 213, and the values server table 40 to derive the second client match time 249 and save the second client match time 249 in the second server match time 49. With more of the values in the server table 40 filled, the network server 10 can solve the sixth arithmetic formula 25 and compare that sum of the sixth arithmetic formula 125 verse the sum of the sixth arithmetic formula 125 network client 210 sent in the second client data packet 213 thereby confirming the identity of the network client 210. The network server 10 has verified the network client 210 again and now records the client data to report 216.

Figure 10:
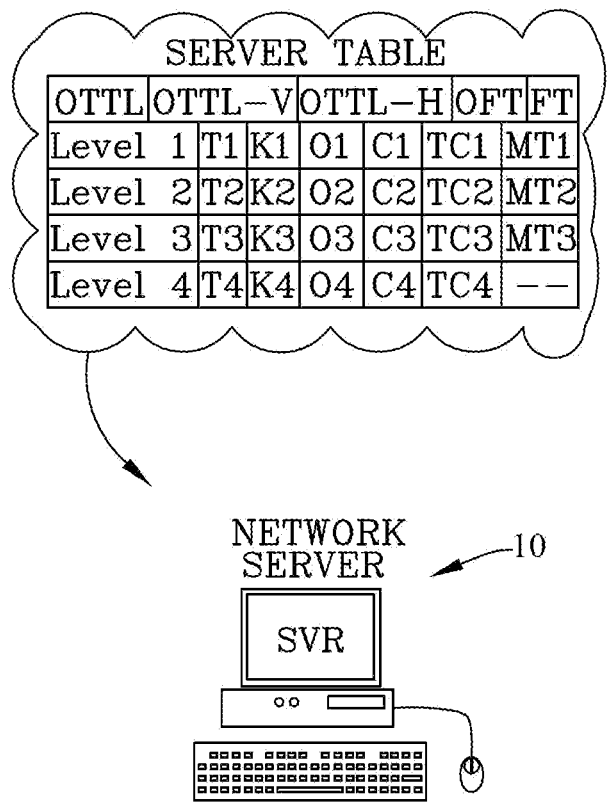
FIG. 10 is similar to FIG. 7 except FIG. 10 show what the server table includes after the second client data packet has been received and process by the network server.

FIG. 10 shows the partially completed server table 40 stored within the network server 10.

FIGS. 11-12A is even more brief illustration of FIGS. 2-10. FIG. 11 shows the network server 10 and a network client 210 with fully populated server table 40 and client table 240, respectively. FIG. 11A to FIG. 12 shows the brief illustration of FIGS. 2A-10 with the inclusion of the network server 10 and a network client 210 ending with a table shuffle or better described as renaming the server table 40 and client table 240 which will be better described later. FIG. 12A shows the network server 10 and the network client having a new server table 90 and new client table 290, respectively, that are populated and ready for the next communication between the network server 10 and network client 210.

Figure 13:
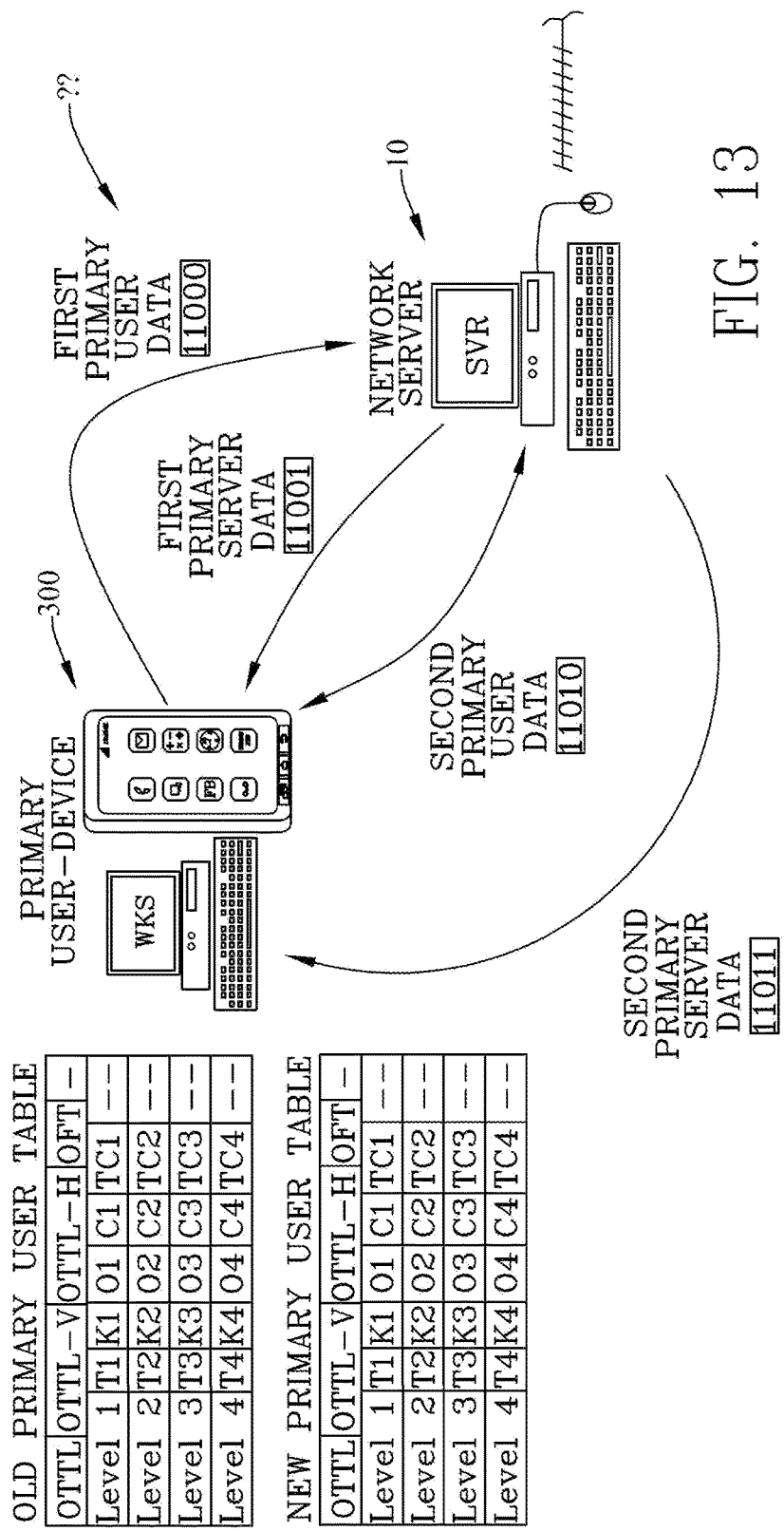
FIG. 13 illustrates a one half of an authentication processing method according to the second embodiment of the present invention, showing a primary user-device communicating with the network server.
Figure 14:
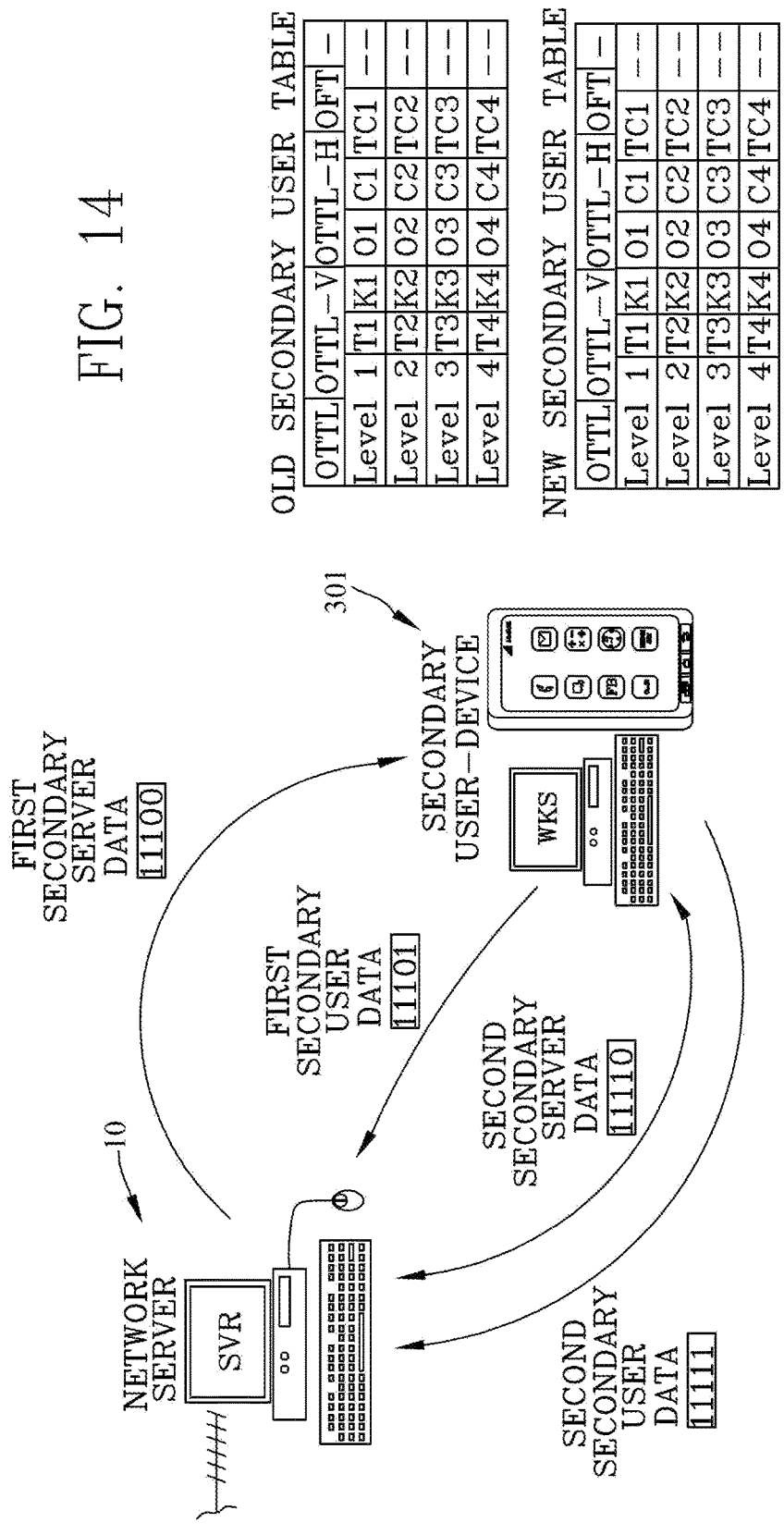
FIG. 14 illustrates a second half of an authentication processing method according to the second embodiment of the present invention showing a secondary user-device communicating with the network server.
Figure 15:
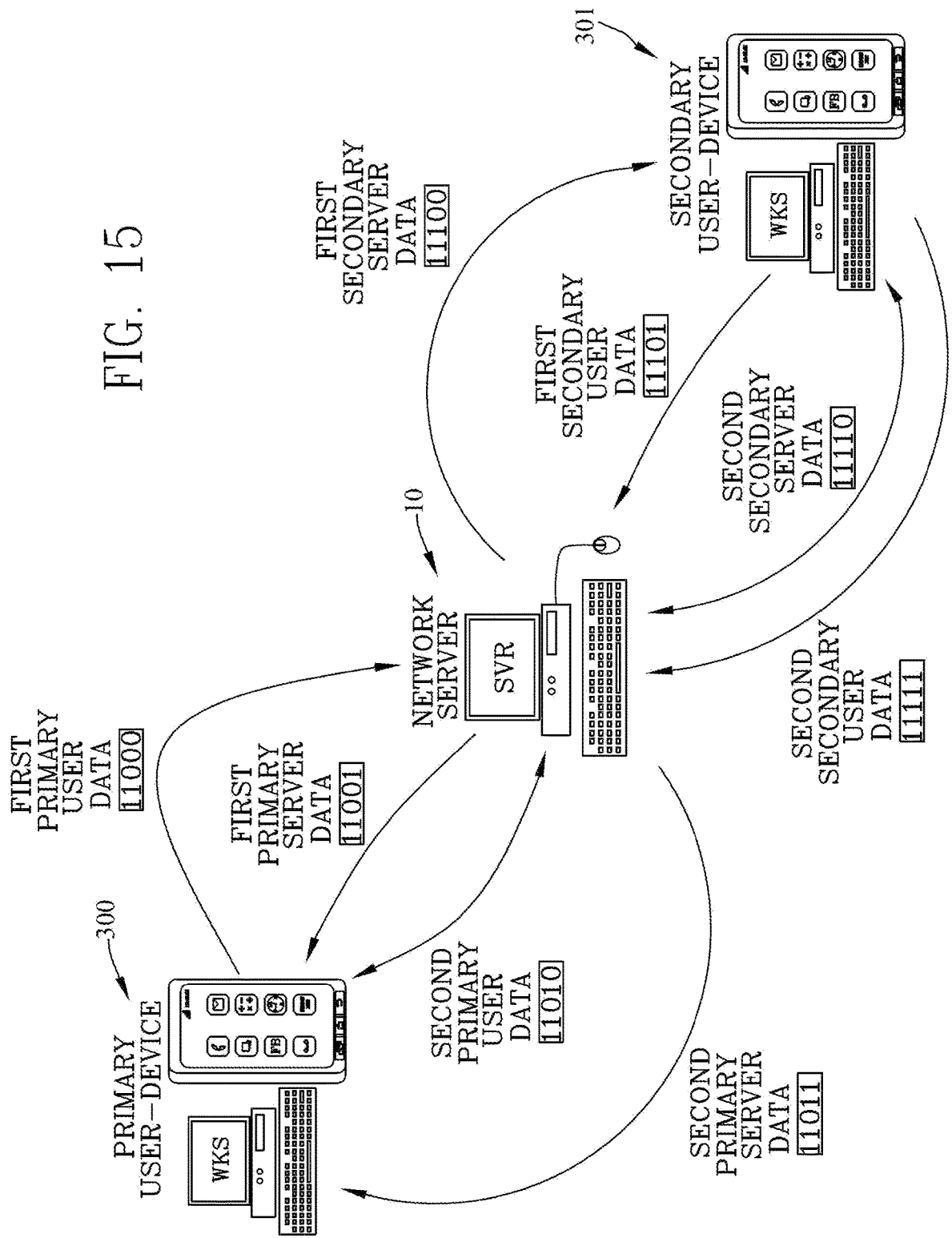
FIG. 15 illustrates both sides of an authentication processing method according to the second embodiment of the present invention, better showing the communication between the primary user-device and secondary user-device through the network server.

FIG. 13-15 is a brief illustration of the second embodiment of the present invention. The second embodiment of the present invention consist when the network client 210 has bidirectional communication capabilities such as a personal computer 306 or smart phone 305. The second embodiment of the present invention uses the same secure authentication as described above but with a primary user device 300 and a secondary user device 301 wanting to communicate with each other through the network server 10. It should be noted that primary user device 300 and a secondary user device 301 could both be a network server 10.

Figure 16:
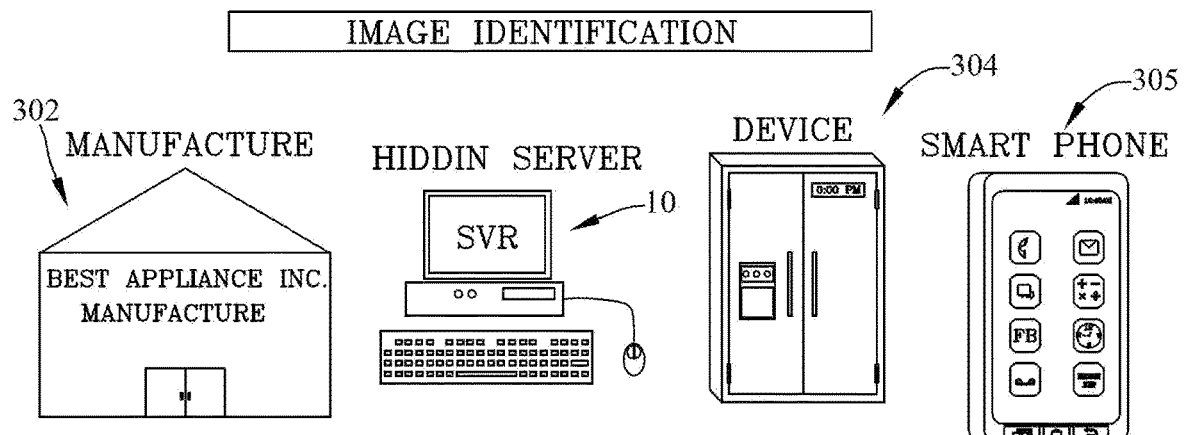
FIG. 16 shows an appliance manufacture, HIDDIN server, and some of the possible devices that the manufacture assembles.
Figure 16A:
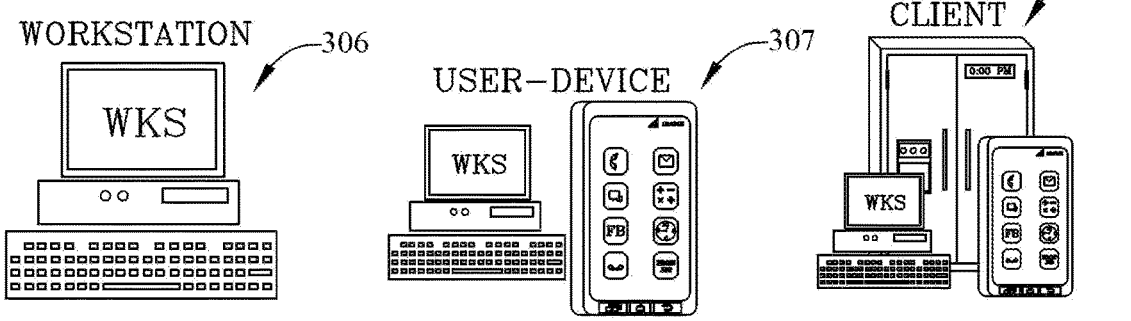
FIG. 16A is an example of a website that allows a manufacture to either signup for the HIDDIN network or login into the HIDDIN network to assign newly manufactured devices with the HIDDIN network.
Figure 17:
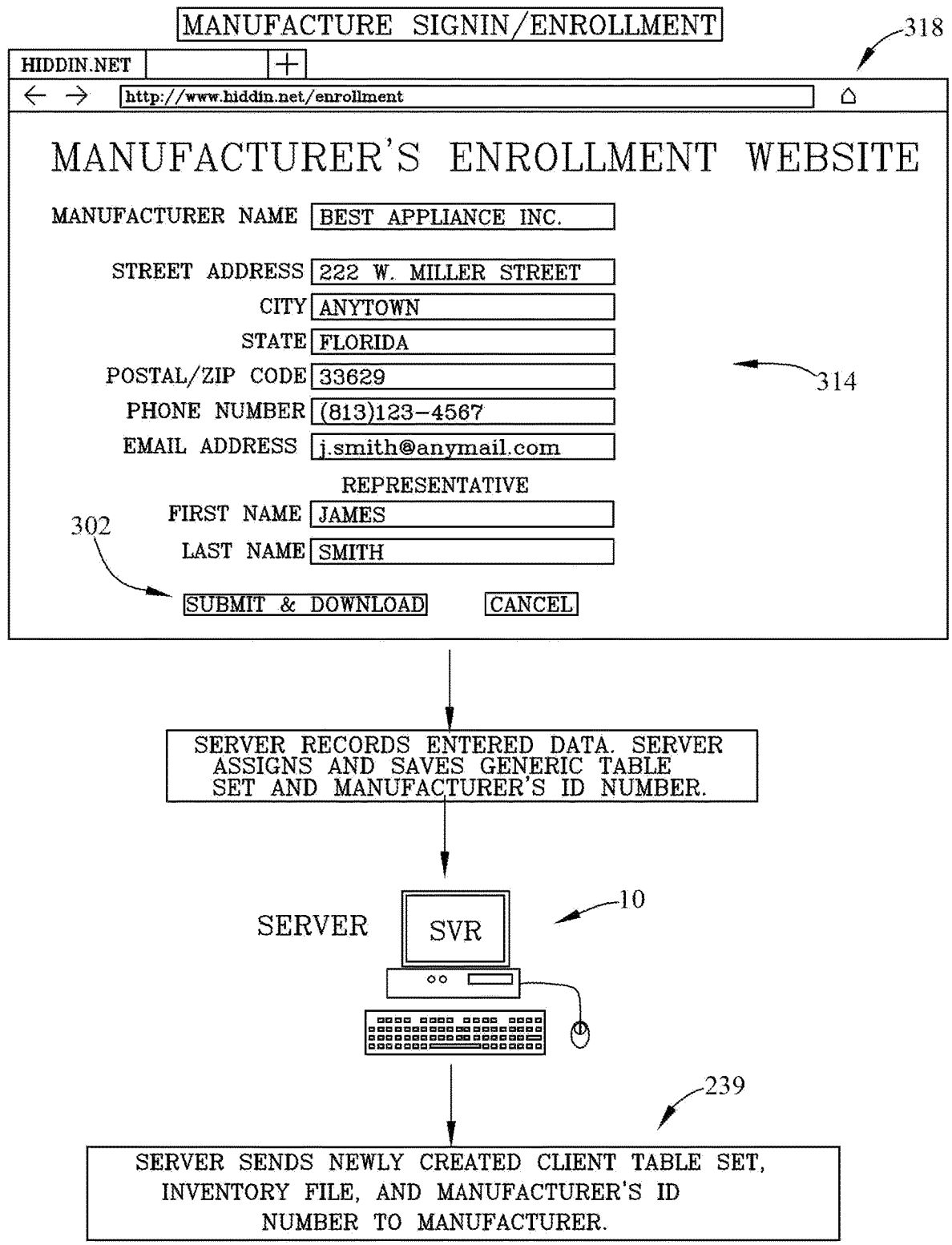
FIG. 17 shows a website that the manufacture will need to fill in to create an account on the HIDDIN network and the response from the HIDDIN server to the manufacture after account creation.
Figure 18:
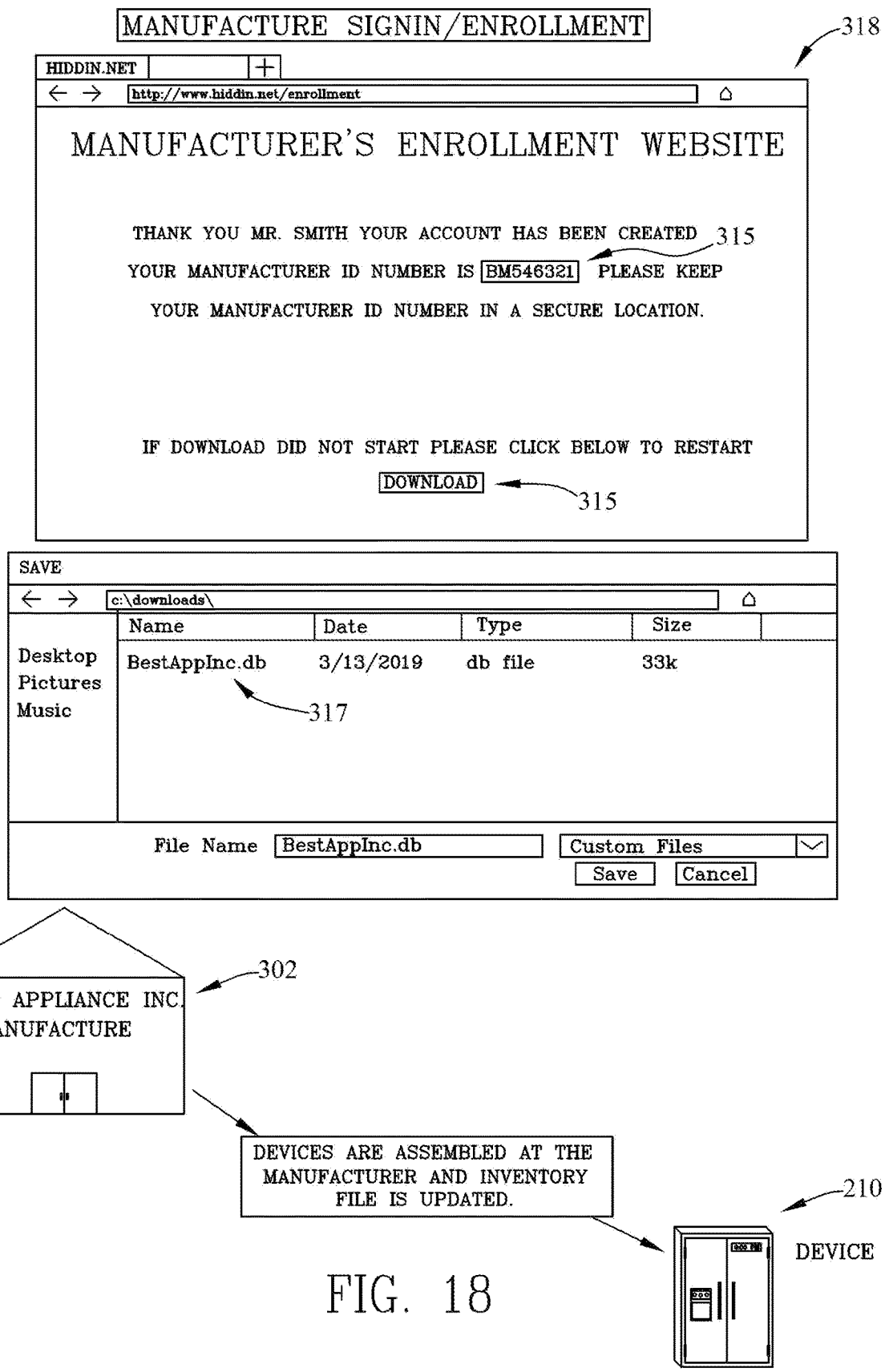
FIG. 18 shows the HIDDIN website response after account creation displaying the new manufacture ID and the opportunity for the manufacture to download a new device template database which will be uploaded after device creation.

In FIG. 16 images that will be used in the drawing of the present invention. These images include a manufacture 302 that creates a device 303 that typically only report data such as a refrigerator 304. The manufacture 302 could also manufacture bidirectional items such as a smart phone 305, a workstation 306. A user-device 307 can consist of a smart phone 305, a workstation 306 that is capable of receiving reports and configuration changes. A network client 210 consist of all devices that can attach to a network. These IOT devises either report data on a predetermined periodic basis or upon the occurrence of a specific event such as a part malfunction or settings change. FIG. 16 also shows an illustration of the HIDDIN server 10 created and controlled by the HIDDIN company. Once a manufacture 302 decides to take advantage of the security the present invention offers, the manufacture 302 would sign up with HIDDIN as shown in FIG. 16A. The HIDDIN manufacture login website 310 is the login point for manufactures that already have an account and wish to log in to the HIDDIN network. If the manufacture 302 needs to create an account, the manufacture 302 would register their company by providing manufacture information 314 asked in FIG. 17. Once the registration information has been submitted to the HIDDIN server 10, the HIDDIN server 10 creates both a server table set 39 and a client table set 239. The server table set 39 and the client table set 239 will be associated with that manufacture 302. After the server table set 39 and the client table set 239 have been created, the HIDDIN server 10 sends the manufacture 302 the client table set 239 along with a unique manufacture ID number 316 in a client table database file 317. If the manufacture 302 does not receive the client table database file 317, the HIDDIN enrollment website 318 makes it available for downloading as shown in FIG. 18. The HIDDIN enrollment website 318 also displays the newly created manufacture ID number 316. After the manufacture 302 downloads the client table set 239 from the client table database file 317, the manufacture 302 assembles the devices by installing the client table set 239 to the newly created devices.

As shown in FIG. 19, if the manufacture 302 returns to the HIDDIN website 310 and is asked for their email address 311 and password 312 to login. After the manufacturer 302 logs in, the manufacture 302 can choose to send the manufacture inventory file 320 which contains information about the device the newly created device 210, such as the serial number, product description, model and suggested retail price to the HIDDIN server 10, best shown in FIG. 20.

After the inventory file 320 has been selected for upload, the manufacture 302 hits the submit button 321, and the HIDDIN server 10 saves and processes the submitted manufacture inventory file 320, shown in FIG. 20. The HIDDIN server 10 then updates the local copy of the manufacture inventory file 320 by assigning each listed device a registration number, a hash technique 28, random salt value 29 shown in FIG. 20A.

Figure 21:
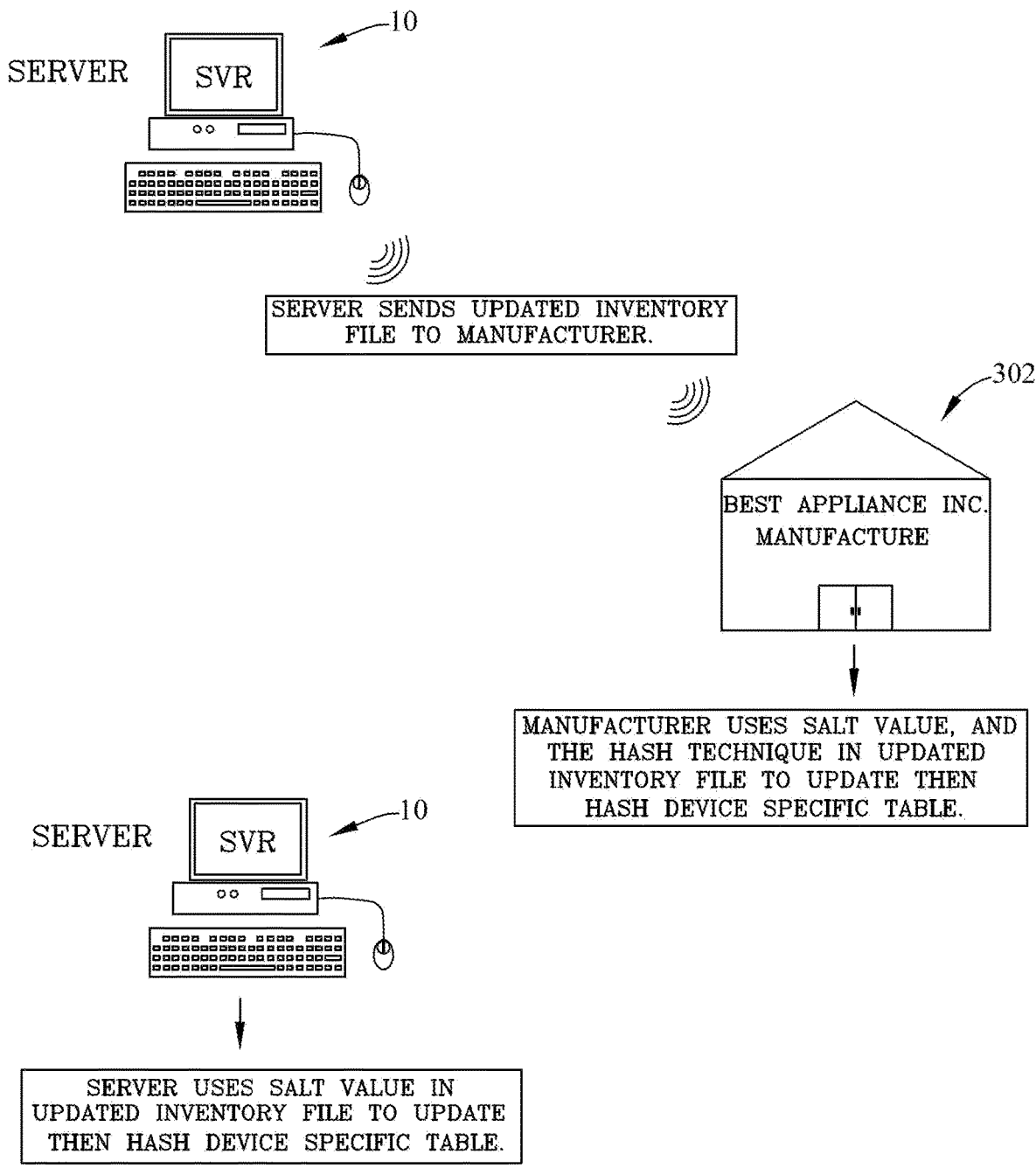
FIG. 21 is an illustration of the HIDDIN server sending the updated inventory file to the manufacturer, the manufacture then installing the updated information to the manufactured devices.

The HIDDIN server 10 sends an updated manufacture inventory file 320 to the manufacture 302, shown in FIG. 21.

The manufacturer 302 updates the manufacture inventory file 320 the manufacturer 302 possesses with the hash technique 28 and the random salt value 29 assigned to each device 210 to hash each device's client table set 239 generating all new values within the client table set 239 that can be stored in to the newly manufacture device's 210 embedded memory or to a removable memory card installed in the device 210.

HIDDIN server 10 uses the updated information in the local copy of the manufacture inventory file 320 to generate unassigned HIDDIN server 10 accounts for each device 210 listed in local copy of the manufacture inventory file 320. The HIDDIN server 10 also creates unique client table set 239 to unassigned devices 210 by using the assigned random salts 29 and hashing techniques 28 for each unassigned devise 210. The unique client table set 239 to unassigned devices 210 results in client table set 239 that are unique to each device 210.

Figure 22:
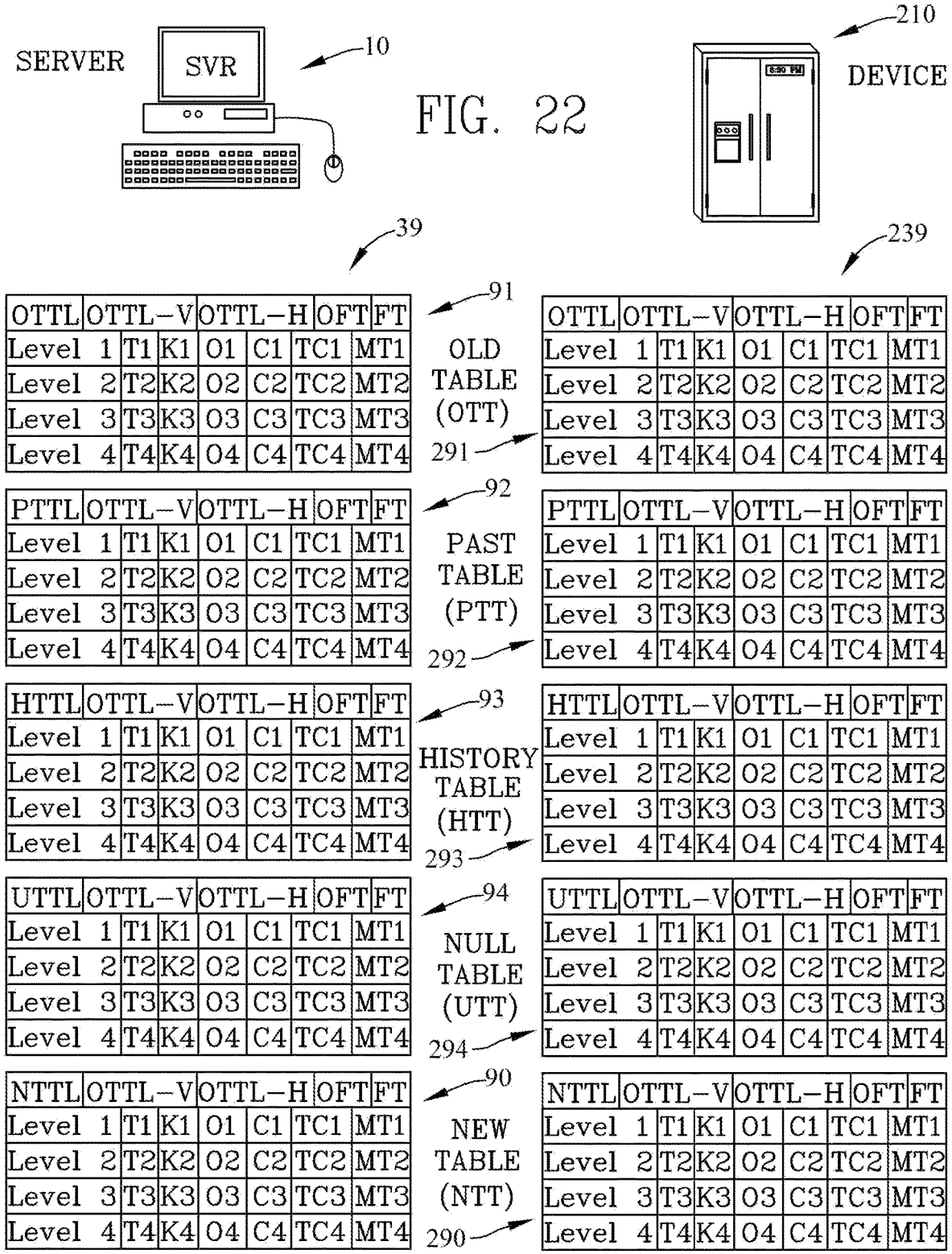
FIG. 22 shows the equivalent tables saved on both the HIDDIN server and a newly manufactured device before hashing.

Shown in FIG. 22 are the server table set 39 and client table set 239 used by the network server 10 and the network device 210, respectively, before server table set 39 and client table set 239 are hashed.

The manufacturer 302 uses the random salt 29 and hash technique 28 assigned each device in the manufacture inventory file 320 to hash the client table set 239 for each device 210 listed in the manufacture inventory file 320 which results in a populated old client table 291 for each device 210. To start the communication process, the network server 10 uses the old server table 91 and the new server tables 95 during each exchange in the transmission while the network client 210 uses the old client table 291 and the new client tables 295 during each exchange in the transmission.

The other tables such as the past server table 92, the history server table 93, and the null server table 94 are for storing transaction histories. When the network client 210 contacts the network server 10, the network client 210 will use data from the old client table 291 for authentication. The network client 210 sends the old client table label 296 with in the first client data packet 212. The network server 10 then retrieve the old server table 91 that is associated with that network client 210 to verify the network client 210 at the start of the communications. The network server 10 and the network client 210 communication will be described in more detail later.

Figure 23:
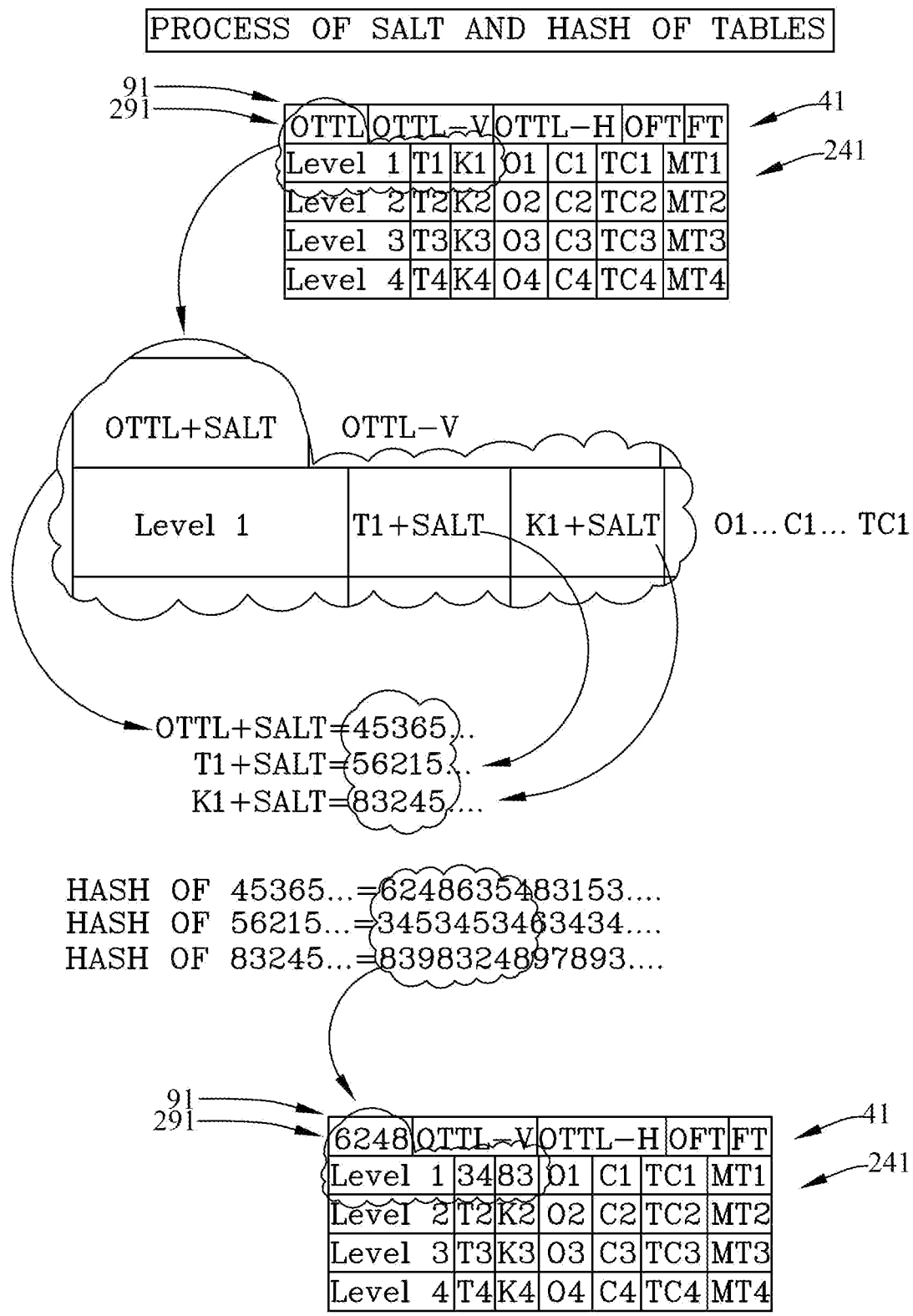
FIG. 23 illustrates the process of hashing newly created tables with device assigned salt creating a unique table for a particular device.

FIG. 23 shows the process that the network server 10 and the network client 210 uses to customize the old server table 91 and the old client table 291, respectively. This customization process involves taking the server table objects 41 values in a default old server table 91 and adding a salt value to the server table objects 41. The result of the default old server table 91 and salt value are then hashed. The hashed values are then saved in the server table objects 41 of the old server table 91. This process is also completed by the network client 210 and the exact same process resulting identical server table objects 41 and client table objects 241 in the network server 10 and the network client 210, respectively.

Figure 24:
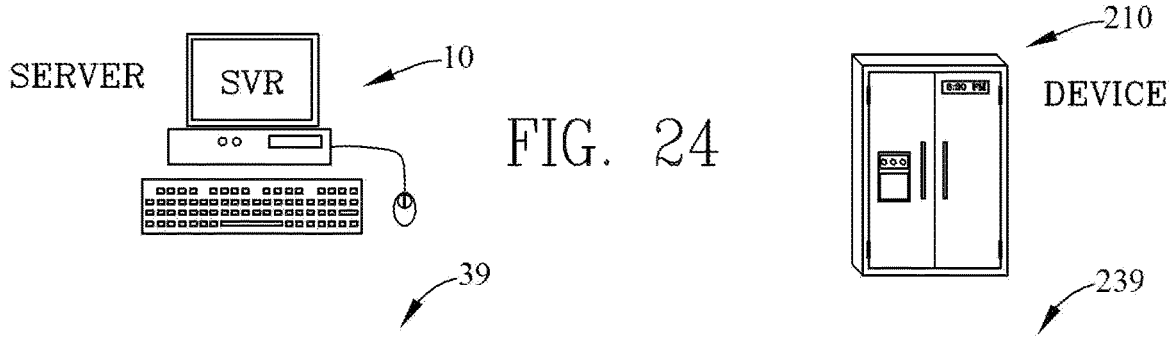
FIG. 24 shows the equivalent tables saved on both the HIDDIN server and a newly manufactured device after hashing.

FIG. 24 is similar to FIG. 22 except the FIG. 24 shows the server tables 40 and client tables 240 used by the network server 10 and the network client 210, respectively, after the server tables 40 and client tables 240 have been hashed.

During the communication between the network server 10 and the network client 210 both will be working from their respective old server table 91 and old client table 291 while updating the respective new server table 90 and new client table 290. The updating and use of the null server table 94, the null client table 294, the history server table 93, the history client table 293, the past server table 92 and the past client table 292 will be described in more detail later.

Figure 25:
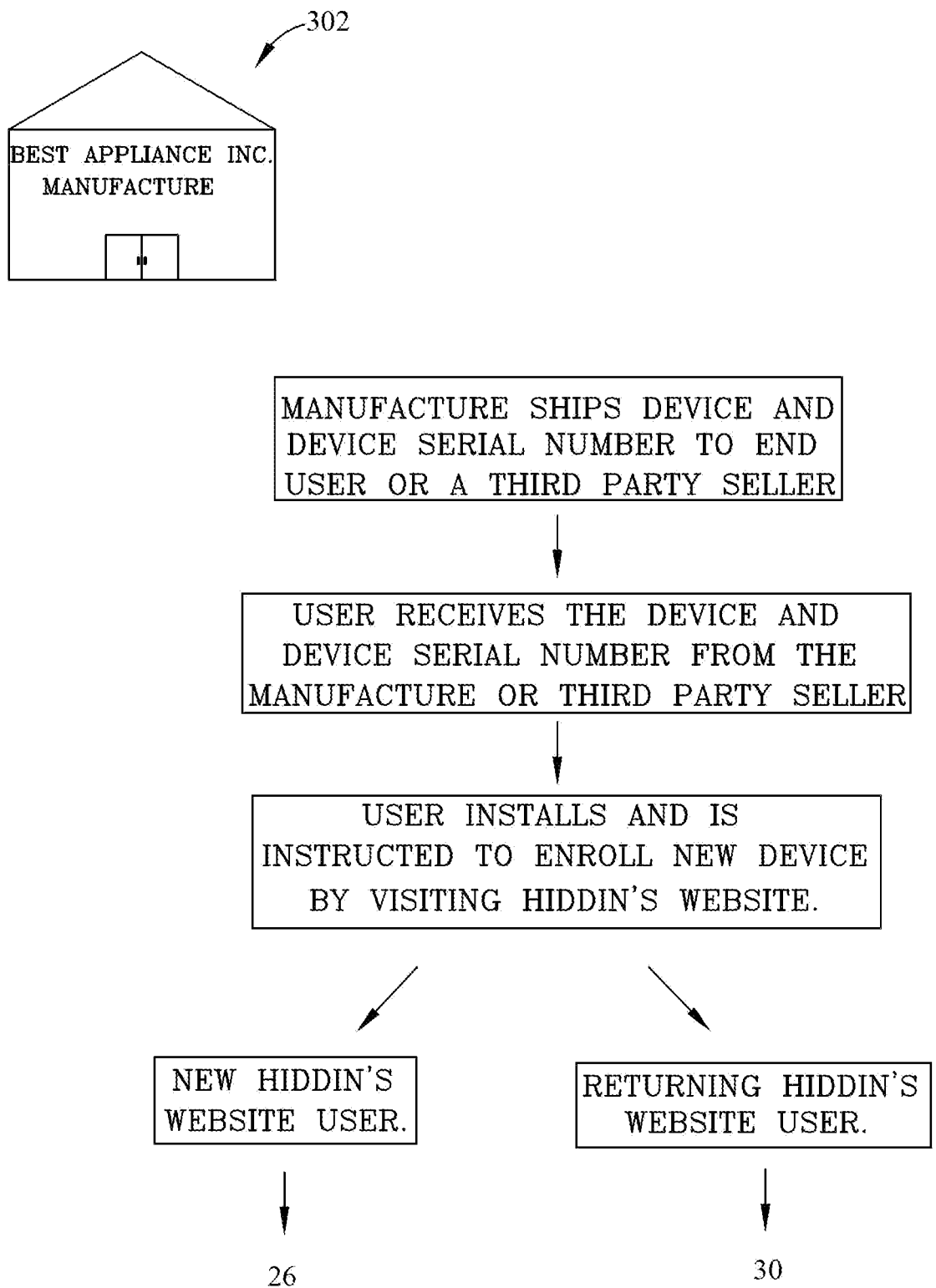
FIG. 25 starts the illustration of how the end-user obtains the device from the manufacture or reseller and begins the process of installing whether they are new to HIDDIN or a returning HIDDIN user.

In FIG. 25 illustrates the steps the end-user needs to follow in order to active the new device on the HIDDIN network. Once the device is manufactured and purchased by the end-user, the end-user will either need to create and account on the HIDDIN website or login to their account on the HIDDIN website 310 if they are an existing user. More about the account creation is described in figures FIG. 26-28. If the end-user is already an exiting user within the HIDDIN network they would just log into their account as described in FIG. 29.

Figure 29:
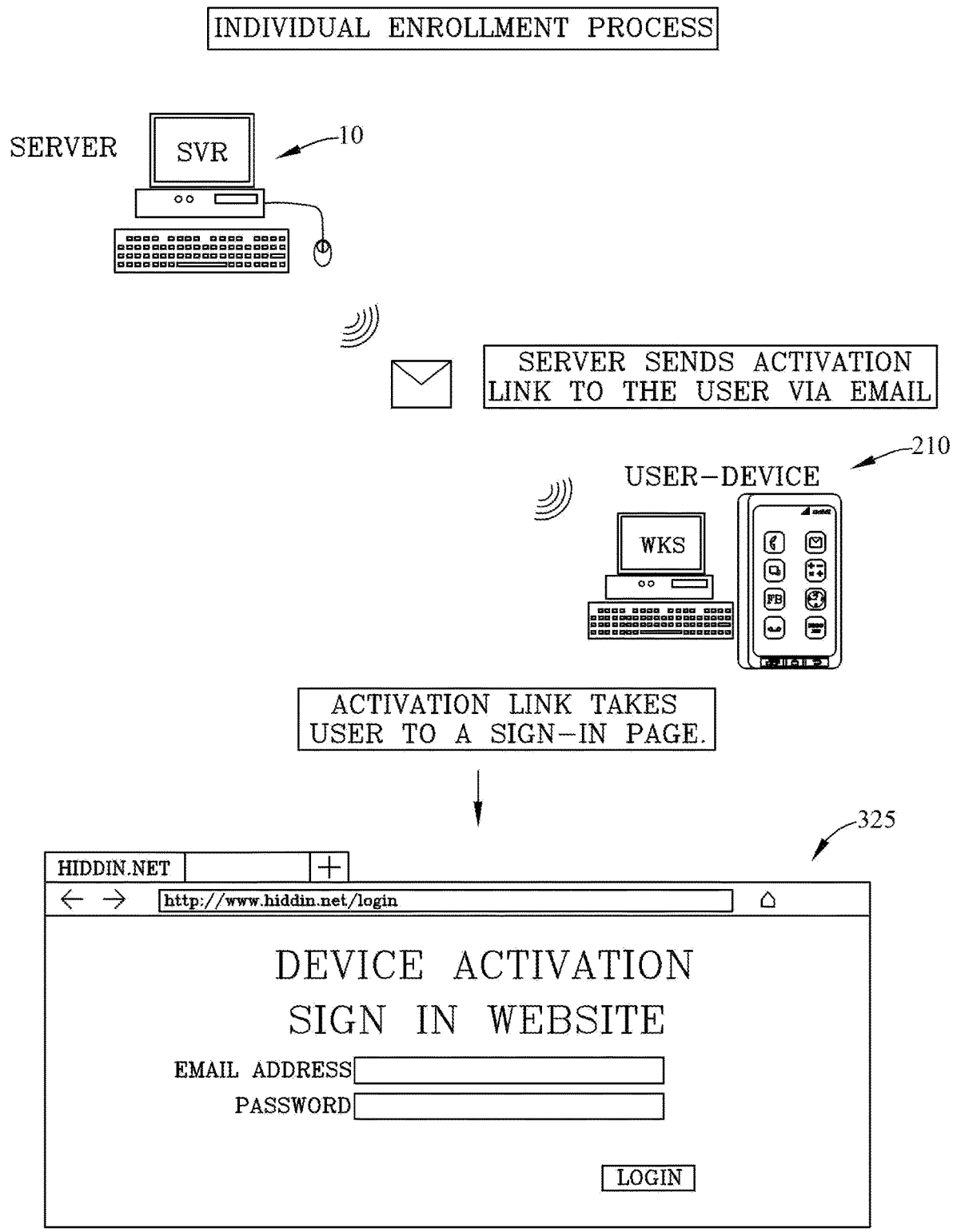
FIG. 29 illustrations the HIDDIN server sending the email to continue end-user activation and the result of the end-user clicking on a link within the sent email.

The beginning of the end-user creating an account within HIDDIN network on the HIDDIN website 310 is best shown starting with FIG. 26. The HIDDIN enrollment website 318 asks the new end-use various questions that would identify the end-user, end-user's contact information and questions to be answered in the event that the end-user forgets their login credentials. The end-user would later be asked for billing information, shown in FIG. 27, that will be used to bill the end-user for the services provided by HIDDIN network and help independently verify the end-users identity. The billing website 323 collects either the end-user's savings or checking account information. After filling in the required information, the end-user will upload a check image file associated with their savings account or checking account. After the end-user uploads and submits the check image and required information, the end-user will be forwarded to a thank you website 324 shown in FIG. 28. This thank you website 324 also notifies the end-user that an email has been sent to their email account. If the end-user does not receive the email, the thank you website 324 offers the ability to resend the email. FIG. 29 shows the HIDDIN server sending the email to the end-user with an activation link. The activation link will direct the end-user to the login page 325.

Figure 30:
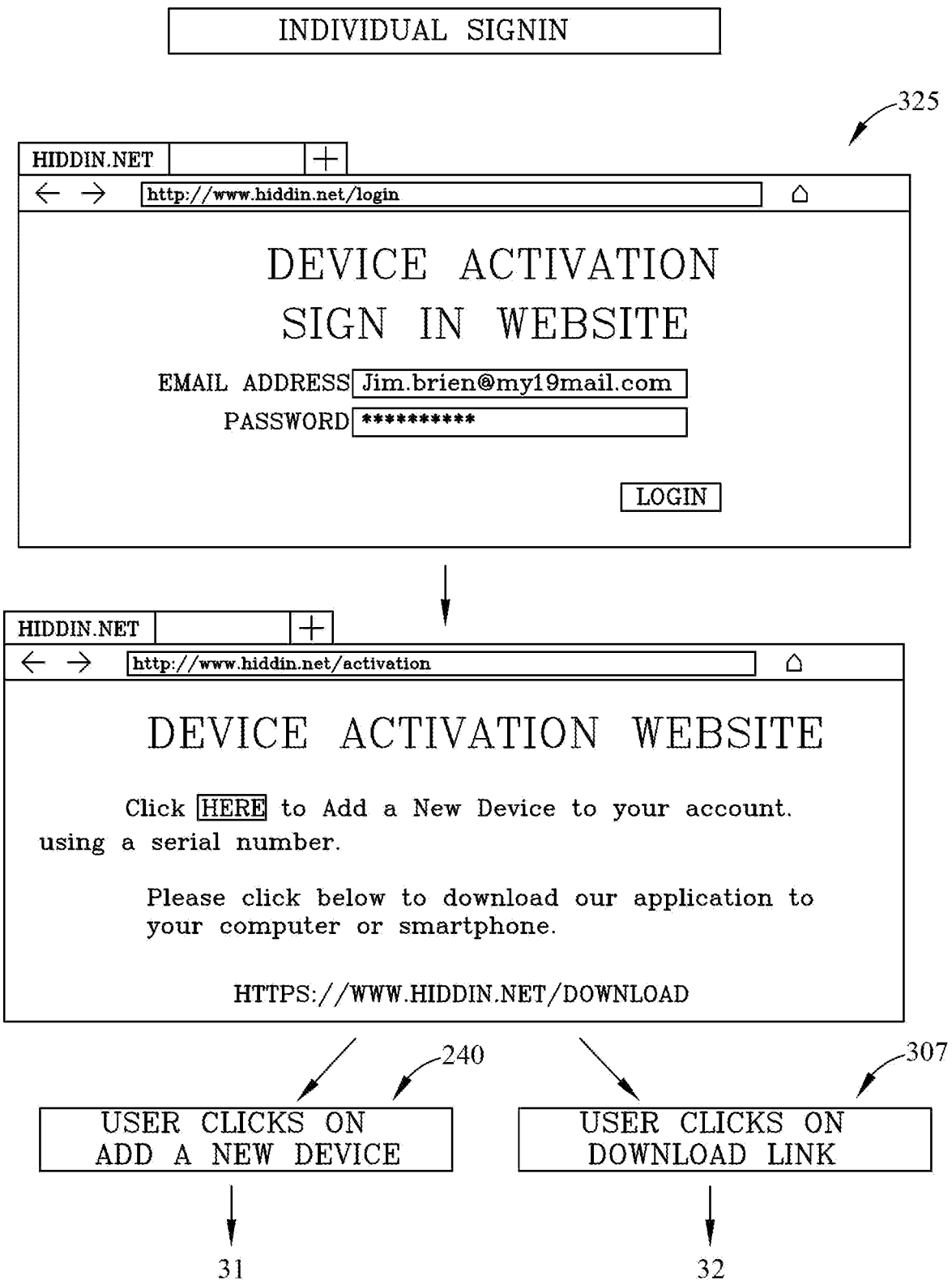
FIG. 30 shows the end-user login page and then the option to add a new device to their account or download software to be used on an existing device.
Figure 31:
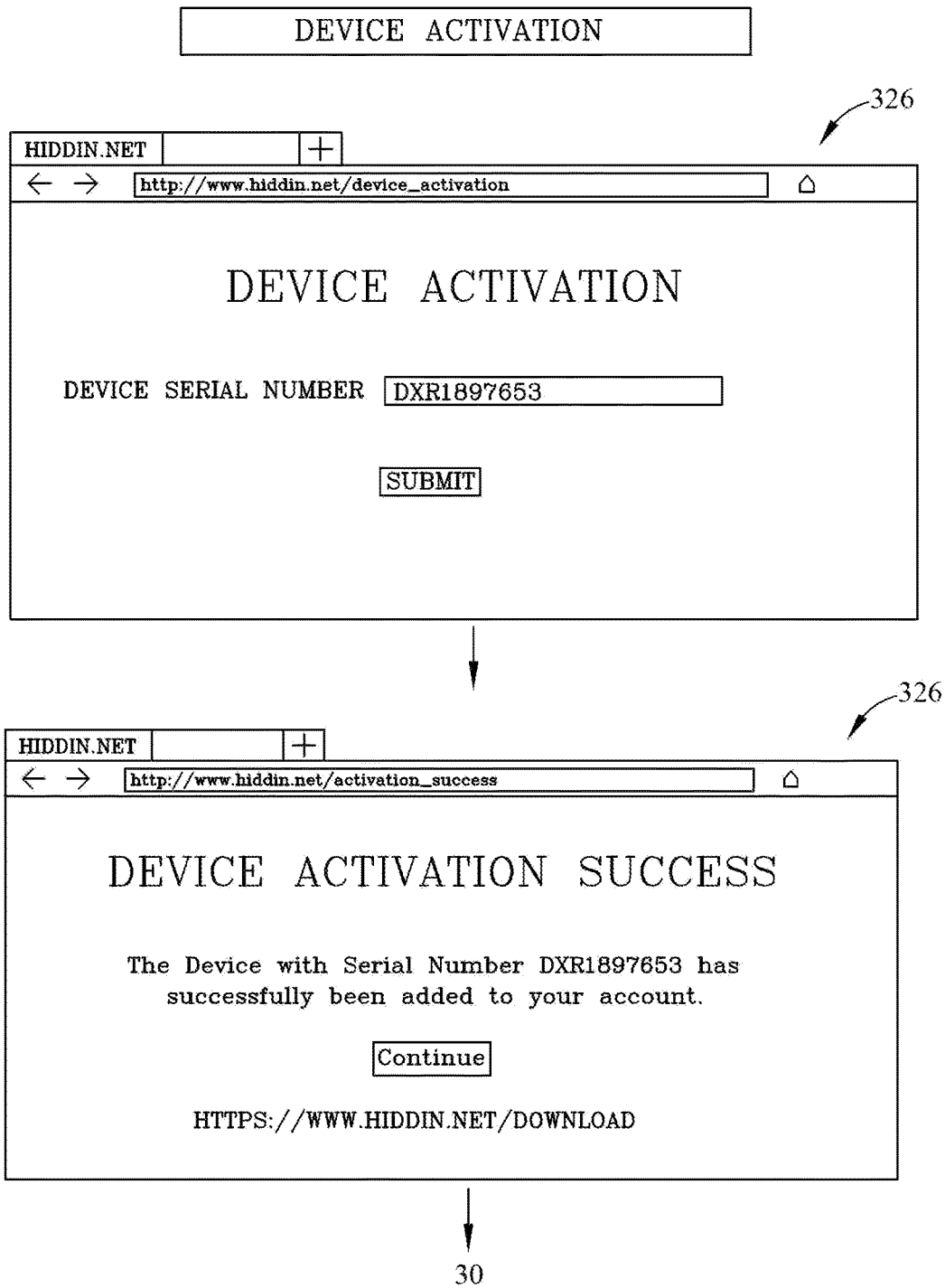
FIG. 31 shows what the end-user is presented when add new device was selected in FIG. 30, the end-user inputs the serial number of the device and hits submit, the server then display successfully added if the serial number was found.
Figure 32:
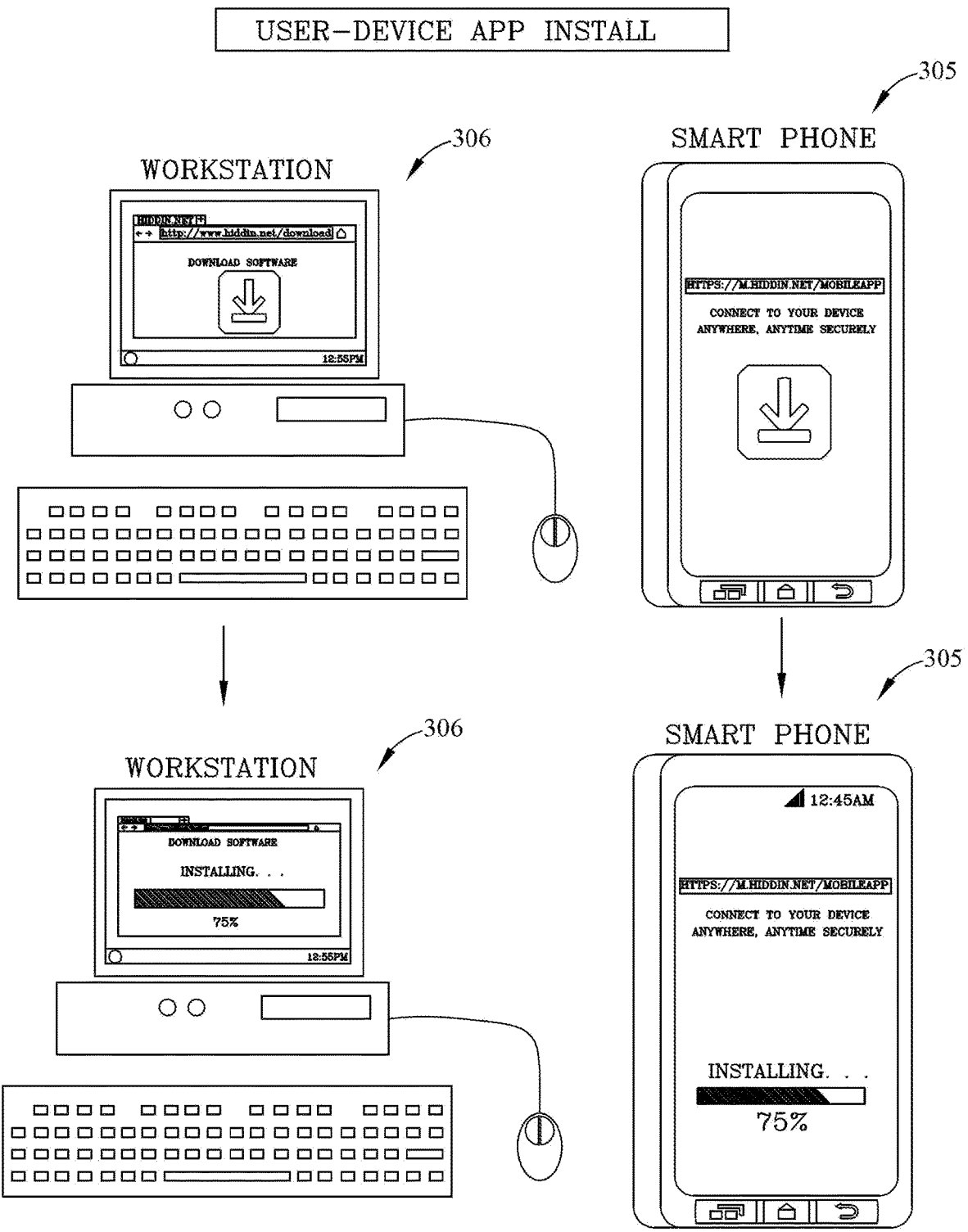
FIG. 32 illustrations when the end-user selected download HIDDIN software and then installing the software to an existing device.
Figure 33:
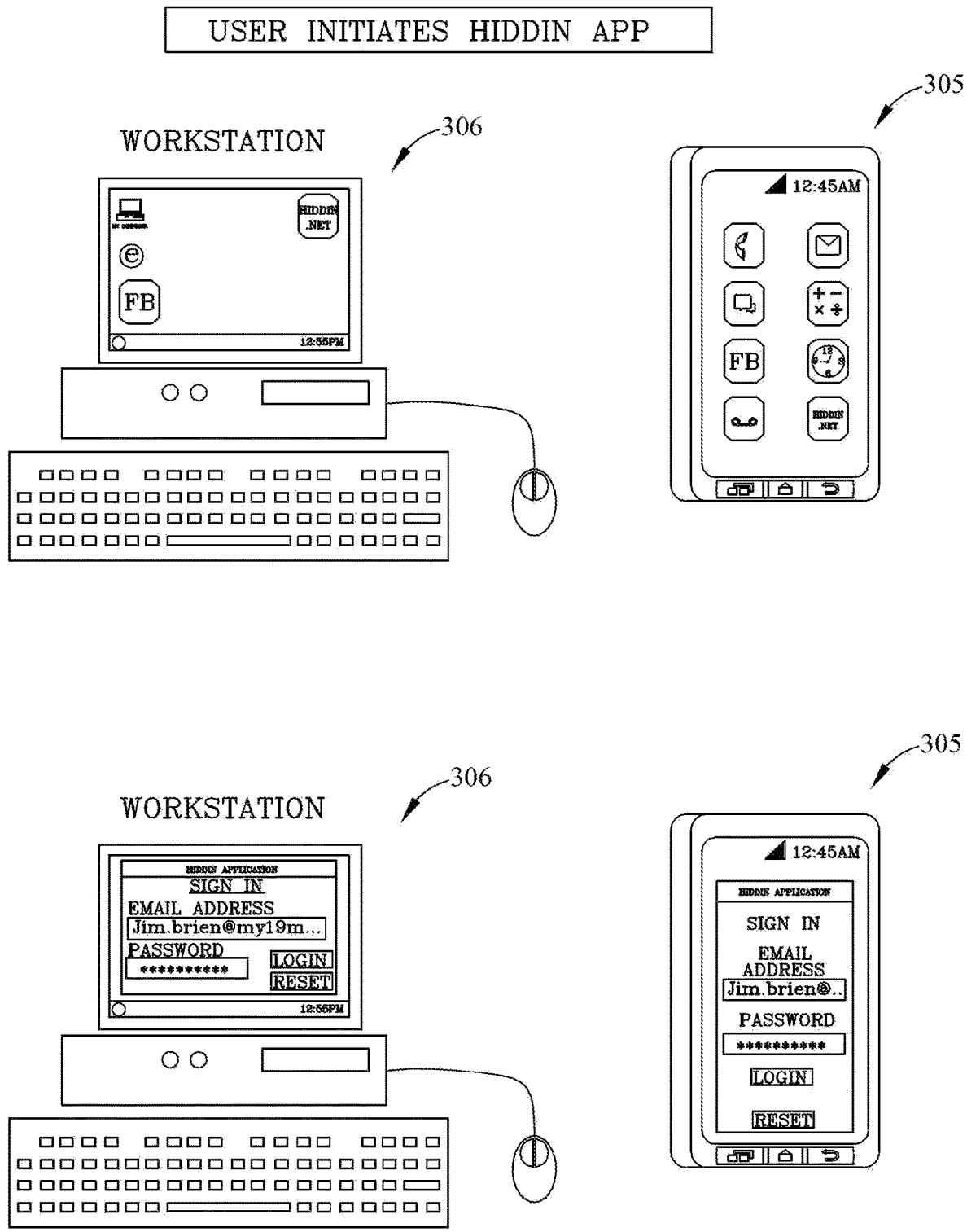
FIG. 33 shows the software after installation and the login prompt for launching the software.

The end-user logs in to the HIDDIN server, shown in FIG. 30, and is then asked if the end-user wants to activate a new device or download software to install onto a new user-device 307. If the user bought a device that came pre-installed with the client tables 240, the user would only need to activate the device as shown in FIG. 31 as an activation website 326. If the end-user wants to download and install the software to an existing user-device 307, such as a workstation 306 or smart phone 305, then the end-user would install the software as shown in FIG. 32. Back to FIG. 31, the end-user enters in the serial number of the new device to be applied to the end-user's account on the HIDDIN network. Because the device and serial number was entered to the HIDDIN server 10 by the manufacture 302 during manufacturing or installation, the end-user entering the serial number during the device activation page only associates the device to the end-user's HIDDIN account. FIG. 32 shows the end-user or even a manufacture or reseller installing the software to a user-device 307 being a workstation 306 or a smart phone 305. Once the software is installed, as shown in FIG. 33, the end-user can now log into their HIDDIN account and activate the user-device 307.

A device 304 and a user-device 307 are setup and activated on the HIDDIN network can now take advantage of the present invention of reciprocal authentication of digital transmission and method. To start the process, the network client 210 used for identifying, authenticating, sending and receiving data from a network server 10 sends out a client time sync packet 211 that requests the current time from a network server, as shown in FIG. 34. The network server 10 replies back with a server report time packet 11 that contains the current time of network server 10. The current time will be used to for updating a client flag time 246 and used in the first client data packet 212. The updating of the client flag time 246 and the first client data packet 212 will be discussed later.

Figure 35:
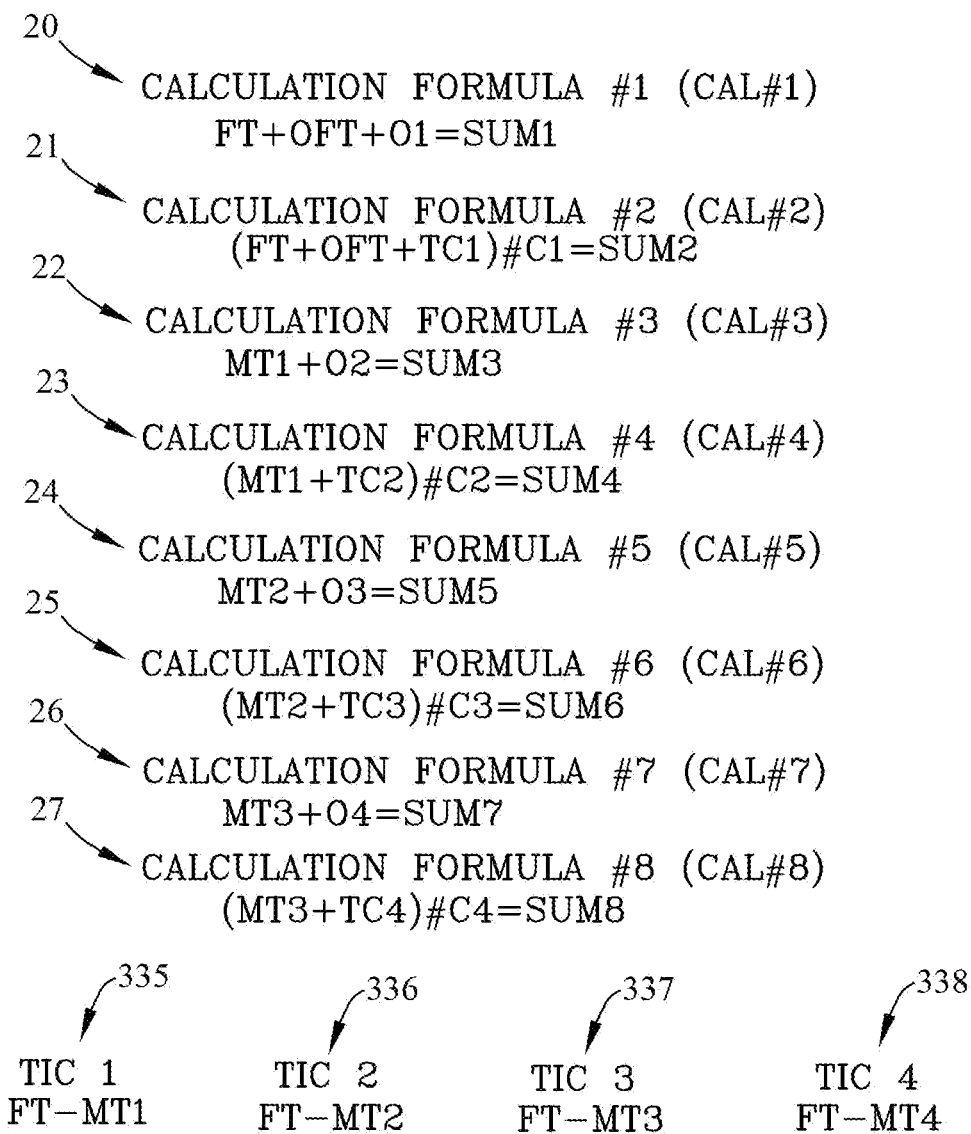
FIG. 35 shows a default table and the first half of formulas used in the present invention.
Figure 36:
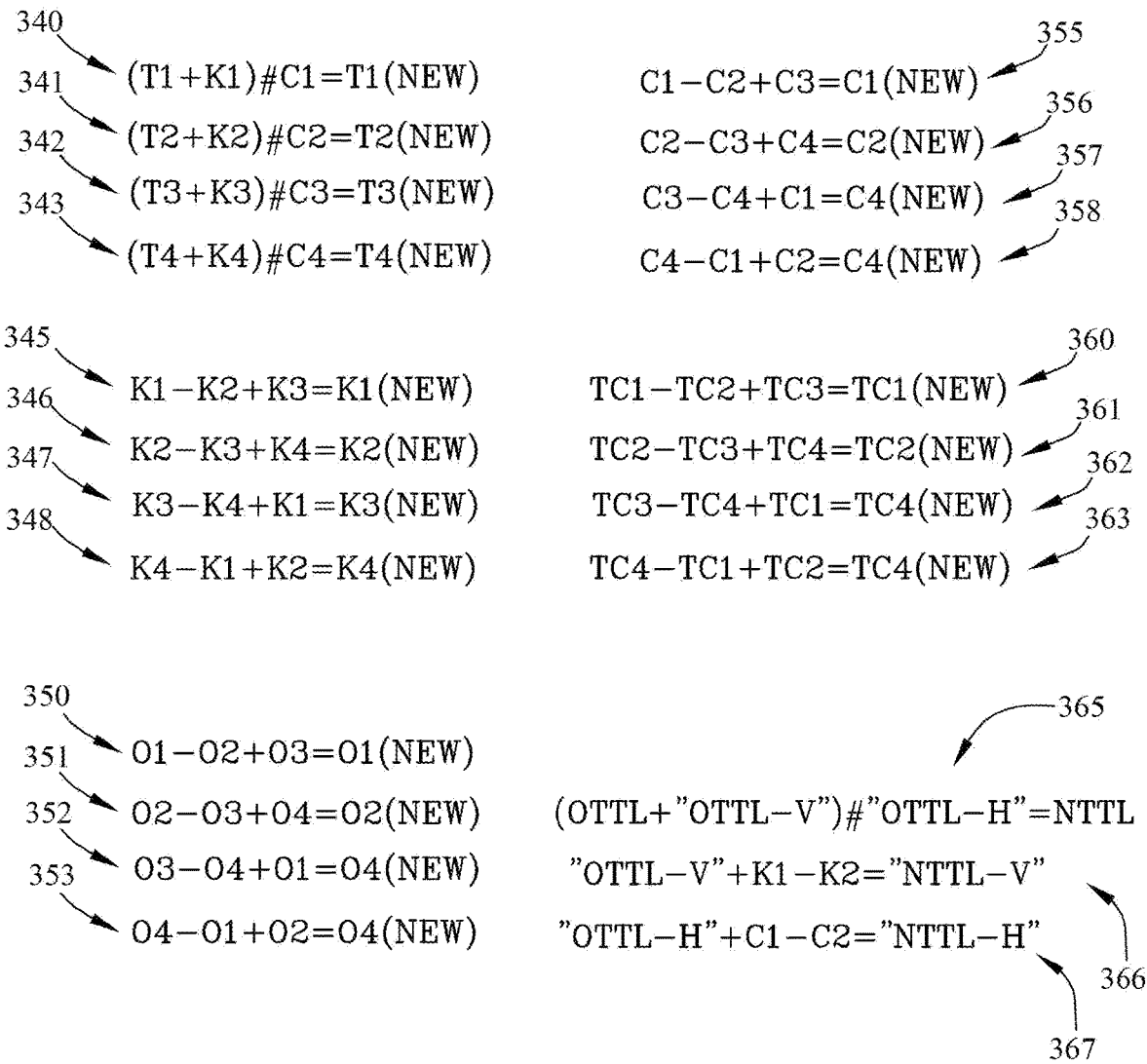
FIG. 36 shows a default table and the second half of formulas used in the present invention.

It is best to show the set of formulas that will be used thought out the present invention. The first set of formulas that will be used are shown in FIG. 35. These formulas include a first arithmetic formula 20, a second arithmetic formula 21, a third arithmetic formula 22, a fourth arithmetic formula 23, a fifth arithmetic formula 24, a sixth arithmetic formula 25, a seventh arithmetic formula 26, and an eighth arithmetic formula 27 that are stored on both the network server 10 and the network client 210. These formals use data from the tables to derive the sum of the equations. Only the sum of these formulas will be sent in data packets, therefore the data that was used in the formula is considered concealed. At the bottom of FIG. 35 there are four time interval equations that will be used to determine if the time it took for the packet to leave the sending peer and to arrive at the receiving peer was within an expected time. This expected time is to average the latency of the network and determine if a possible man in the middle attack is in progress. The time interval equations consist of a first time interval equation 335, a second time interval equation 336, a third time interval equation 337 and a fourth time interval equation 338. The second set of formulas that will be used thought out the present invention are shown in FIG. 36. These formulas are used when the network server 10 and network client 210 convert old server tables 91 to new server tables 90 and old client tables 291 to new client tables 290, respectively, which will be shown later starting in FIG. 47.

In FIGS. 37-41 shows the process of the network client 210 creating a first client data packet 212 that will be sent to the network server 10, the network server 10 checking the first client data packet 212, the network server 10 updating the old server table 91 with values from the first client data packet 212, and finally verify that the network client 210 is truly the network client 210 it says it is.

Figure 37:
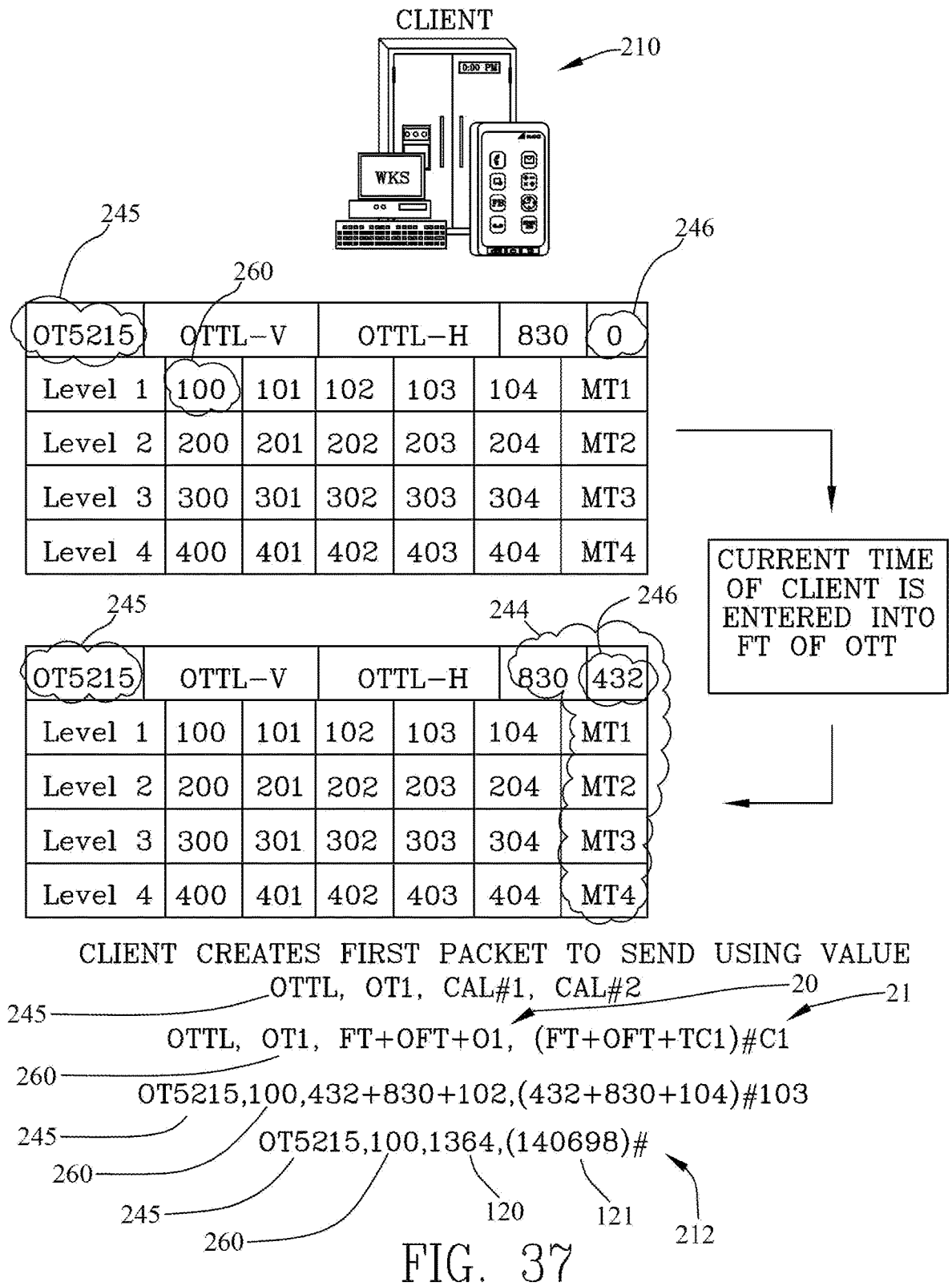
FIG. 37 is an illustration of the network client updating the working table with the current time and preparing to send the first client data packet.

In FIG. 37 the network client 210 first updates the local time with the time it received from the network server 10 within the server report time packet 11, and inserts the local time into the client flag time 246. The client flag time 246 is a data field within the old client table 291 and is used to track the session start time for the communication between the network server 10 and the network client 210. As explained earlier in FIG. 2, the old client table 291 is broken down into three groups, client label group 242, a client data group 243 and a client time group 244. The client flag time 246, for example, is part of the client time group 244. The network client 210 after updating the client flag time 246 begins creating the first client data packet 212 that will be sent to the network server 10. The network client 210 assembles the packet using data from the old client table 291, the data in the client table label 245, first client level value 260, the sum of the first arithmetic formula 20, and the sum of the second arithmetic formula 21. The bottom of FIG. 37 show how the network client 210 compiles the first client data packet 212. The first client data packet 212 is compiled by using first the client table label 245, then the first client level value 260, then the first arithmetic sum 120 and finally the second arithmetic sum 121. To clarify the first arithmetic sum 120 is derived from the first arithmetic formula 20, and the second arithmetic sum 121 is derived from the second arithmetic formula 21.

Figure 38:
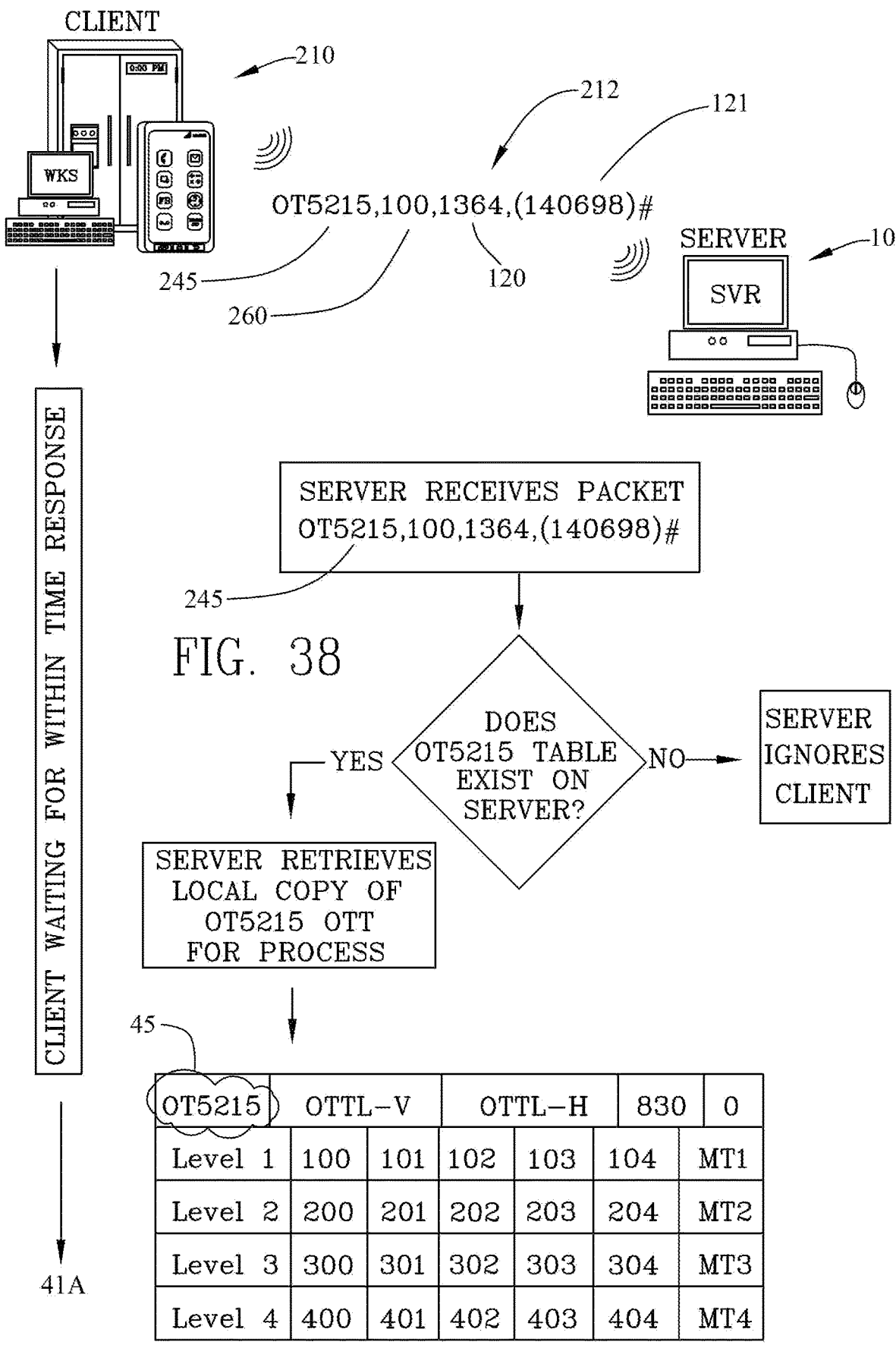
FIG. 38 illustrates the network client sending the first client data packet to the network server, then waiting for a response, and the network server retrieving the correct server table, if existing, for the particular client based on the common table label.

FIG. 38 shows the network client 210 sending the first client data packet 212 to the network server 10. After the network client 210 sends the first client data packet 212, the network client 210 waits a set time for a reply from the network server 10. The network client 210 waits the set time or receives the response shown later in FIG. 41. When the network server 10 receives the first client data packet 212, the network server 10 determines if an old server table 91 exists for that network client 210. If no old server table 91 exists for that network client 210, the network server 10 ignores further communications with that network client 210. If an old server table 91 exists for that network client 210, the network server 10 retrieves the local copy of the old server table 91 matching that network client 210.

Figure 39:
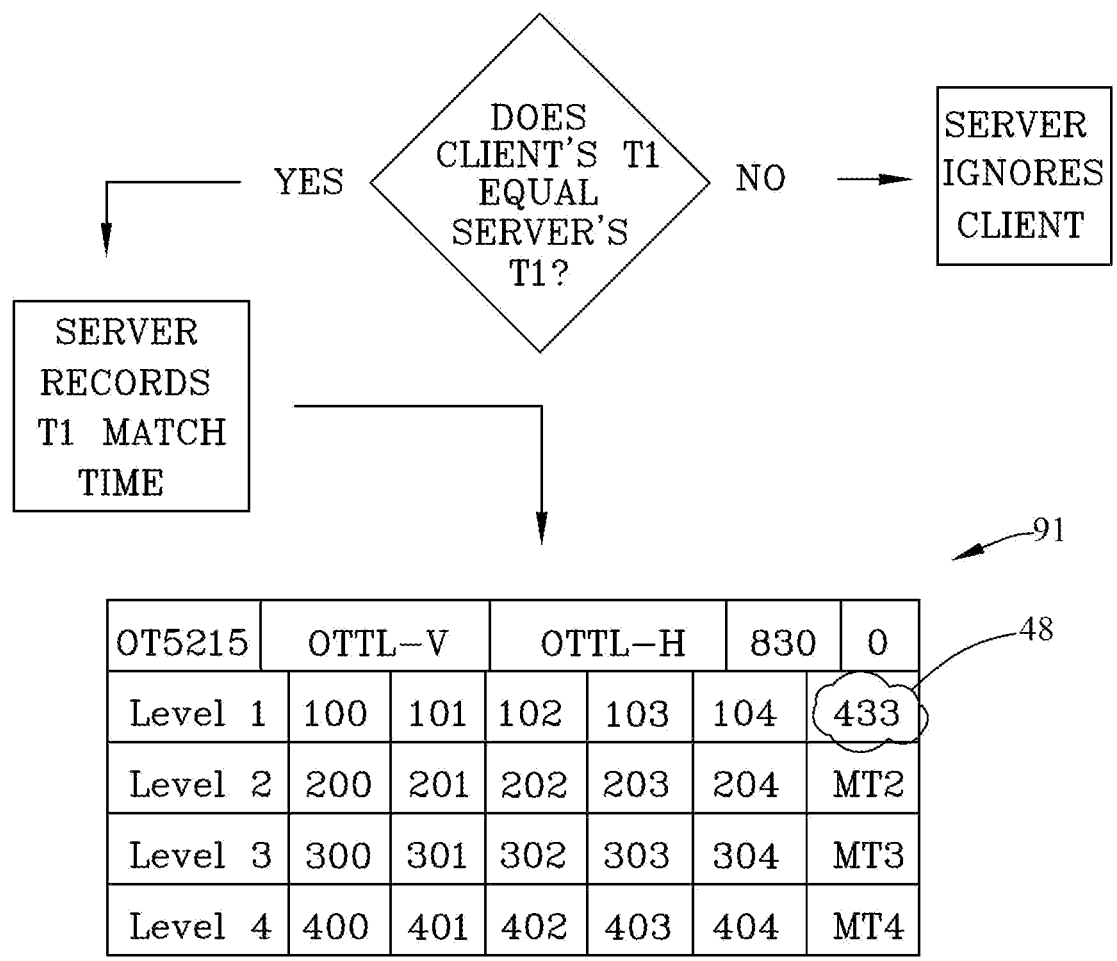
FIG. 39 shows the network server verifies the client table level value is equivalent with the server table level value and records the time they match as the first server Match Time or MT1.

In FIG. 39 the network server 10 obtains the first client level value 260 from the first client data packet 212 and then determines if the first client level value 260 matches the first server level value 60. If the first client level value 260 does not match the first server level value 60, the network server 10 ignores further communication from the network client 210. If the first client level value 260 matches the first server level value 60 the network server 10 records a server match time 48, shown as MT1.

Figure 40:
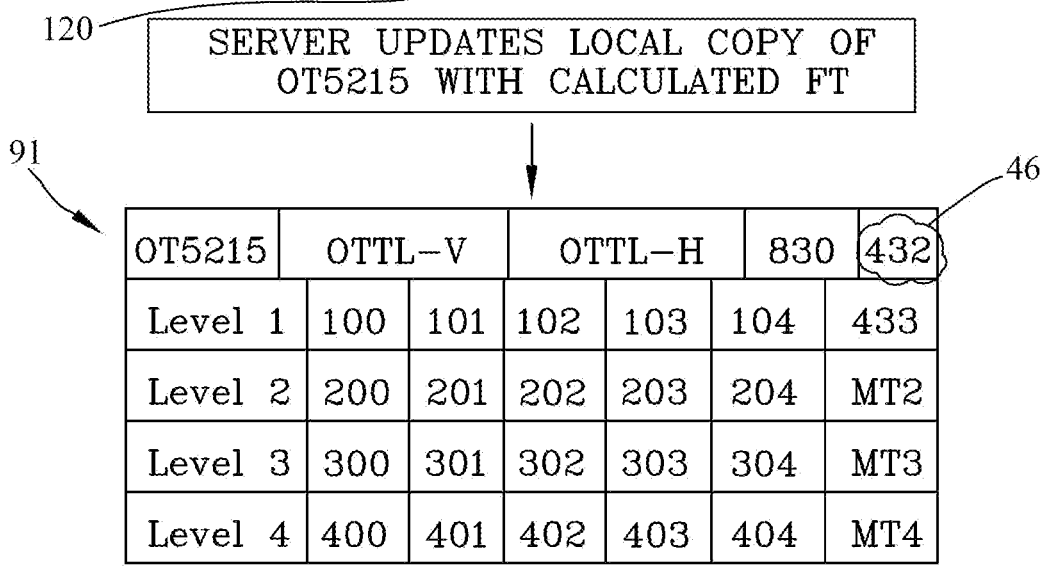
FIG. 40 illustrates the network server using the first client data packet and calculations to update the flag time within the local server table.
Figure 41:
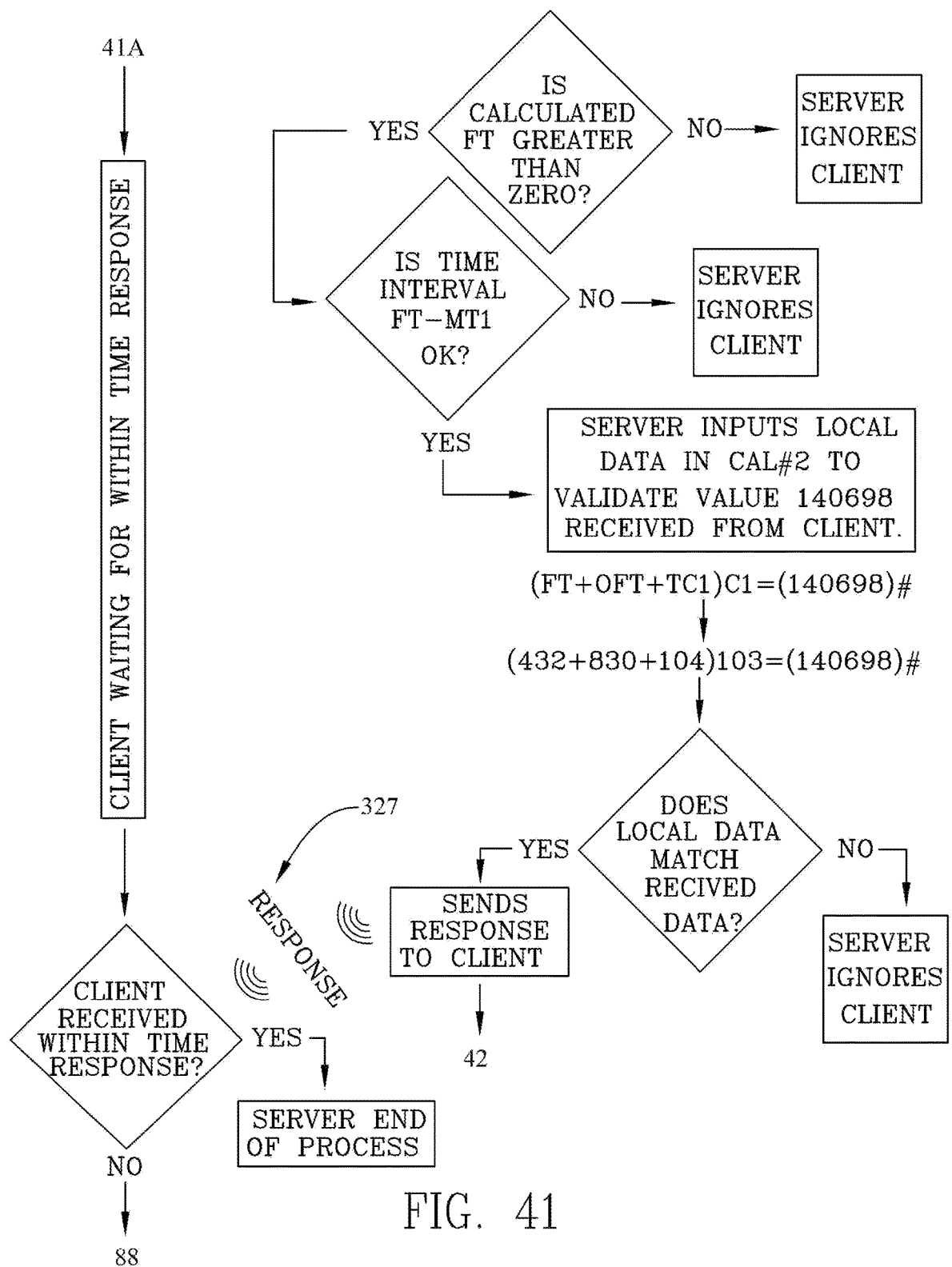
FIG. 41 illustrates the network server further verifies the identity of the network client and sends response if successfully verified.

As shown in FIG. 40, the network server 10 then takes the first arithmetic som 120 found in the first client data packet 212 to ultimately obtain the client flag time 246 of the network client 210. The network server 10 finds the client flag time 246 by setting known old server flag time 47, the first server time offset value 68 and the first arithmetic sum 120 found in the first client data packet 212 into the first arithmetic formula 20 to solve for client flag time 246. After finding the client flag time 246, the network server 10 takes that value and saves it into the server flag time 46 in the old server table 91.

The network server 10 then verifies that the calculated value of the client flag time 246 is greater than zero. Shown in FIG. 41, if the calculated value of client flag time 246 is zero, then the network server 10 knows an error has occurred and ignores further communications with the network client 210. If the calculated value of the client flag time 246 is greater than zero, the network server 10 then checks the time it took for the first client data packet 212 to leave the network client 210 and arrive to the network server 10 by using the first time interval equation 335. If first time interval equation 335 sums to a value not within expected value, the network server 10 determines that the first client data packet 212 took longer than expected and the network server 10 ignores further communications with the network client 210. If the first time interval equation 335 sums to a value that is within expected limits, the network server 10 determines that the first client data packet 212 arrived with no man in the middle attack. The network server 10 then begins to verify that the network client 210 is truly the network client 210 it says it is. To verify the network client 210, the network server 10 inserts values from the old server table 91 into the second arithmetic formula 21 and produces a sum for that equation. If the network server's 10 sum of that equation equals the sum for the second arithmetic formula 21 in the first client data packet 212 that mathematically proves the network client's 210 identity to the network server 10. The network server 10 will then send the network client 210 a response and then start to prepare a first server data packet 12. If, however, the network server's 10 sum of that equation does not equal the second arithmetic sum 121 in the first client data packet 212, the network server 10 ignores further communications with the network client 210.

In FIGS. 42-46 are similar to FIGS. 37-41 except FIGS. 42-46 shows the process of the network server 10 creating a first server data packet 12 that will be sent to the network client 210, the network client 210 checking the first server data packet 12, the network client 210 updating the old client table 291 with values from the first server data packet 12, and finally verifying that the network server 10 is truly the network server 10 it says it is.

In FIG. 42 the network server 10 assembles the first server data packet 12 using data from the old server table 91, the data in the server table label 45, second server level value 61, the third arithmetic sum 122, and the fourth arithmetic sum 123. To clarify the third arithmetic sum 122 is derived from the third arithmetic formula 22, and the fourth arithmetic sum 123 is derived from the fourth arithmetic formula 23. After the network server 10 has finished assembling the first server data packet 12, the network server 10 sends the first server data packet 12 and starts the waiting period for a within time response.

Figure 43:
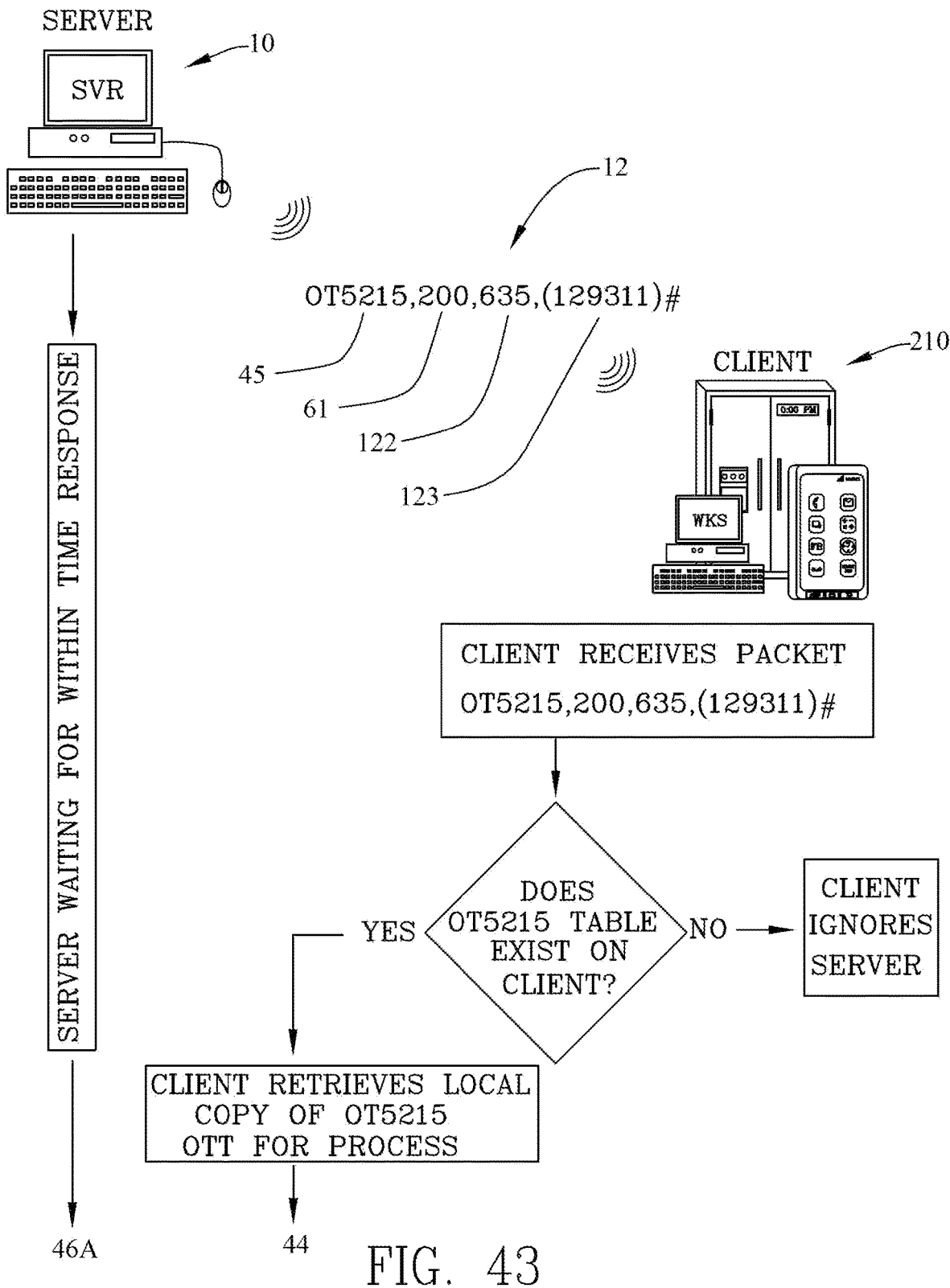
FIG. 43 shows the network server sending the first server data packet to the network client, then waiting for a response, and the network client retrieving local client table label value matching the network server table label value.

FIG. 43 shows the network server 10 sending the first server data packet 12 to the network client 210 and waiting for expected responses from the network client 210. Once the network client 210 receives the first server data packet 12, the network client 210 determines if an old client table 291 exists for that network server 10. If no old client table 291 exists for the network server 10, the network client 210 ignores further communications with the network server 10. If an old client table 291 exists for that network server 10, the network client 210 retrieves the local copy of the old client table 291 matching that network server 10.

Figure 44:
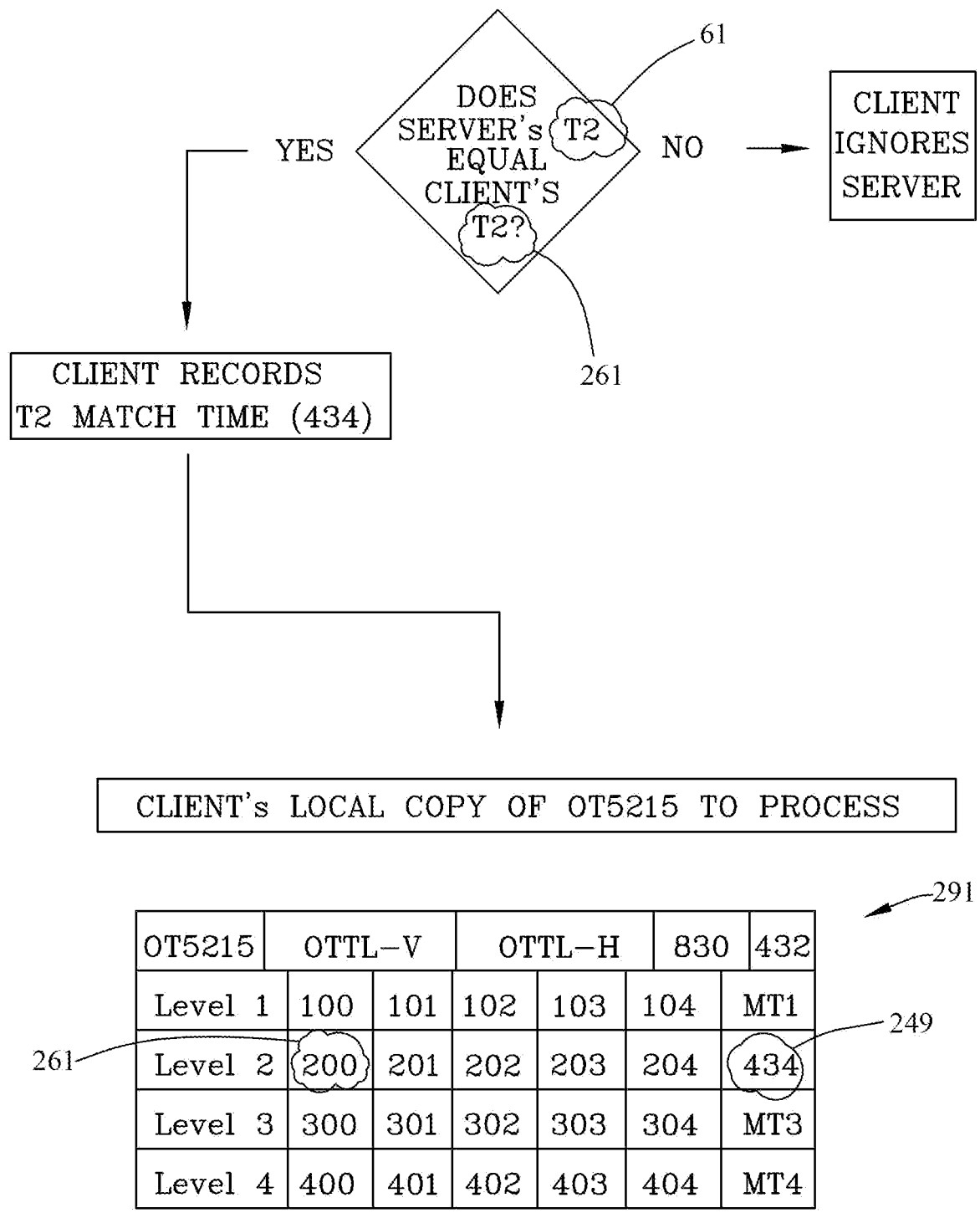
FIG. 44 is similar to FIG. 39 except

In FIG. 44 the network client 210 obtains the second server level value 61 from the first server data packet 12 and then determines if the second server level value 61 matches the second client level value 261. If the second server level value 61 does not match the second client level value 261, the network client 210 ignores further communication from the network server 10. If the second server level value 61 matches the second client level value 261 the network client 210 records a second client match time 249, shown as MT2.

Figure 45:
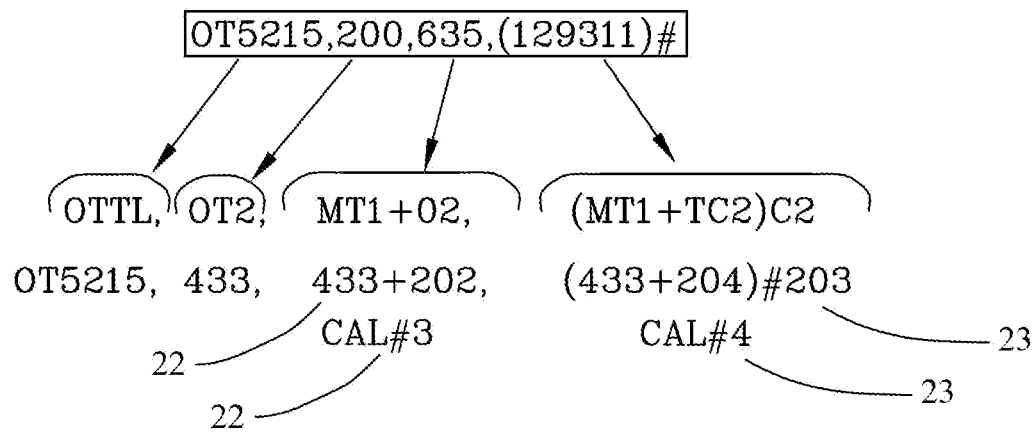
FIG. 45 is similar to FIG. 40 except

As shown in FIG. 45, the network client 210 then takes the third arithmetic sum 122 found in the first server data packet 12 to ultimately obtain the first server match time 48

Shown in FIG. 45, the network client 210 then takes the third arithmetic sum 122 found in the first server data packet 12 to ultimately obtain the first server match time 48, shown as MT1.

The network client 210 then fills in the third arithmetic formula 22 with values from the old client table 291 known to the network client 210 and solving for the first server match time 48 as the variable. After finding the first server match time 48, the network client 210 takes that value and saves it into the first client match time 248 in the old client table 291.

Figure 46:
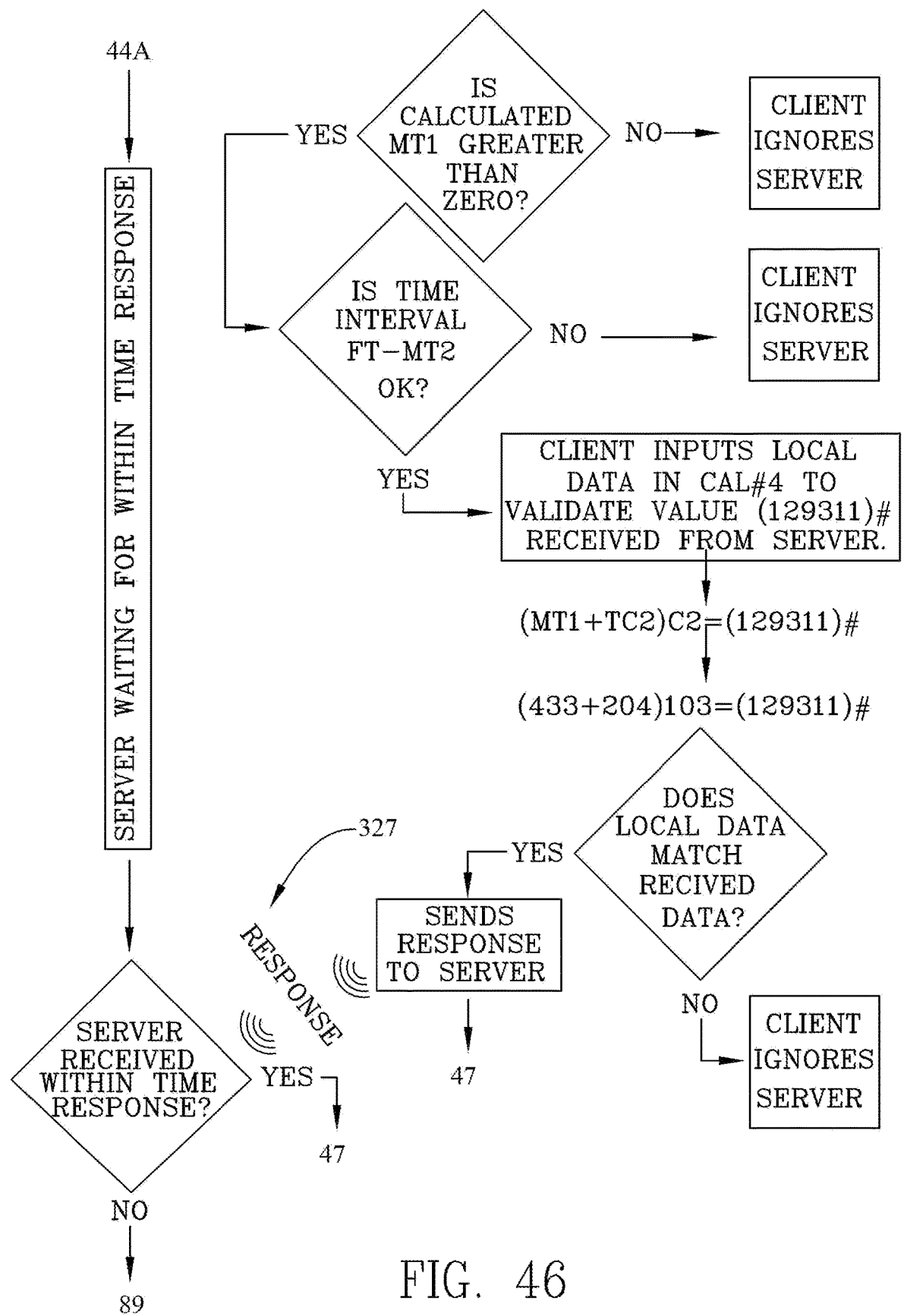
FIG. 46 is similar to FIG. 41 except

Shown in FIG. 46 the network client 210 then verifies that the calculated value of the first server match time 48 is greater than zero. If the calculated value of first server match time 48 is zero, then the network client 210 know an error has occurred and ignores further communications with the network server 10. If the calculated value of the first server match time 48 is greater than zero, the network client 210 then checks the time it took for the first server data packet 12 to leave the network server 10 and arrive to the network client 210 by inserting the client flag time 246 and the newly calculated second client match time 249 into the second time interval equation 336. If the network client 210 determines that the first server data packet 12 took longer than expected, the network client 210 ignores further communications with the network server 10. If the network client 210 determines that the first server data packet 12 arrived within the expected time frame, the network client 210 then begins to verify that the network server 10 is truly the network server 10 it says it is. To verify the network server 10, the network client 210 inserts values from the old client table 91 into the fourth arithmetic formula 23 and produces a sum for that equation. If the network client's 210 sum of that equation equals the sum for the fourth arithmetic formula 23 in the first server data packet 12, the network client 210 will send a response 327 to the network server 10. If the network client's 210 sum of that equation does not equal the sum for the fourth arithmetic formula 23 in the first server data packet 12, the network client 210 ignores further communications with the network server 10.

In FIGS. 47-54 shows the table conversion process. The table conversion process consists of using the second set of formulas shown in FIG. 36 and the data from the old server table 91 to create new values in the new server tables 90. The network client 210 also uses the second set of formulas shown in FIG. 36 and the data from the old client table 291 to create new values in the new client tables 290.

In FIGS. 47-64 both the network server 10 and the network client 210 perform the same procedure to their respective new server table 90 and network client table 290, respectively. Also, both network server 10 and the network client 210 are expected to derive the same resulting values from formula and hashes that are used. It is also important to note that all the formulas and numbers used in these conversions, calculations, and encryption calculations within the present invention are for reference only, there are theoretically an infinite number of formulas and numbers possible that would meet the basic requirements of this invention.

In FIG. 47 the network server 10 derives the first server level value 60, the second server level value 61, the third server level value 62 and the fourth server level value 63 in the new server table 90, by inserting required data from the old server table 91 into the first hashing equation 340, the second hashing equation 341, the third hashing equation 342 and the fourth hashing equation 343, respectively. Likewise, the network client 210 derives the first client level value 260, the second client level value 261, the third client level value 262 and the fourth client level value 263 in the new client table 290, by inserting required data from the old client table 291 into the first hashing equation 340, the second hashing equation 341, the third hashing equation 342 and the fourth hashing equation 343, respectively.

In FIG. 48 the network server 10 derives the first server conversion value 72, the second server conversion value 73, the third server conversion value 74 and the fourth server conversion value 75 in the new server table 90, by inserting required data from the old server table 91 into the first conversion equation 345, the second conversion equation 346, the third conversion equation 347 and the fourth conversion equation 348, respectively. The network client 210 derives the first client conversion value 272, the second client conversion value 273, the third client conversion value 274 and the fourth client conversion value 275 in the new client table 290, by inserting required data from the old client table 291 into the first conversion equation 345, the second conversion equation 346, the third conversion equation 347 and the fourth conversion equation 348, respectively.

Figure 49:
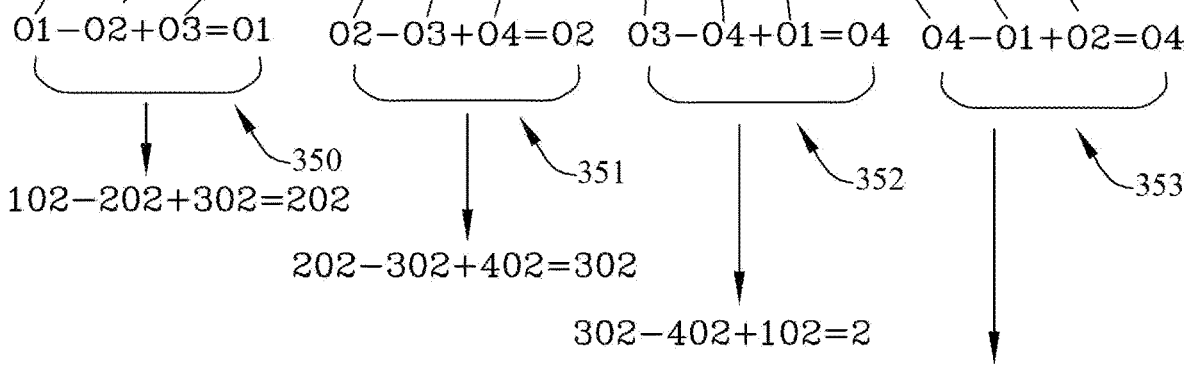
FIG. 49 is similar to FIG. 48 except FIG. 49 the network server and network client use data from multiple fields in the table are used to compute the O column.

In FIG. 49 the network server 10 derives the first server time offset 68, the second server time offset 69, the third server time offset 70 and the fourth server time offset 71 in the new server table 90, by inserting required data from the old server table 91 into the first time offset equation 350, the second time offset equation 351, the third time offset equation 352 and the fourth time offset equation 353, respectively. The network client 210 derives the first client time offset 268, the second client time offset 269, the third client time offset 270 and the fourth client time offset 271 in the new client table 290, by inserting required data from the old client table 291 into the first time offset equation 350, the second time offset equation 351, the third time offset equation 352 and the fourth time offset equation 353, respectively.

Figure 50:
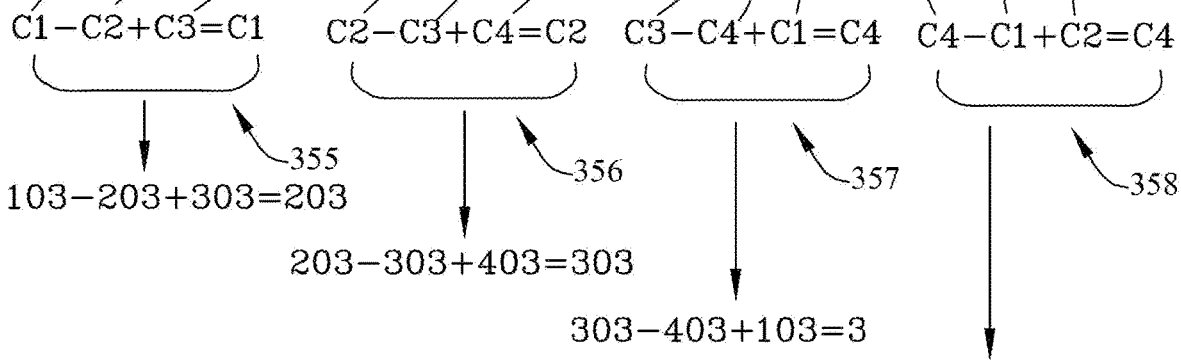
FIG. 50 is similar to FIG. 49 except FIG. 50 the network server and network client use data from multiple fields in the table are used to compute the C column.

In FIG. 50 the network server 10 derives the first server salt value 64 the second server salt value 65, the third server salt value 66 and the fourth server salt value 67 in the new server table 90, by inserting required data from the old server table 91 into the first salt equation 355, the second salt equation 356, the third salt equation 357 and the fourth salt equation 358, respectively. The network client 210 derives the first client salt value 264 the second client salt value 265, the third client salt value 266 and the fourth client salt value 267 in the new client table 290, by inserting required data from the old client table 291 into the first salt equation 355, the second salt equation 356, the third salt equation 357 and the fourth salt equation 358, respectively.

Figure 51:
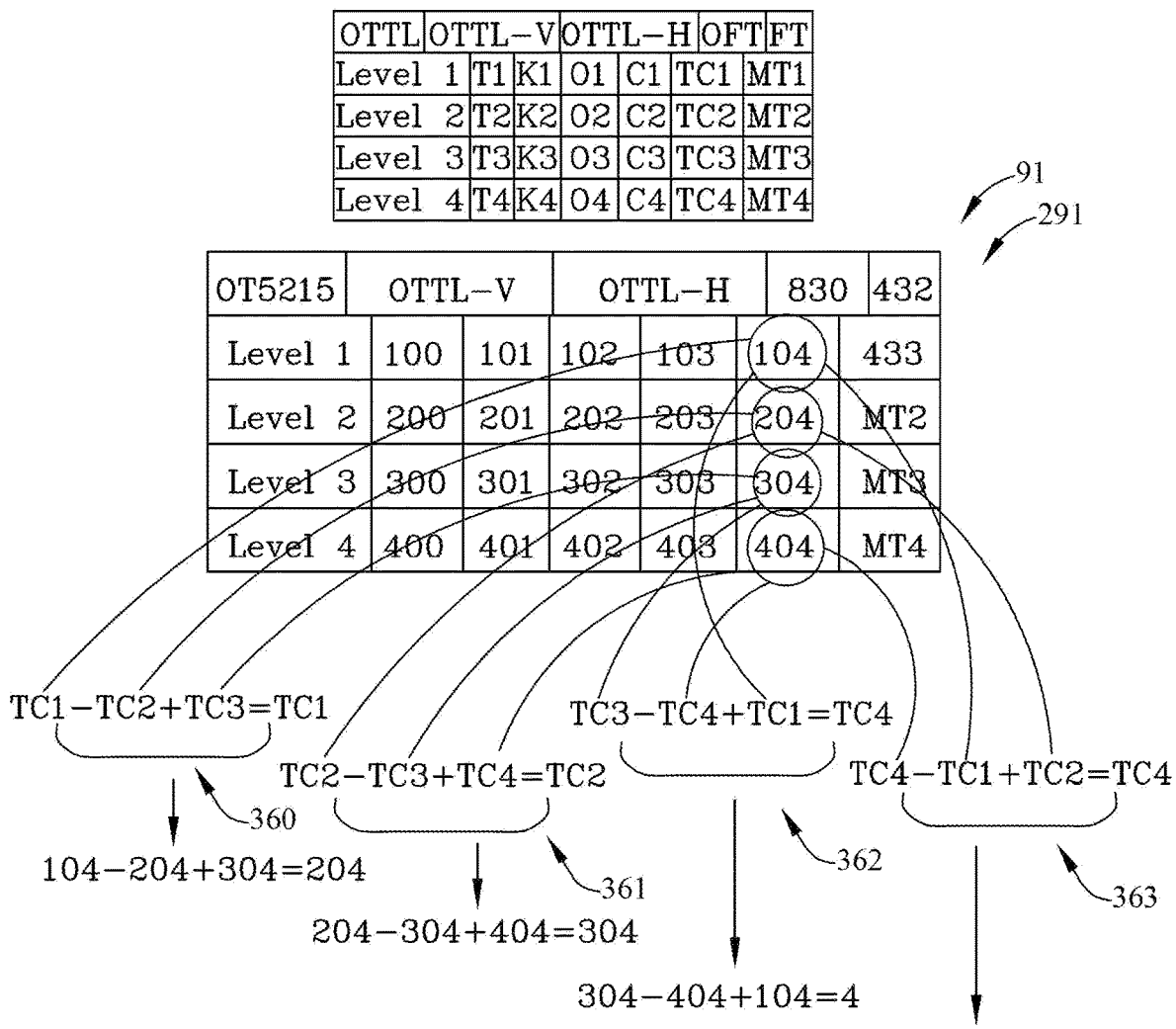
FIG. 51 is similar to FIG. 50 except FIG. 51 the network server and network client use data from multiple fields in the table are used to compute the TC column.

In FIG. 51 the network server 10 derives the first server time value 76 the second server time value 77, the third server time value 78 and the fourth server time value 79 in the new server table 90, by inserting required data from the old server table 91 into the first time equation 360, the second time equation 361, the third time equation 362 and the fourth time equation 363, respectively. The network client 210 derives the first client time value 276 the second client time value 277, the third client time value 278 and the fourth client time value 279 in the new client table 290, by inserting required data from the old client table 291 into the first time equation 360, the second time equation 361, the third time equation 362 and the fourth time equation 363, respectively.

In FIG. 52 the network server 10 derives the new server table value 80 in the new server table 90, by inserting required data from the old server table 91 into the table value equation 366. The network client 210 derives the new client table value 280 in the new client table 290, by inserting required data from the old client table 291 into the table value equation 366.

Figure 53:
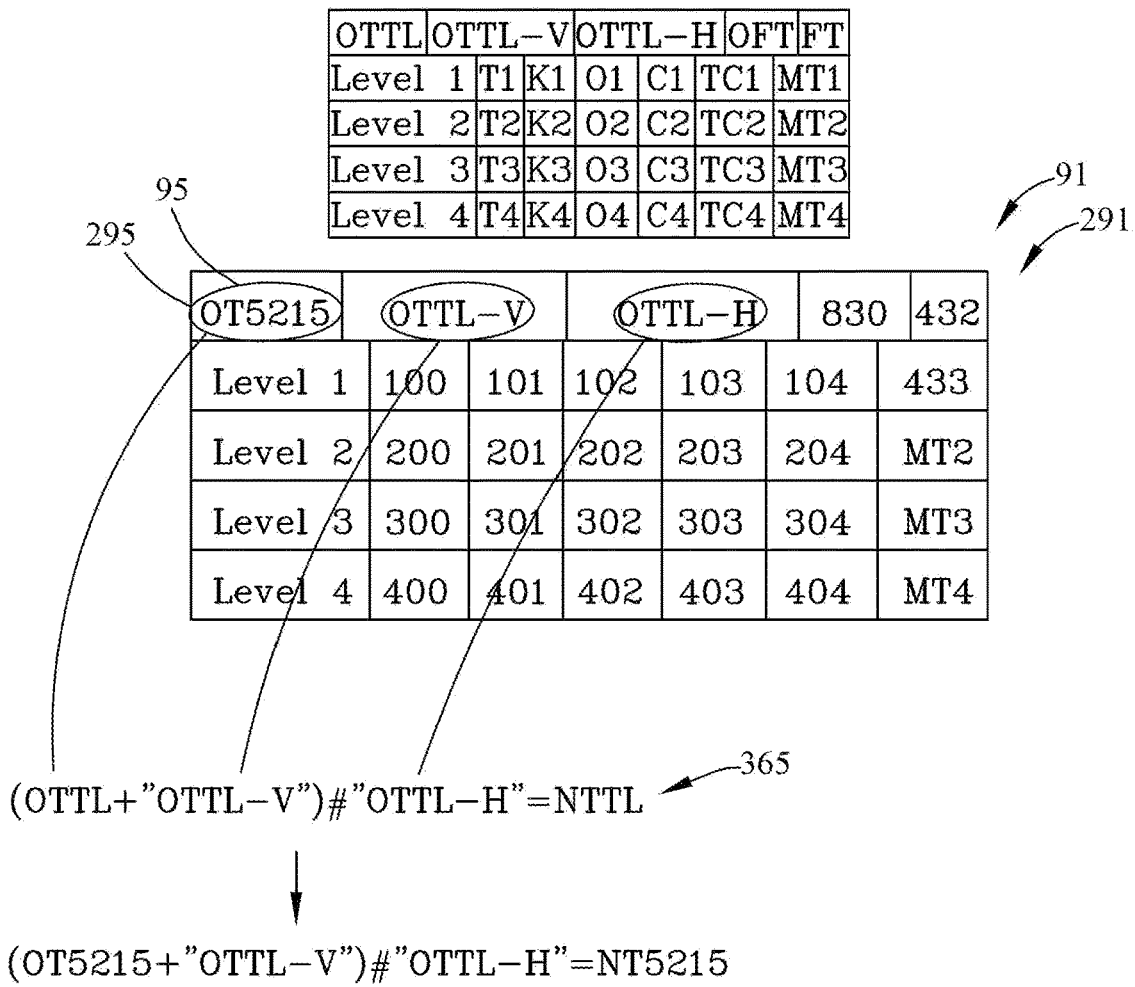
FIG. 53 is similar to FIG. 52 except

In FIG. 53 the network server 10 derives the new server table label 95 in the new server table 90, by inserting required data from the old server table 91 into the table label equation 365. The network client 210 derives the new client table label 295 in the new client table 290, by inserting required data from the old client table 291 into the table label equation 365.

In FIG. 54 the network server 10 derives the new server table hash 85 in the new server table 90, by inserting required data from the old server table 91 into the table hash equation 367. The network client 210 derives the new client table hash 285 in the new client table 290, by inserting required data from the old client table 291 into the table hash equation 367.

After both the network server 10 and the network client 210 complete the table conversion process, the network server 10 and the network client 210 hash the new server table 90 and the new client table 290, respectively, shown in FIG. 55.

Figure 56:
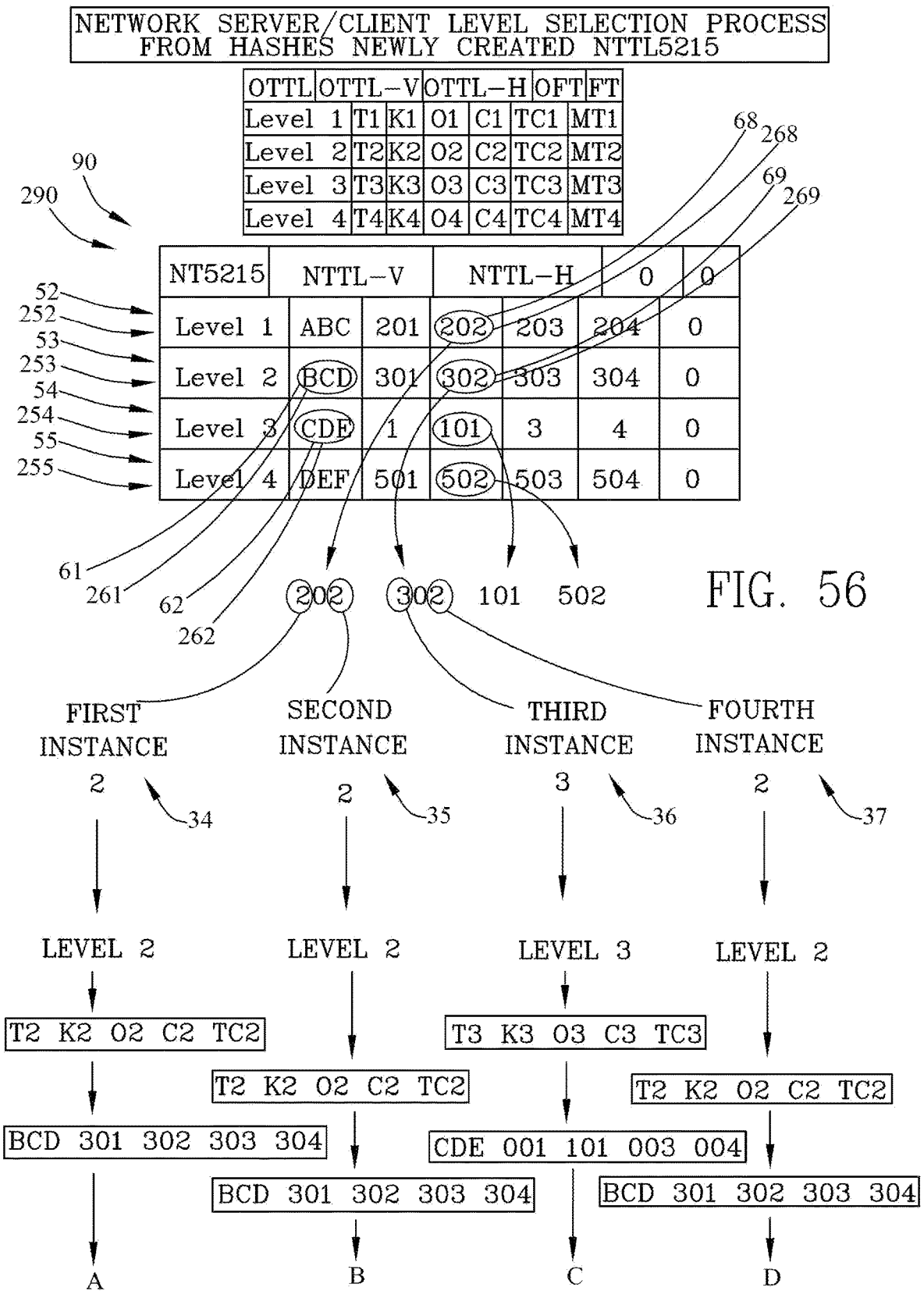
FIG. 56 shows the first step the network server and a network client does to create a first encryption key.
Figure 57:
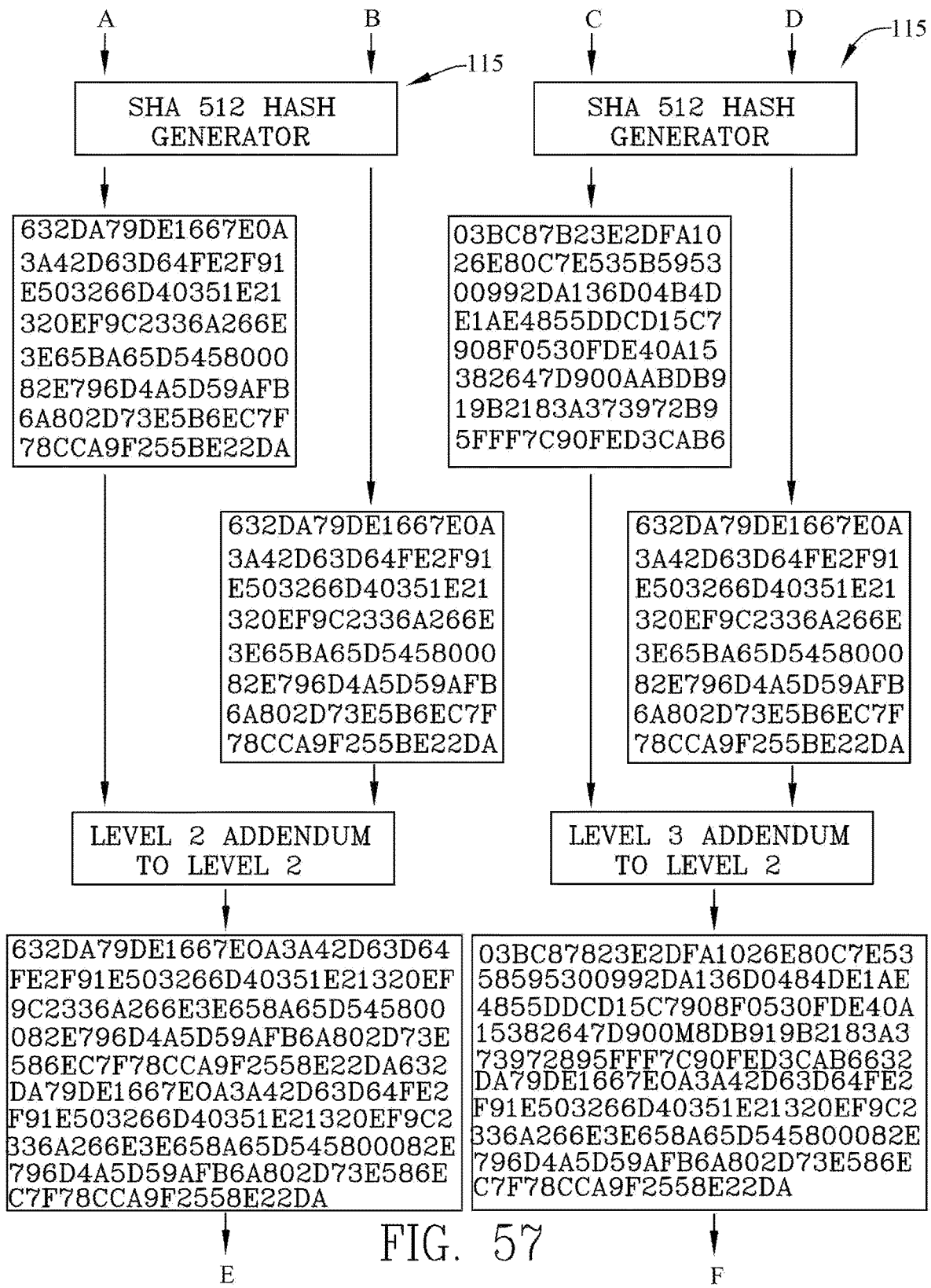
FIG. 57 shows the second step the network server and a network client does to create a first encryption key.
Figure 58:
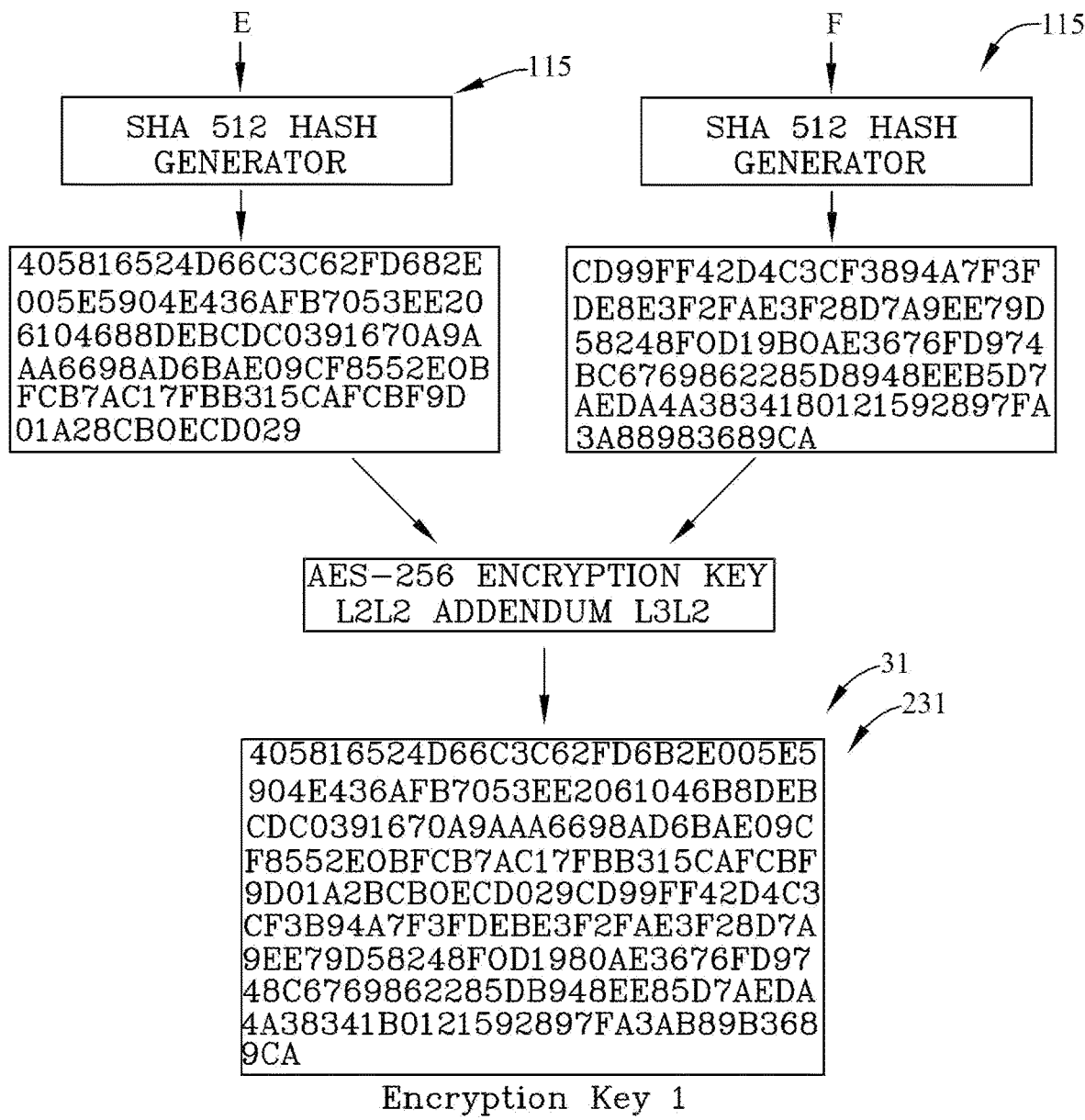
FIG. 58 shows the third and final step the network server and a network client does to create a first encryption key.

In FIGS. 56-58 both the network server 10 and the network client 210 create a first server encryption key 31 and a first client encryption key 231, respectively. In FIG. 56 both the network server 10 and the network client 210 create a first instance 34 and a second instance 35 by examining the first server time offset 68 and the first client time offset 268, respectively. Inside the first server time offset 68 and the first client time offset 268 the network server 10 and the network client 210 look for the first and second number that is between one and four. Once the network server 10 and the network client 210 find these two numbers the network server 10 and the network client 210 uses that number to select the corresponding server or client level value. As shown in FIG. 56 the network server 10 and the network client 210 found the number two as the first number and the number two as the second number. The network server 10 and the network client 210 now uses the second server level value 61 and the second client level value 261, respectively, to determine the level within the table to use. Here the network server 10 and the network client 210 will be using the second level for both the first instance 34 and a second instance 35 because the number two was discovered first within first server time offset 68 and the first client time offset 268. Both the network server 10 and the network client 210 uses second level values. For example, the server would use the server level value 61, the second server conversion value 73, the second server time offset value 69, the second server salt value 65, and the second server time value 77, while the network client 210 would use the second client level value 261, the second client conversion value 273, the second client time offset value 269, the second client salt value 265, and the second client time value 277. As shown in the FIG. 56 both the network server 10 and the network client 210 found "BCD 301 302 303 304" as the values across second server level 53 and the second client level value 253, respectively. The network server 10 and the network client 210 uses the same method describe above to find the third instance 36 and the fourth instance 37 except both the network server 10 and the network client 210 uses second server time offset 69 and the second client time offset 269, respectively. As shown in the FIG. 56 the third instance 36 resulted in network server 10 and the network client 210 using the third server level 54 and the third client level 254. Finally shown in FIG. 56 is that the fourth instance 37 resulted in network server 10 and the network client 210 using the second server level 53 and the second client level 253.

In FIG. 57 both the network server 10 and the network client 210 sends the values of the first instance 34, the second instance 35, the third instance 36 and the fourth instance 37 through a hash generator 115 creating a one hundred twenty-eight character value. The hash of the first instance 34 and the hash of the second instance 35 are now then addendum to each other creating a two hundred fifty-six character value. The hash of the third instance 36 and the hash of the fourth instance 37 are now then addendum to each other creating a two hundred fifty-six character value.

In FIG. 58 the two hundred fifty-six character hash value of first instance 34 and the second instance 35 are then hashed again using a hash generator 115. The two hundred fifty-six character value is now a one hundred twenty-eight character value again. The two hundred fifty-six character hash value of third instance 36 and the fourth instance 37 are then hashed again using a hash generator 115 changing the two hundred fifty-six character value to a one hundred twenty-eight character value. The final step of the network server 10 and the network client 210 is to take both the newly created one hundred twenty-eight character value and addendum to each other creating a two hundred fifty-six character value and stored them as the first server encryption key 31 and the first client encryption key 231, respectively. If both the network server 10 and the network client 210 followed the same steps above, then the first server encryption key 31 and the first client encryption key 231 are equivalent. The new first server encryption key 31 and the first client encryption key 231 will be used to encrypt the data to first client data to report 216 shown in FIG. 65.

Figure 59:
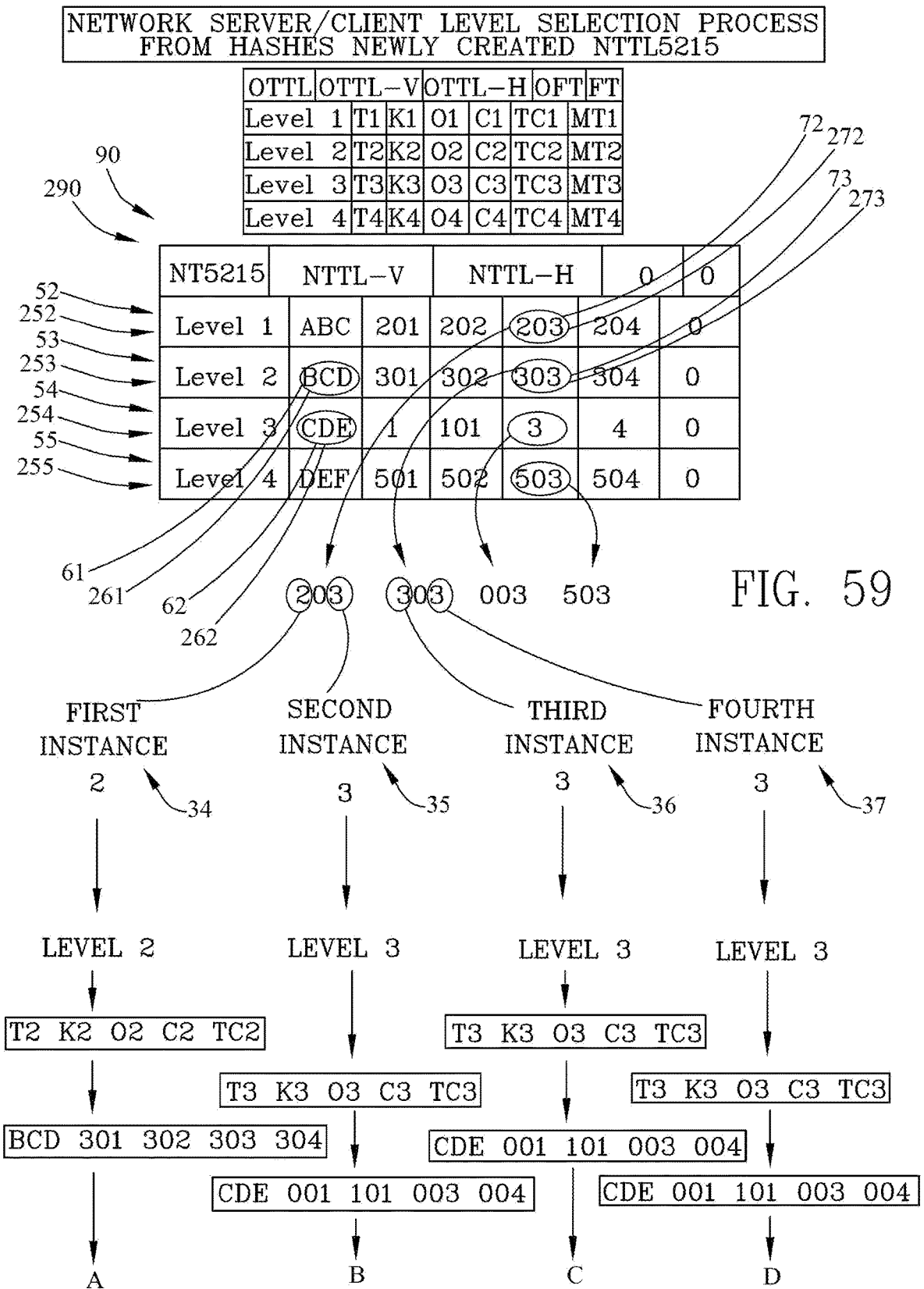
FIG. 59 shows the first step the network server and a network client does to create a second encryption key.
Figure 60:
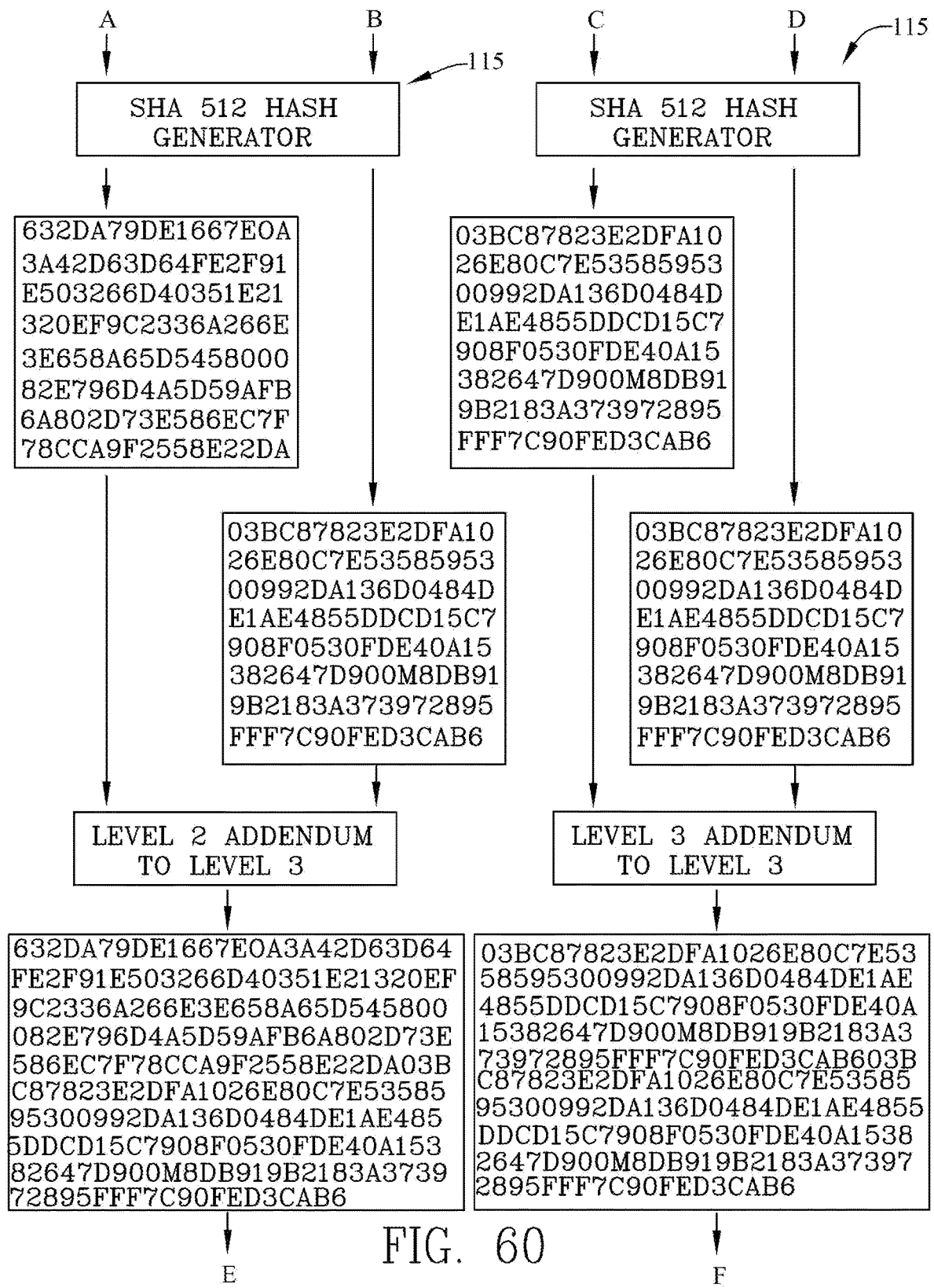
FIG. 60 shows the second step the network server and a network client does to create a second encryption key.
Figure 61:
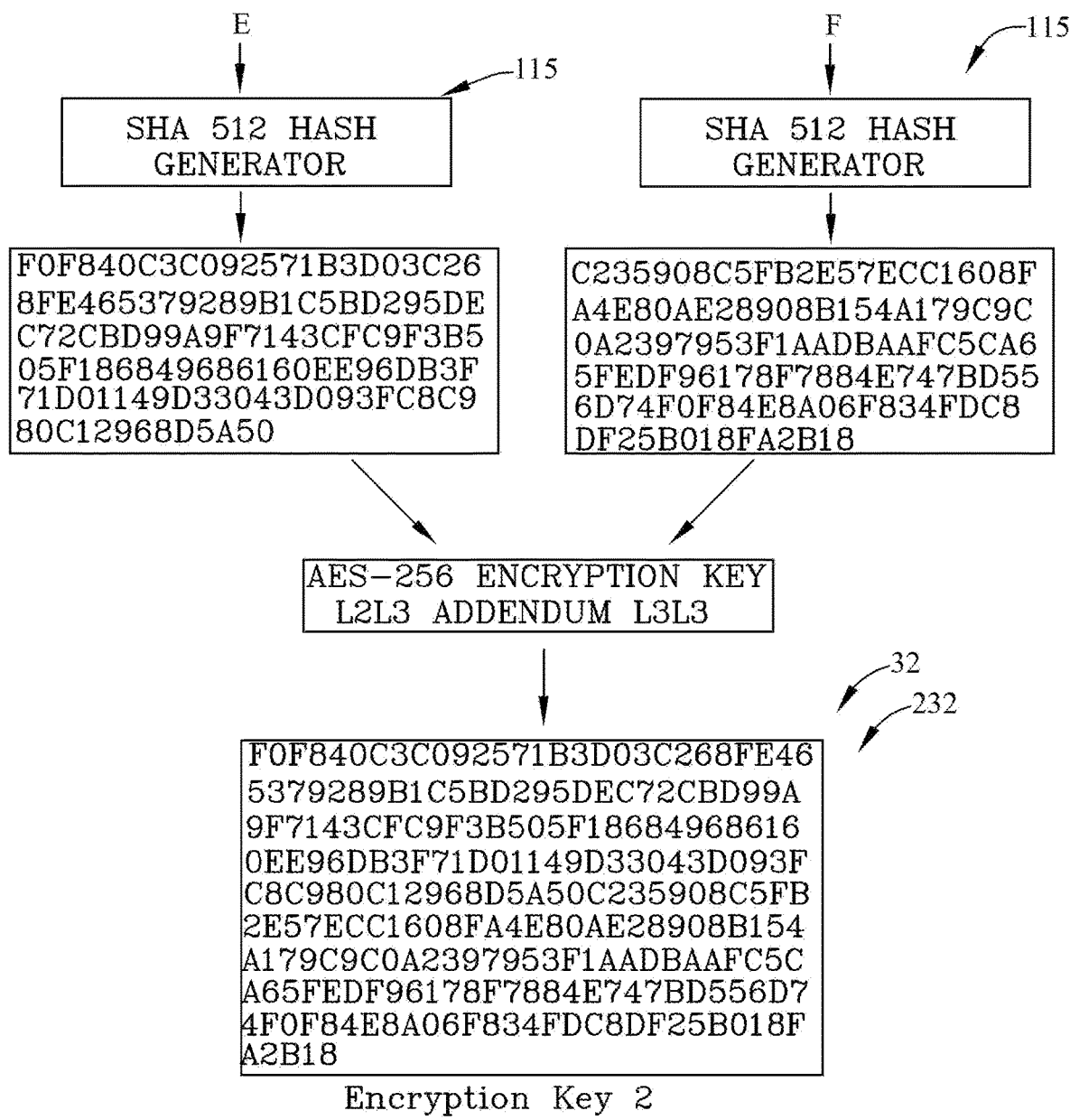
FIG. 61 shows the third and final step the network server and a network client does to create a second encryption key.

In FIGS. 59-61 both the network server 10 and the network client 210 create a second server encryption key 32 and a second client encryption key 232, respectively. In FIG. 59 both the network server 10 and the network client 210 create a first instance 34 and a second instance 35 by examining the first server conversion value 72 and the first client conversion value 272, respectively. Inside the first server conversion value 72 and the first client conversion value 272 the network server 10 and the network client 210 look for the first and second number that is between one and four. Once the network server 10 and the network client 210 find these two numbers the network server 10 and the network client 210 uses that number to select the corresponding server or client level value.

As shown in FIG. 59 the network server 10 and the network client 210 found the number two as the first number and the number three as the second number. The network server 10 and the network client 210 now use the second server level value 61 and the second client level value 261, respectively, to determine the level within the table to use. Here the network server 10 and the network client 210 will be using the second level for the first instance 34 and the third level for the second instance 35 because the number two was discovered first within first server conversion value 72 and the first client conversion value 272

For example, the server would use the second server level value 61, the second server conversion value 73, the second server time offset value 69, the second server salt value 65, and the second server time value 77, while the network client 210 would use the second client level value 261, the second client conversion value 273, the second client time offset value 269, the second client salt value 265, and the second client time value 277 to create the first instance 34.

As shown in the FIG. 59 both the network server 10 and the network client 210 found "BCD 301 302 303 304" as the values across second server level 53 and the second client level value 253, respectively to create the first instance 34. Also, the network server 10 and the network client 210 found "CDS 001 101 003 004" as the values across the third server level 54 and the third client level value 254, respectively to create the second instance 35.

The network server 10 and the network client 210 uses the same method describe above to find the third instance 36 and the fourth instance 37 except both the network server 10 and the network client 210 uses the second server conversion value 72 and the second client conversion value 272, respectively.

As shown in the FIG. 56 the third instance 36 resulted in network server 10 and the network client 210 using the third server level 54 and the third client level 254. Finally shown in FIG. 56 is that the fourth instance 37 also resulted in network server 10 and the network client 210 using the third server level 54 and the third client level 254.

In FIG. 60 both the network server 10 and the network client 210 sends the values of the first instance 34, the second instance 35, the third instance 36 and the fourth instance 37 through a hash generator 115 creating a one hundred twenty-eight character value. The hash of the first instance 34 and the hash of the second instance 35 are now then addendum to each other creating a two hundred fifty-six character value. The hash of the third instance 36 and the hash of the fourth instance 37 are now then addendum to each other creating a two hundred fifty-six character value.

In FIG. 61 the two hundred fifty-six character hash value of first instance 34 and the second instance 35 are then hashed again using a hash generator 115. The two hundred fifty-six character value is now a one hundred twenty-eight character value again. The two hundred fifty-six character hash value of third instance 36 and the fourth instance 37 are then hashed again using a bash generator 115 changing the two hundred fifty-six character value into a one hundred twenty-eight character value. The final step of the network server 10 and the network client 210 is to take both the newly created one hundred twenty-eight character value and addendum to each other creating a two hundred fifty-six character value and stored them as the second server encryption key 32 and the second client encryption key 232, respectively. If both the network server 10 and the network client 210 followed the same steps above, then the second server encryption key 32 and the second client encryption key 232 are equivalent. The new second server encryption key 32 and the second client encryption key 232 will be used to encrypt future data and exchanges.

Figure 62:
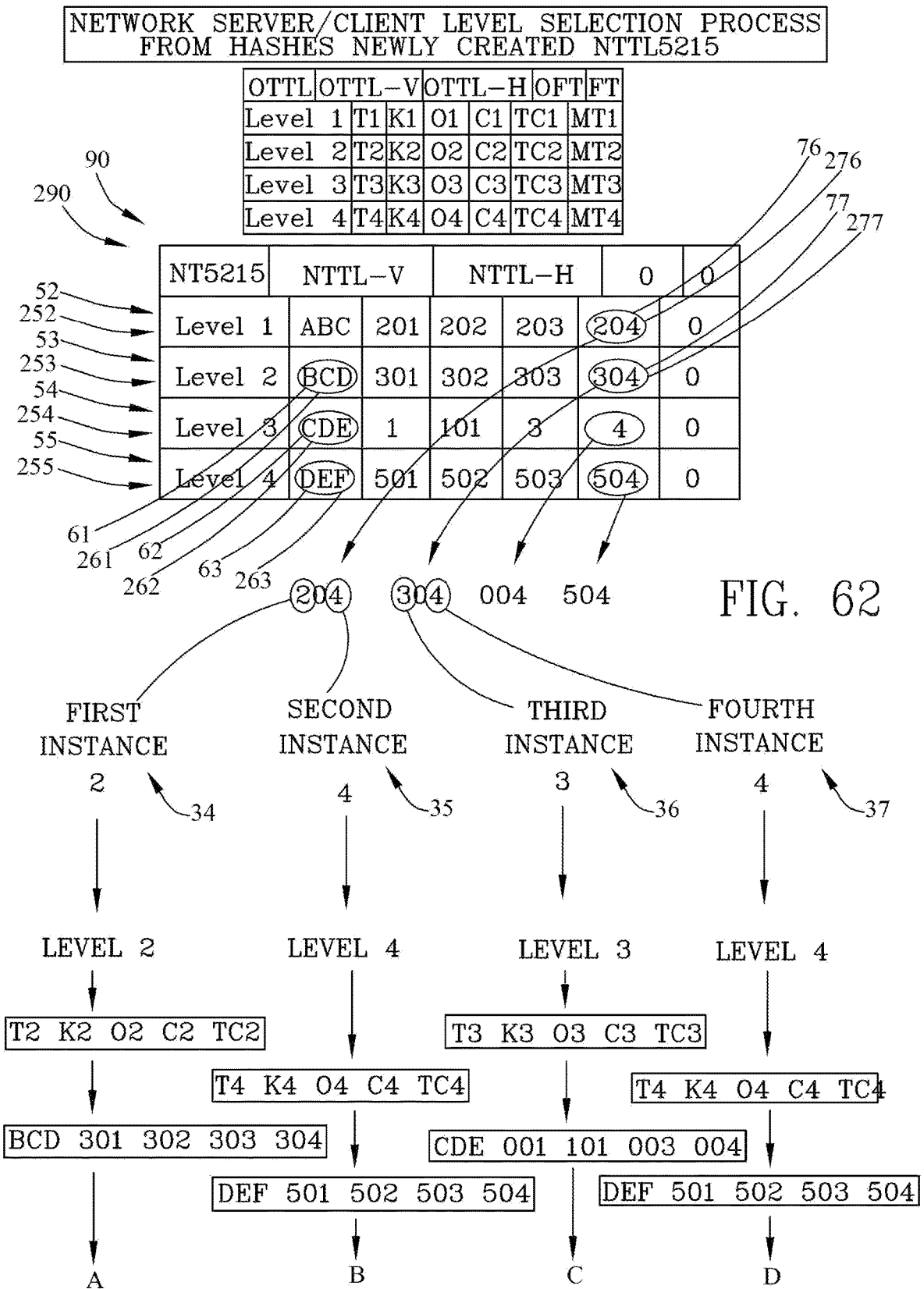
FIG. 62 shows the first step the network server and a network client does to create a third encryption key.
Figure 63:
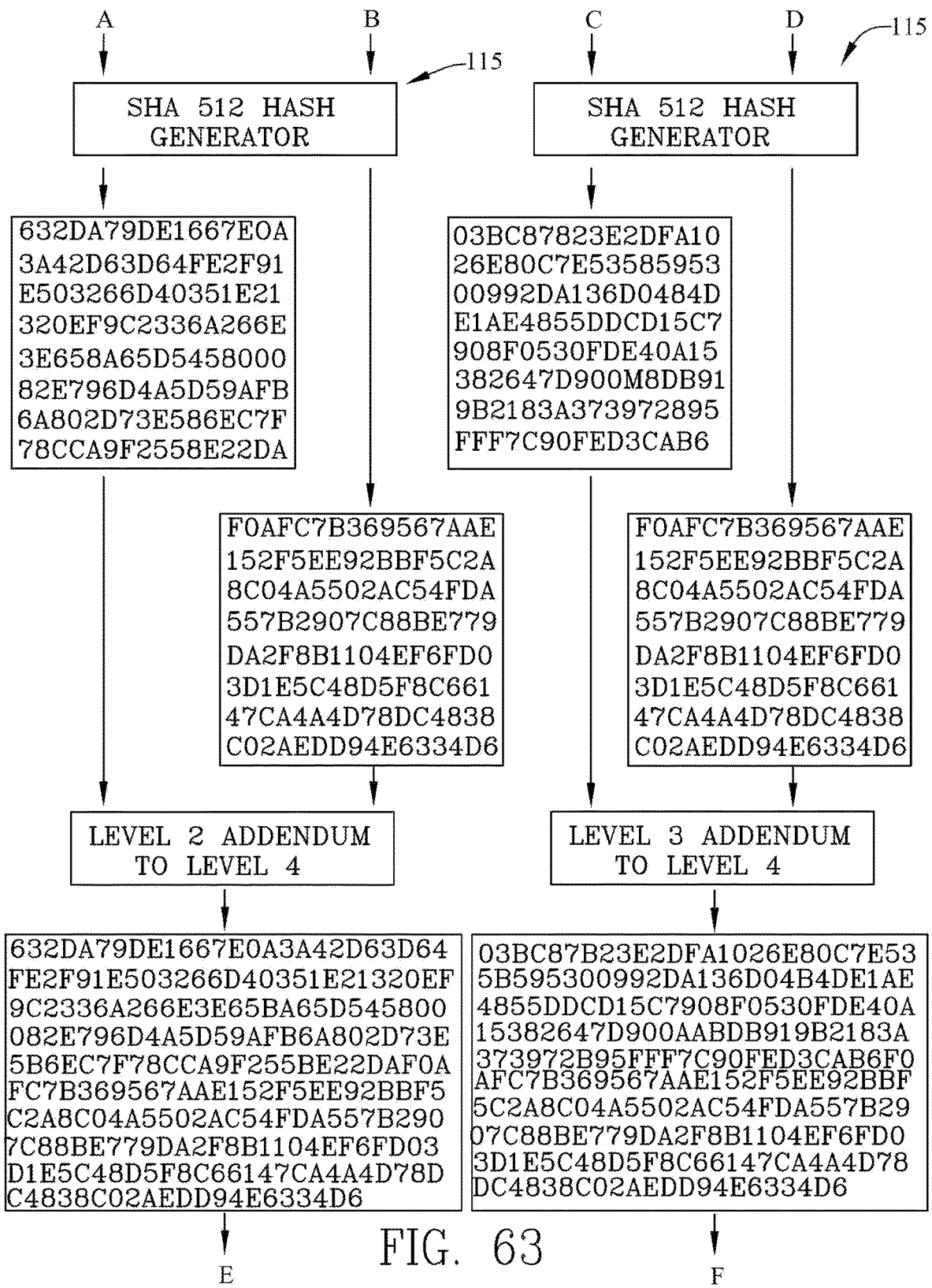
FIG. 63 shows the second step the network server and a network client does to create a third encryption key.
Figure 64:
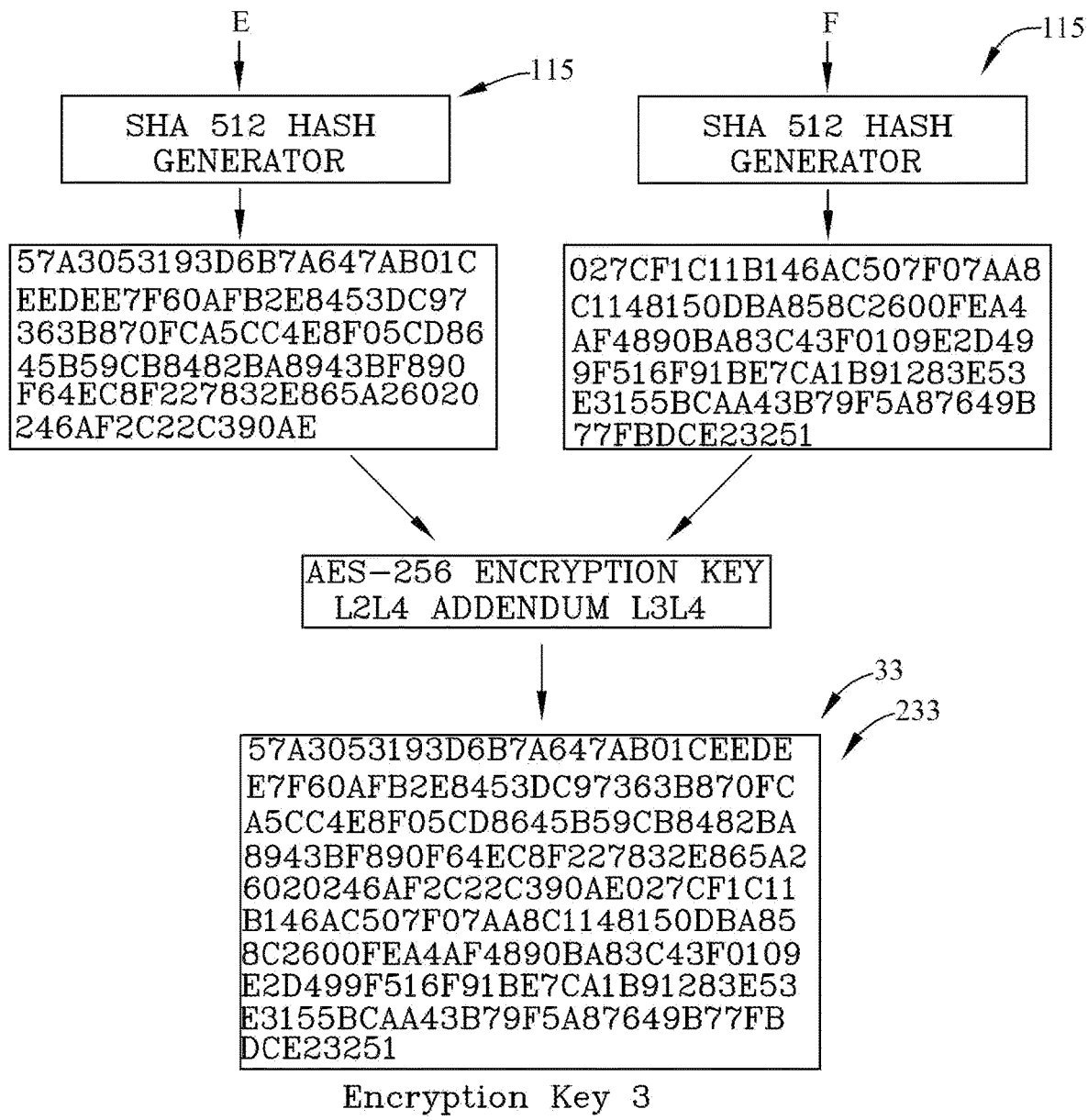
FIG. 64 shows the third and final step the network server and a network client does to create a third encryption key.

In FIGS. 62-64 both the network server 10 and the network client 210 create a third server encryption key 33 and a third client encryption key 233, respectively. In FIG. 62 both the network server 10 and the network client 210 create a first instance 34 and a second instance 35 by examining the first server time value 76 and the first client time value 276, respectively.

Inside the first server time value 76 and the first client time value 276 the network server 10 and the network client 210 look for the first and second number that is between one and four. Once the network server 10 and the network client 210 find these two numbers the network server 10 and the network client 210 uses that number to select the corresponding server or client level value.

As shown in FIG. 62 the network server 10 and the network client 210 found the number two as the first number and the number four as the second number.

The network server 10 and the network client 210 now use the second server level value 61 and the second client level value 261, respectively, to determine the level within the table to use.

Here the network server 10 and the network client 210 will be using the second level for the first instance 34 and the four level for the second instance 35 because the number two was discovered first within first server time value 76 and the first client time value 276.

For example, the server would use the second server level value 61, the second server conversion value 73, the second server time offset value 69, the second server salt value 65, and the second server time value 77, while the network client 210 would use the second client level value 261, the second client conversion value 273, the second client time offset value 269, the second client salt value 265, and the second client time value 277 to create the first instance 34.

As shown in the FIG. 62 both the network server 10 and the network client 210 found "BCD 301 302 303 304" as the values across second server level 53 and the second client level value 253, respectively to create the first instance 34. Also, the network server 10 and the network client 210 found "DEF 501 502 503 504" as the values across the fourth server level 55 and the fourth client level value 255, respectively to create the second instance 35.

The network server 10 and the network client 210 uses the same method describe above to find the third instance 36 and the fourth instance 37 except both the network server 10 and the network client 210 uses the second server time value 76 and the second client time value 276, respectively.

As shown in the FIG. 62 the third instance 36 resulted in network server 10 and the network client 210 using the third server level 54 and the third client level 254. Finally shown in FIG. 62 is that the fourth instance 37 resulted in network server 10 and the network client 210 using the fourth server level 55 and the fourth client level 255.

In FIG. 63 both the network server 10 and the network client 210 sends the values of the first instance 34, the second instance 35, the third instance 36 and the fourth instance 37 through a hash generator 115 creating a one hundred twenty-eight character value. The hash of the first instance 34 and the hash of the second instance 35 are now then addendum to each other creating a two hundred fifty-six character value. The hash of the third instance 36 and the hash of the fourth instance 37 are now then addendum to each other creating a two hundred fifty-six character value.

In FIG. 64 the two hundred fifty-six character hash value of first instance 34 and the second instance 35 are then hashed again using a hash generator 115. The two hundred fifty-six character value is now a one hundred twenty-eight character value again. The two hundred fifty-six character hash value of third instance 36 and the fourth instance 37 are then hashed again using a hash generator 115 changing the two hundred fifty-six character value into a one hundred twenty-eight character value. The final step of the network server 10 and the network client 210 is to take both the newly created one hundred twenty-eight character value and addendum to each other creating a two hundred fifty-six character value and stored them as the third server encryption key 33 and the third client encryption key 233, respectively. If both the network server 10 and the network client 210 followed the same steps above, then the third server encryption key 33 and the third client encryption key 233 are equivalent. The new third server encryption key 33 and the third client encryption key 233 will be used to encrypt future data and exchanges.

Figure 65:
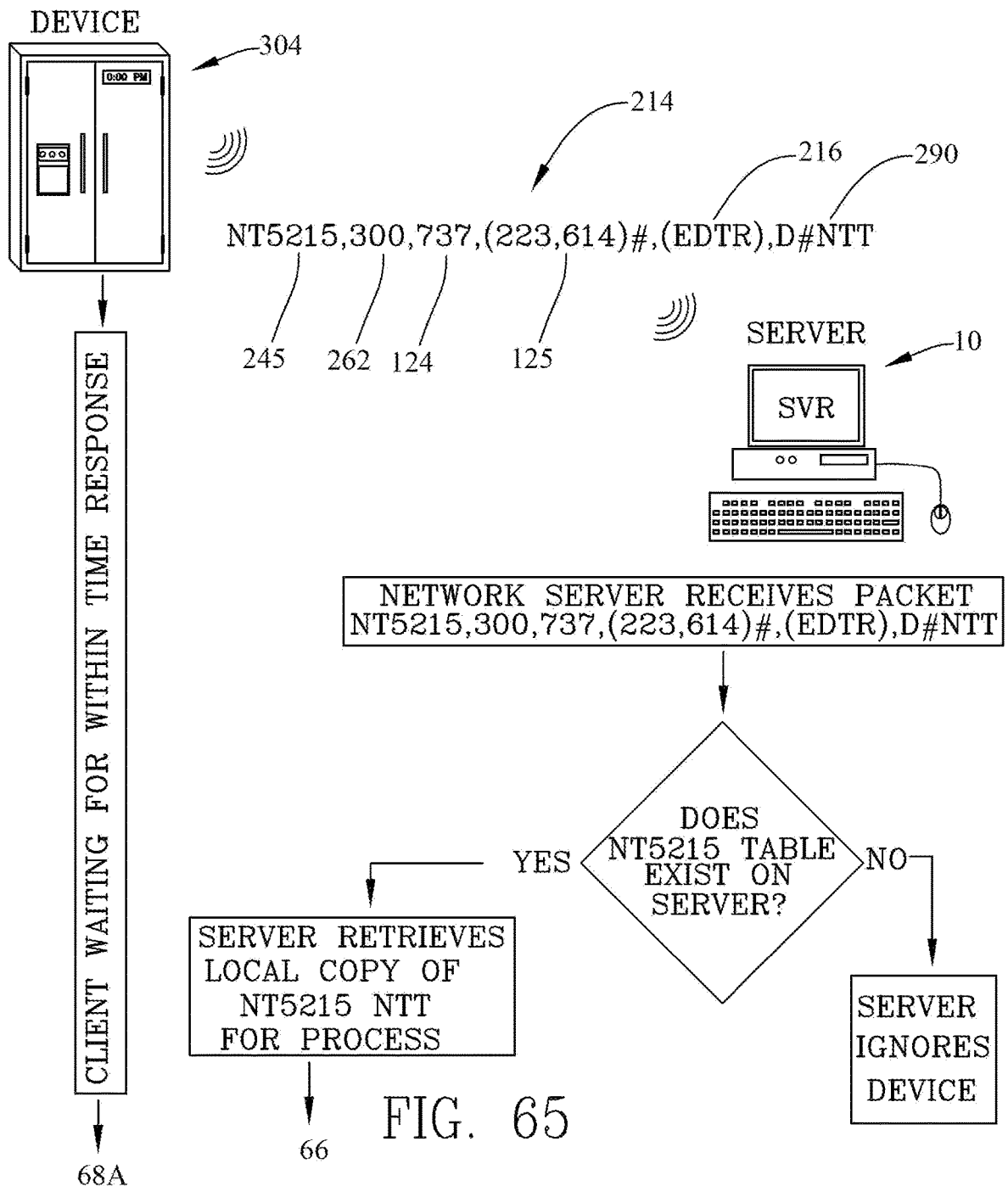
FIG. 65 illustrates a device sending the second client data packet to the network server containing encrypted data to report, then waiting for a response, and the network server retrieving the correct server table, if existing, for the particular client based on the common table label.

FIG. 65 shows a network device 304. It's important to note the FIGS. 65-68 refer to a network device 304 and not a network client 210. This is where a network client 210 is separated into a network device 304 and a user-device 307. A network device 304 only reports data and does not receive data. A user-device 307 will be discussed in FIGS. 69-72. The network device 304 uses data from the old client table 291, the data in the client table label 245, third client level value 262, the sum of the fifth arithmetic formula 24, the sum of the sixth arithmetic formula 25, the encrypted client data to report 216 and the hash of the device's hashed new client table 290 to start compiling the second client data packet 213. The second client data packet 213 is sent with the client table label 245, third client level value 262, the fifth arithmetic sum 124, the sixth arithmetic sum 125, the encrypted client data to report 216 and the hash of the device's hashed new client table 290.

The second client data packet 213 is sent to the network server 10. After the network device 304 sends the second client data packet 213 to the network client 210, the network device 304 waits a set time for a reply from the network server 10. The network device 304 waits the set time or receives the response shown later in FIG. 68. When the network server 10 receives the second client data packet 213, the network server 10 determines if an old server table 91 exists for that network device 304. If no old server table 91 exists for that network device 304, the network server 10 ignores further communications with that network device 304. If an old server table 91 exists for that network device 304 the network server 10 retrieves the local copy of the old server table 91 matching that network device 304.

Figure 66:
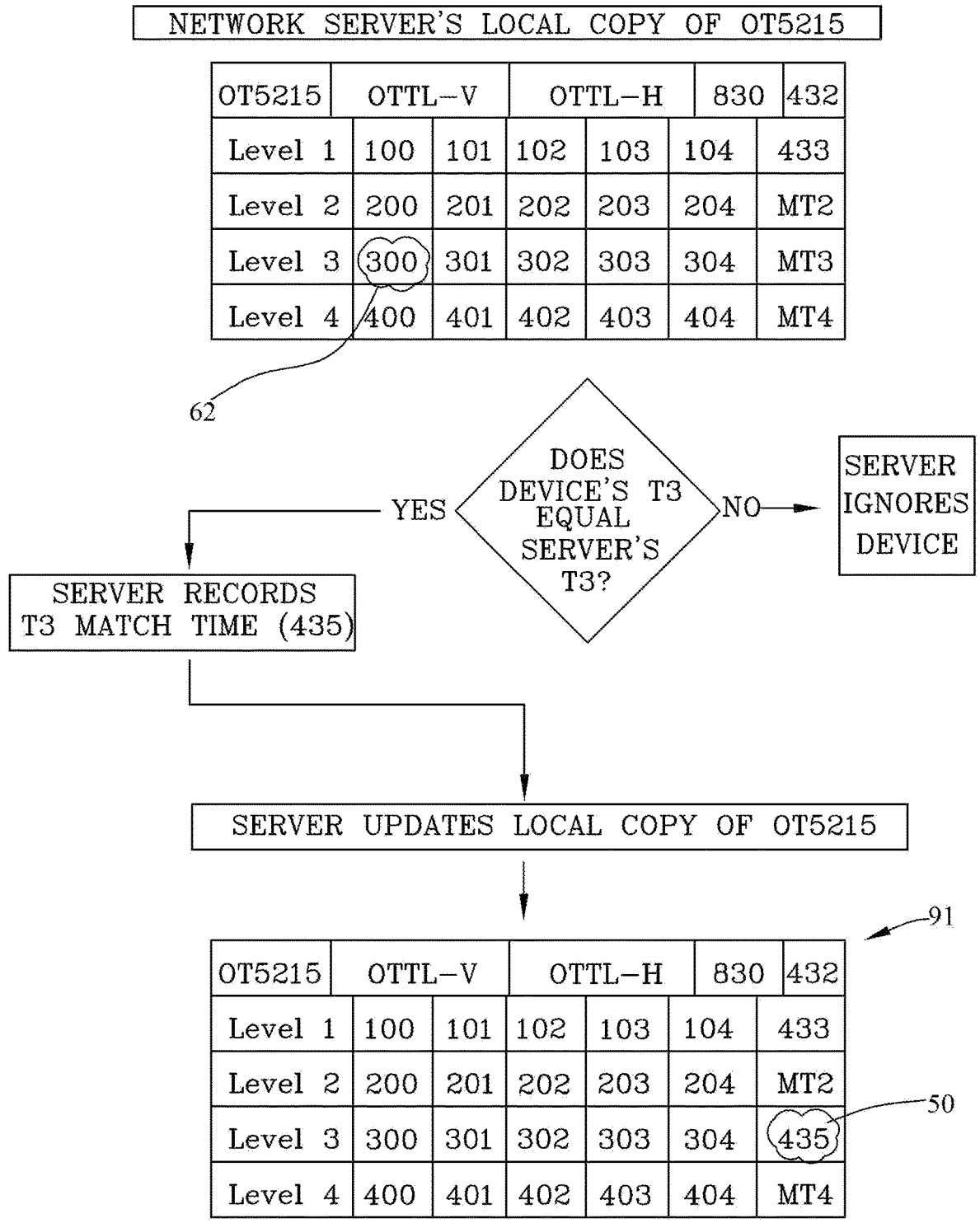
FIG. 66 shows the network server verifies the identity of that particular network device then records a match time.

In FIG. 66 the network server 10 obtains the third client level value 262 from the second client data packet 213 and then determines if the third client level value 262 matches the third server level value 62. If the third client level value 262 does not match the third server level value 62 the network server 10 ignores further communication from the network device 304. If the third client level value 262 matches the third server level value 62 the network server 10 records the current time into the third server match time 50.

Figure 67:
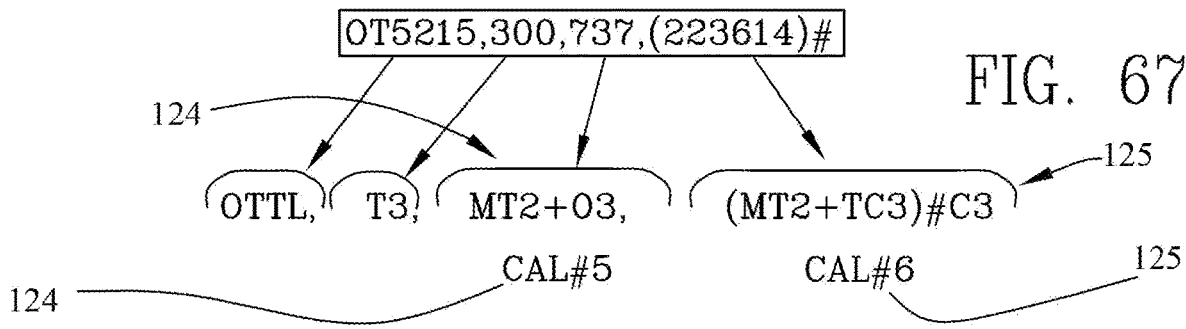
FIG. 67 illustrates the network server using the second client data packet and calculations to update the match time within the local server table.
Figure 68:
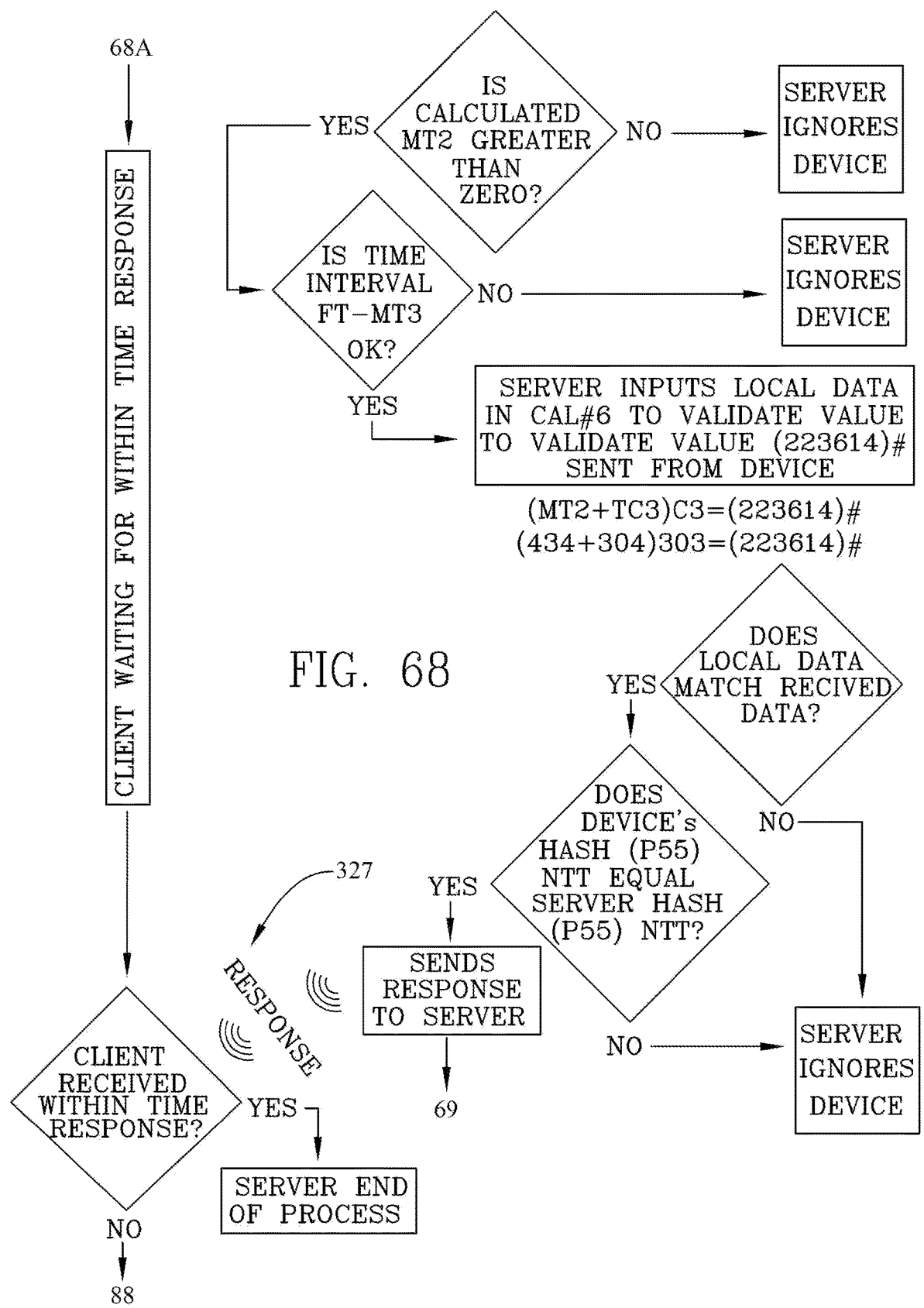
FIG. 68 illustrates the network server further verifies the identity of the network device and sends response if successfully verified.

As shown in FIG. 67, the network server 10 then takes the fifth arithmetic sum 124 found in the second client data packet 213 to ultimately obtain the second client match time 249 of the network device 304. The network server 10 finds the second client match time 249 by setting known server values into the fifth arithmetic formula 24 to solve for second client match time 249. After finding the second client match time 249, the network server 10 takes that value and saves it into the second server match time 49 in the old server table 91.

The network server 10 then verifies that the calculated value of the second client match time 249 is greater than zero. Shown in FIG. 68, if the calculated value of the second client match time 249 is zero, then the network server 10 knows an error has occurred and ignores further communications with the network device 304. If the calculated value of the second client match time 249 is greater than zero, the network server 10 then checks the time it took for the second client data packet 213 to leave the network device 304 and arrive to the network server 10 by using the third time interval equation 337. If third time interval equation 337 sums to a value not within expected value, the network server 10 determines that the second client data packet 213 took longer than expected and the network server 10 ignores further communications with the network device 304. If the third time interval equation 337 sums to a value that is within expected limits, the network server 10 determines that the second client data packet 213 arrived with no man in the middle attack. The network server 10 then begins to verify that the network device 304 is truly the network device 304 it says it is. To verify the network device 304, the network server 10 inserts values from the old server table 91 into the sixth arithmetic formula 25 and produces a sum for that equation. If the network server's 10 sum of that equation equals the sum for the sixth arithmetic formula 25 in the second client data packet 213, the network server 10 will send the network device 304 a response and then start to prepare a fourth server data packet 15 shown in FIG. 81. If, however, the network server's 10 sum of that equation does not equal the sixth arithmetic formula 25 in the second client data packet 213, the network server 10 ignores further communications with the network device 304.

Figure 69:
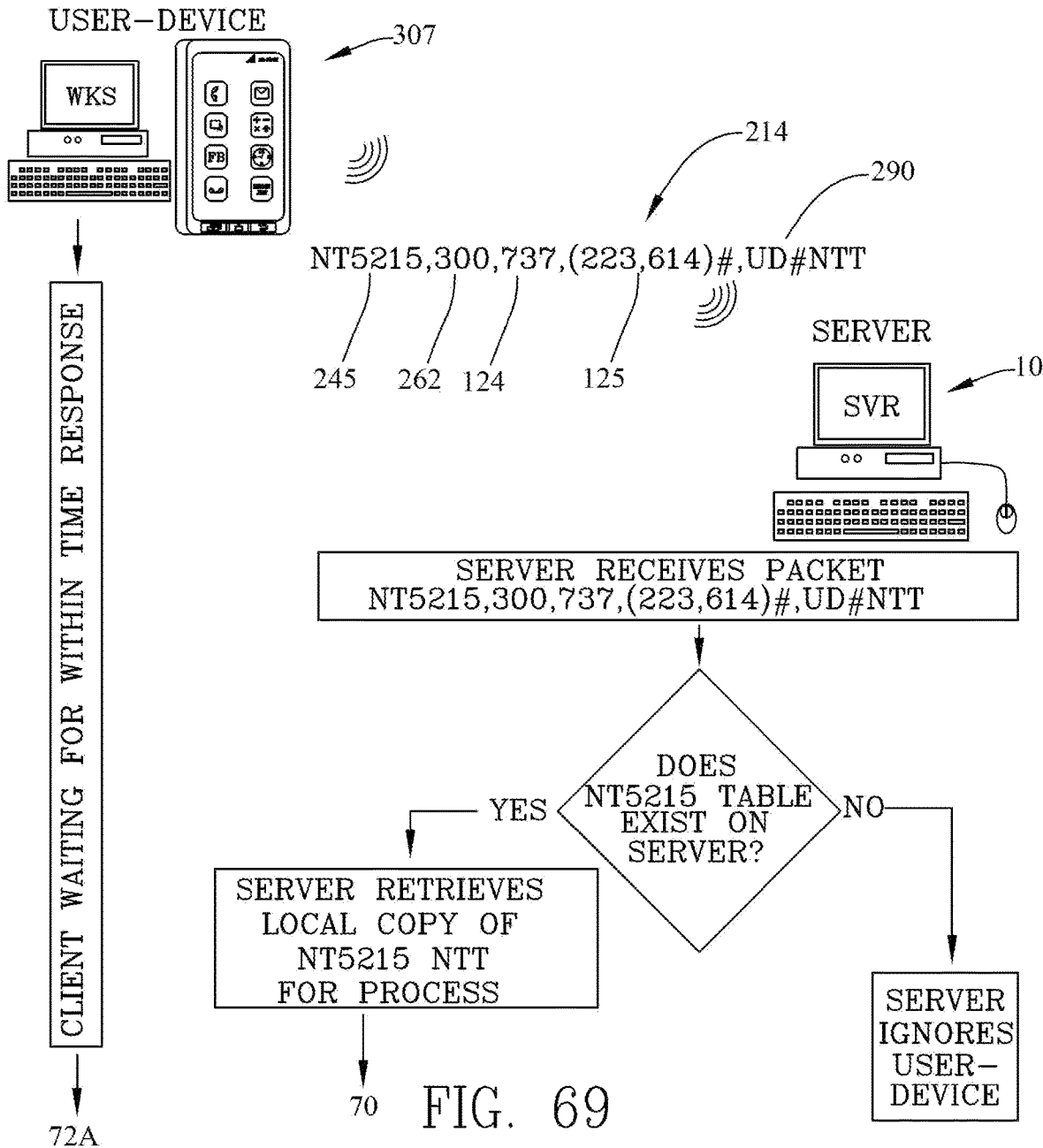
FIG. 69 illustrates a user-device sending the second client data packet to the network server containing the user device new table hash, then waiting for a response, and the network server retrieving the correct server table, if existing, for the particular client.

FIG. 69 shows a user-device 307. It's important to note the FIGS. 69-72 refer to a user-device 307 and not a network client 210. Again, a network client 210 is comprised of a network device 304 and a user-device 307. A network device 304 only reports data and does not receive data. A user-device 307 will be discussed in here. The user-device 307 uses data from the old client table 291, the data in the client table label 245, third client level value 262, the sum of the fifth arithmetic formula 24, the sum of the sixth arithmetic formula 25, and the hash of the user-device's 307 hashed new client table 290 to start compiling the second client data packet 213. The second client data packet 213 is sent with the client table label 245, third client level value 262, the fifth arithmetic sum 124, the sixth arithmetic sum 125, and the hash of the user-device's 307 hashed new client table 290.

The second client data packet 213 is sent to the network server 10. After the user-device 307 sends the second client data packet 213 to the network server 10, the user-device 307 waits a set time for a reply from the network server 10. The user-device 307 waits the set time or receives the response shown later in FIG. 72. When the network server 10 receives the second client data packet 213, the network server 10 determines if an old server table 91 exists for that user-device 307. If no old server table 91 exists for that user-device 307, the network server 10 ignores further communications with that user-device 307. If an old server table 91 exists for that user-device 307 the network server 10 retrieves the local copy of the old server table 91 matching that user-device 307.

Figure 70:
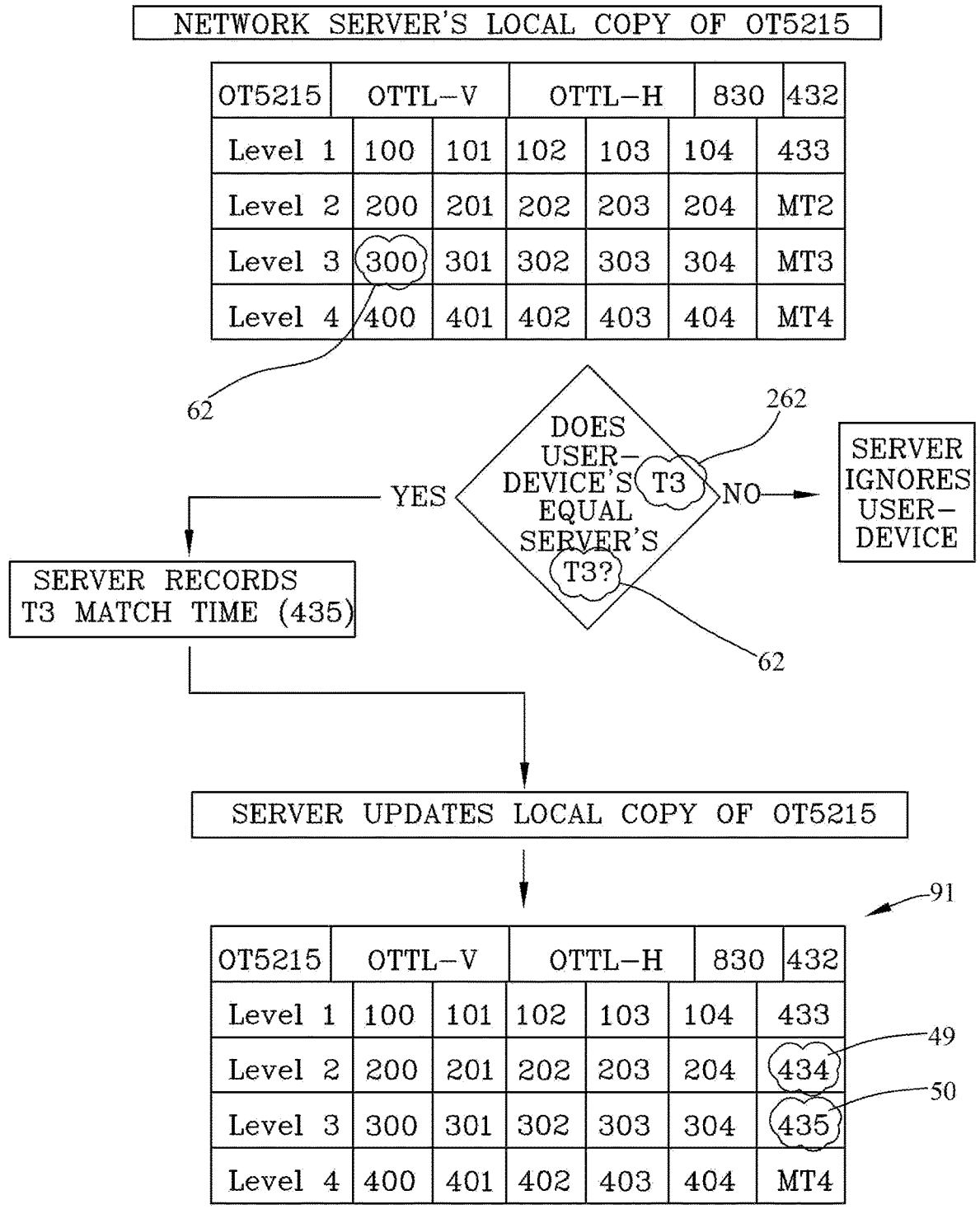
FIG. 70 shows the network server verifies the table level value of that particular user device then records match time.

In FIG. 70 the network server 10 obtains the third client level value 263 from the second client data packet 213 and then determines if the third client level value 263 matches the third server level value 63. If the third client level value 263 does not match the third server level value 63 the network server 10 ignores further communication from the user-device 307. If the third client level value 263 matches the third server level value 63 the network server 10 records the current time into the third server match time 50.

Figure 71:
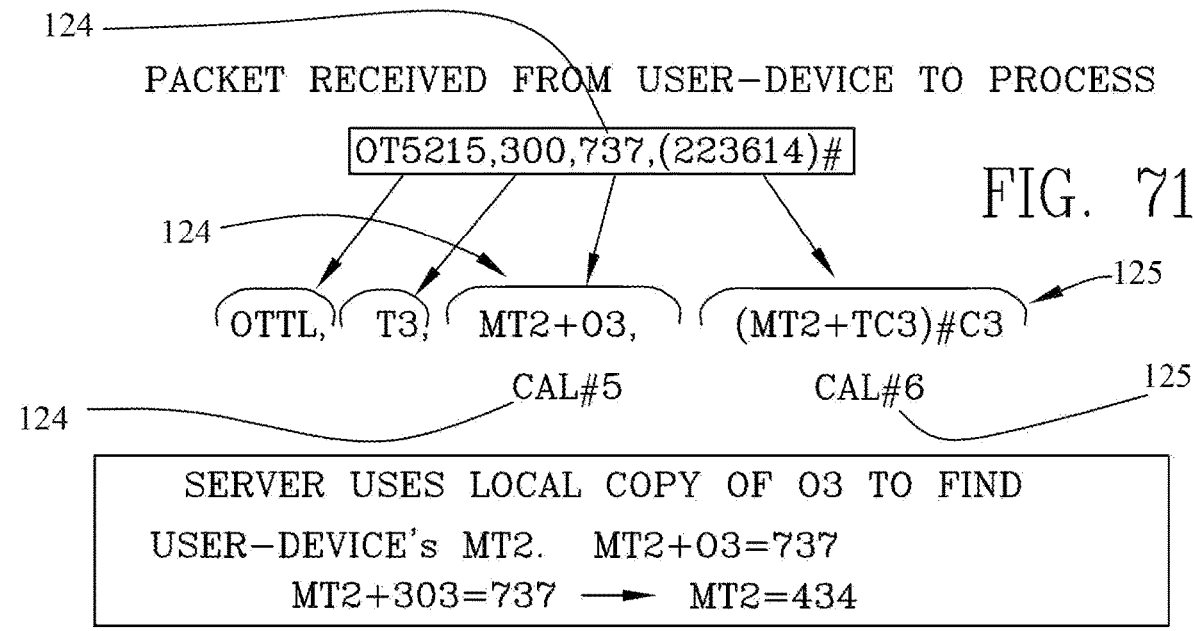
FIG. 71 illustrates the network server using the second client data packet and calculations to update the match time within the local server table.
Figure 72:
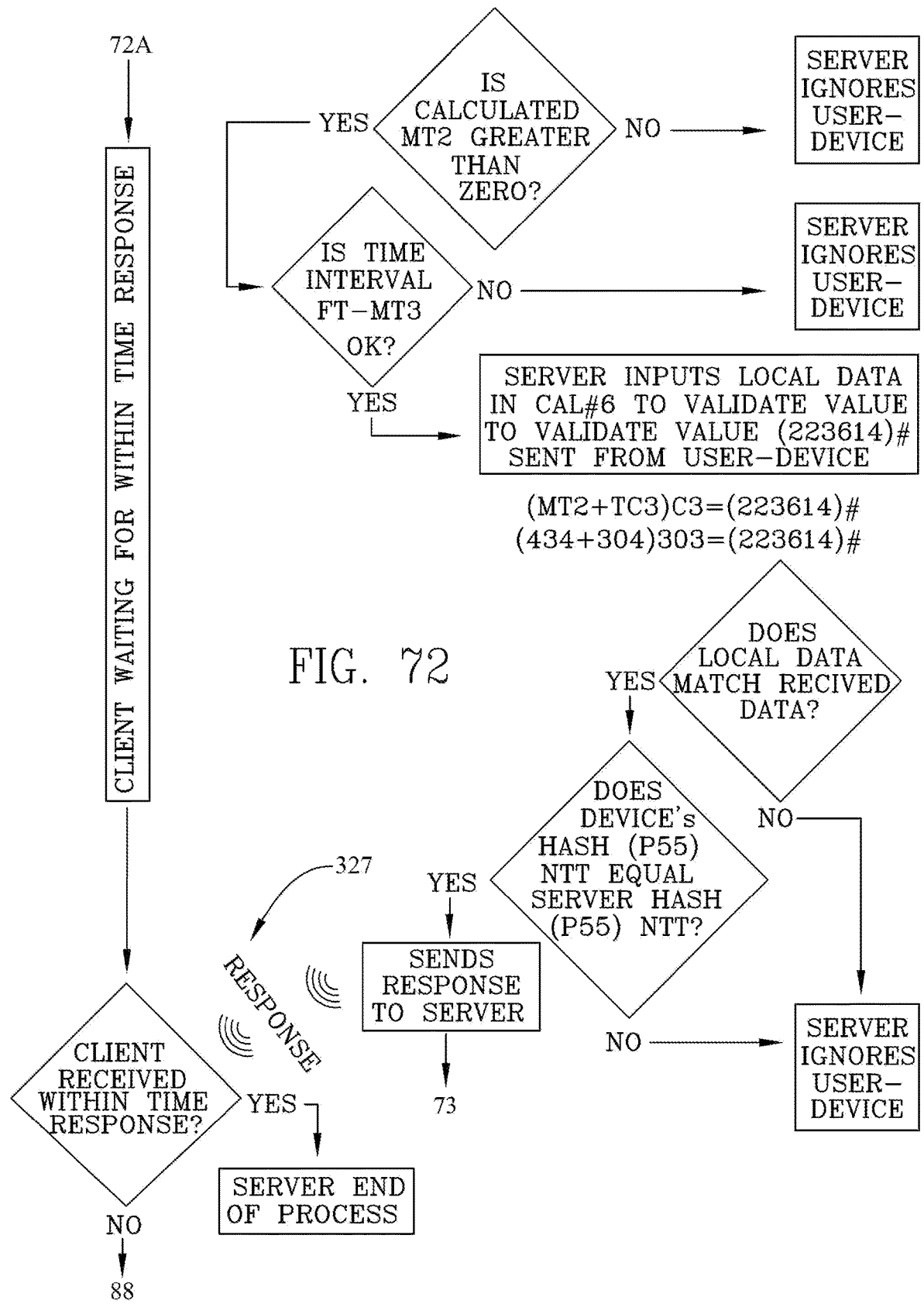
FIG. 72 illustrates the network server further verifies the identity of the network device and sends response if successfully verified.

As shown in FIG. 71, the network server 10 then takes the fifth arithmetic sum 124 found in the second client data packet 213 to ultimately obtain the second client match time 249 of the user-device 307. The network server 10 finds the second client match time 249 by setting known server values into the fifth arithmetic formula 24 to solve for second client match time 249. After finding the second client match time 249, the network server 10 takes that value and saves it into the second server match time 49 in the old server table 91.

The network server 10 then verifies that the calculated value of the second client match time 249 is greater than zero. Shown in FIG. 72, if the calculated value of the second client match time 249 is zero, then the network server 10 knows an error has occurred and ignores further communications with the user-device 307. If the calculated value of the second client match time 249 is greater than zero, the network server 10 then checks the time it took for the second client data packet 213 to leave the user-device 307 and arrive to the network server 10 by using the third time interval equation 337. If third time interval equation 337 sums to a value not within expected value, the network server 10 determines that the second client data packet 213 took longer than expected and the network server 10 ignores further communications with the user-device 307. If the third time interval equation 337 sums to a value that is within expected limits, the network server 10 determines that the second client data packet 213 arrived with no man in the middle attack. The network server 10 then begins to verify that the user-device 307 is truly the user-device 307 it says it is. To verify the user-device 307, the network server 10 inserts values from the old server table 91 into the sixth arithmetic formula 25 and produces a sum for that equation. If the network server's 10 sum of that equation equals the sum for the sixth arithmetic formula 25 in the second client data packet 213, the network server 10 will send the user-device 307 a response and then send the end-user to their communication console on the workstation 306 or smart phone 305 they are using to access this technology and then prepare a second server data packet 13 shown in FIG. 81. If, however, the network server's 10 sum of that equation does not equal the sixth arithmetic formula 25 in the second client data packet 213, the network server 10 ignores further communications with the user-device 307.

Figure 73:
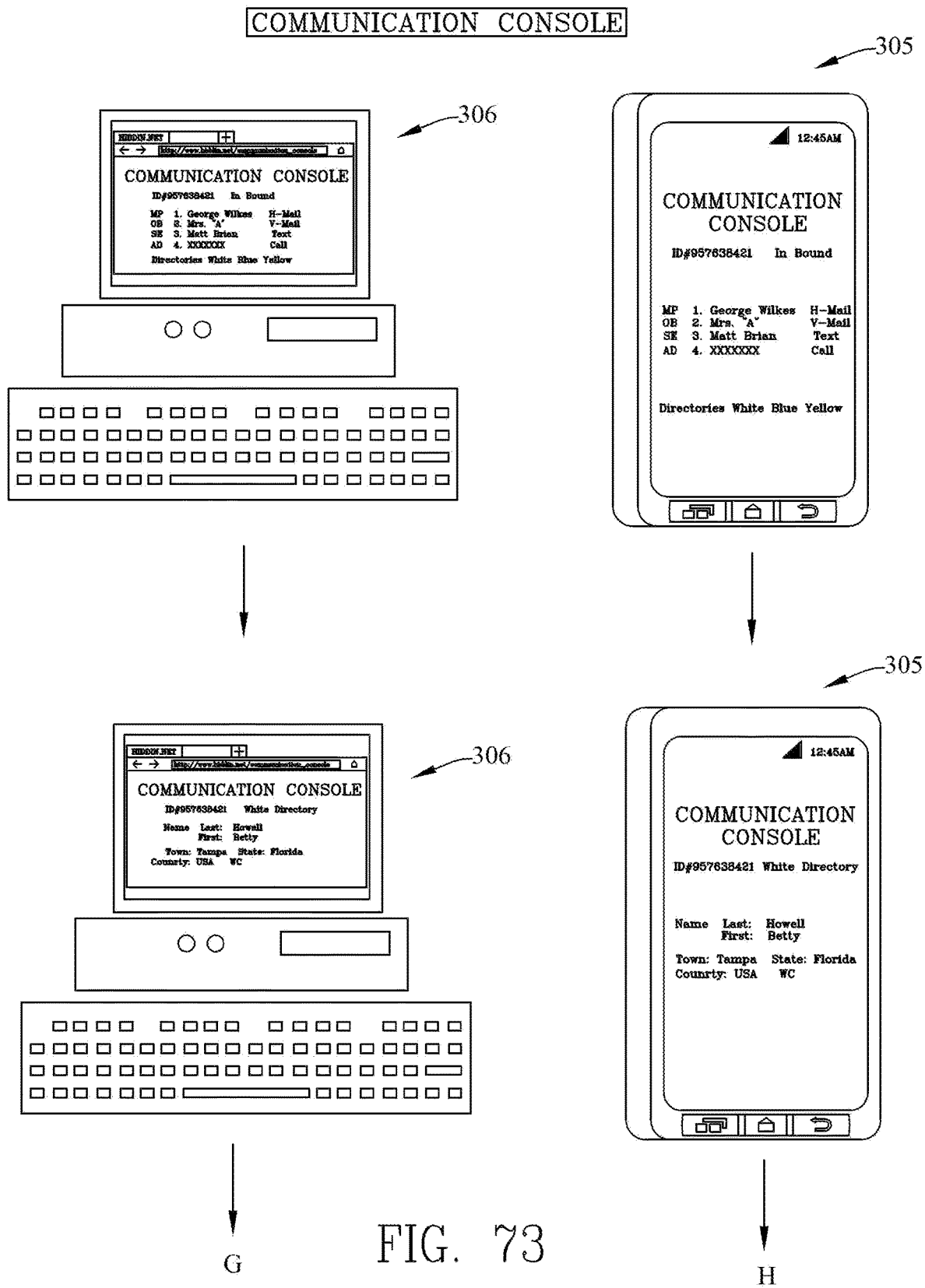
FIG. 73 shows the communication console the end-user would see to navigate through to select someone to make a phone call.

FIG. 73 illustrates the HIDDIN software installed on a workstation 306 and a smartphone 305. On both the workstation 306 and the smartphone 305, the end user is prompted with a directory of other end users within the HIDDIN network. If the end user is using a workstation 306, the end user is able to send secure messages to other end users on the HIDDIN network. If, however the end user is using the smartphone 305, the end user has the ability to either email, text or call another end user on the HIDDIN network. Shown in FIG. 73 are past communications with end users that can be selected for this commutation or a different directory of end users that can be selected.

Figure 74:
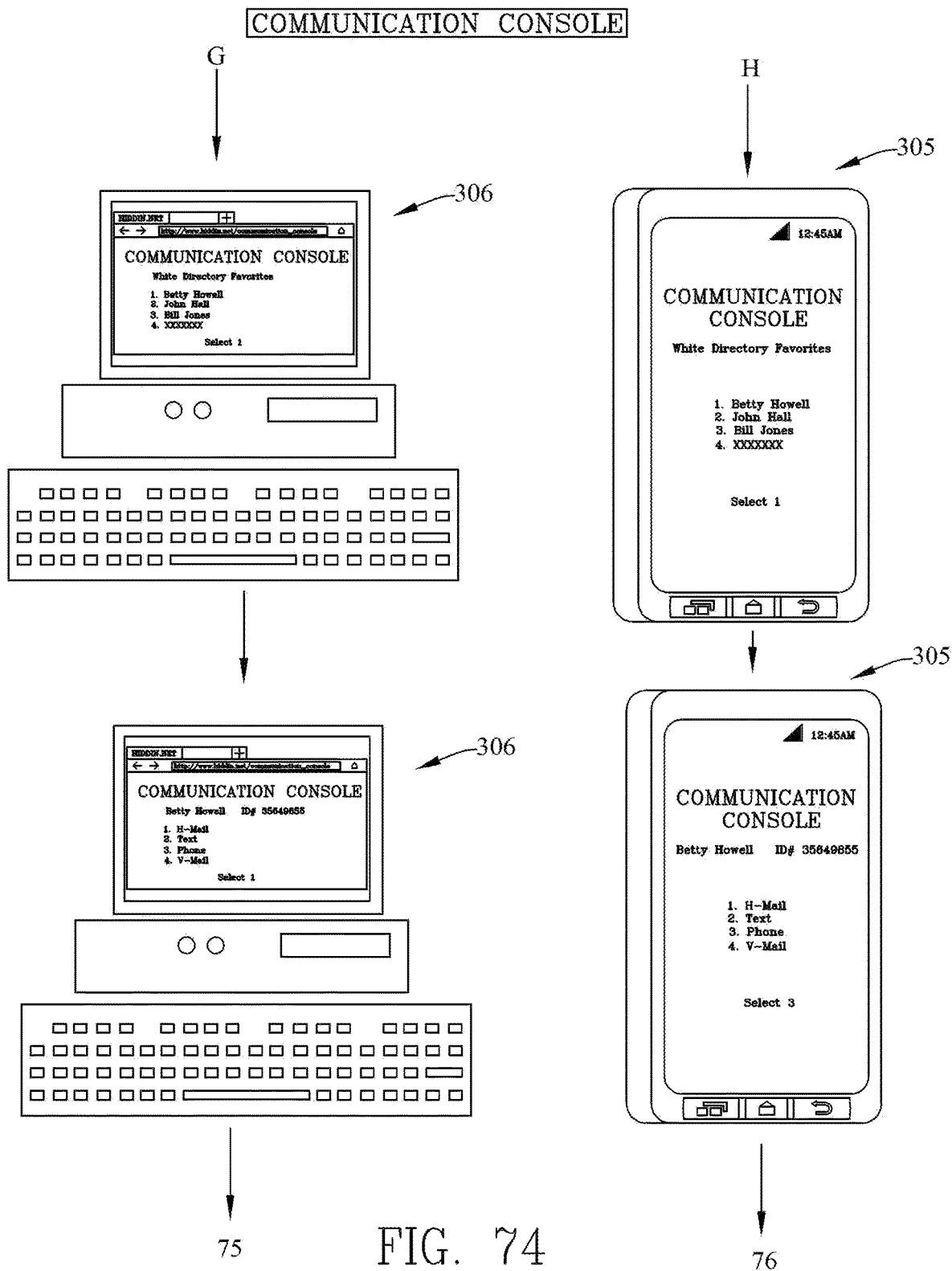
FIG. 74 is a continuation of FIG. 73 the end-user would see to navigate through to make a phone call.

FIG. 74 shows a directory of other end users on the HIDDIN network Shown in FIG. 74, the end-user selects Betty Howell using either their workstation 306 or smart phone 305 and then selects from the communication channels Betty Howell provides for them to access her at this time.

Both the workstation 306 and the smartphone 305 show the directory in a similar manner.

FIG. 75 shows the communication contact log maintained by the network server 10. The last line lists the order #, the user initiator D #, Betty Howell's recipient D #, the time, type of communication channel, and status. In this illustration the user selected h-mail from FIG. 74 to contact Betty Howell and the last line entry shows it was sent.

Figure 76:
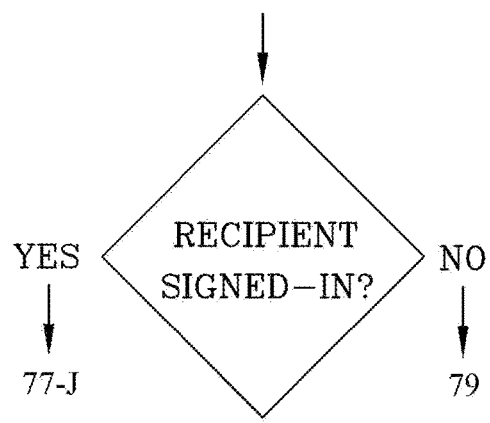
FIG. 76 illustrates an example of a communication log stored on the network server of a smartphone used to attempt a call to Betty Howell.

FIG. 76 shows the communication contact log maintained by the network server 10. The last line lists the order #, the user initiator D #, Betty Howell's recipient D #, the time, type of communication channel selected as phone and it waits for a status entry as the network server 10 determines if Betty Howell is currently signed in to her HIDDIN account.

Figure 77:
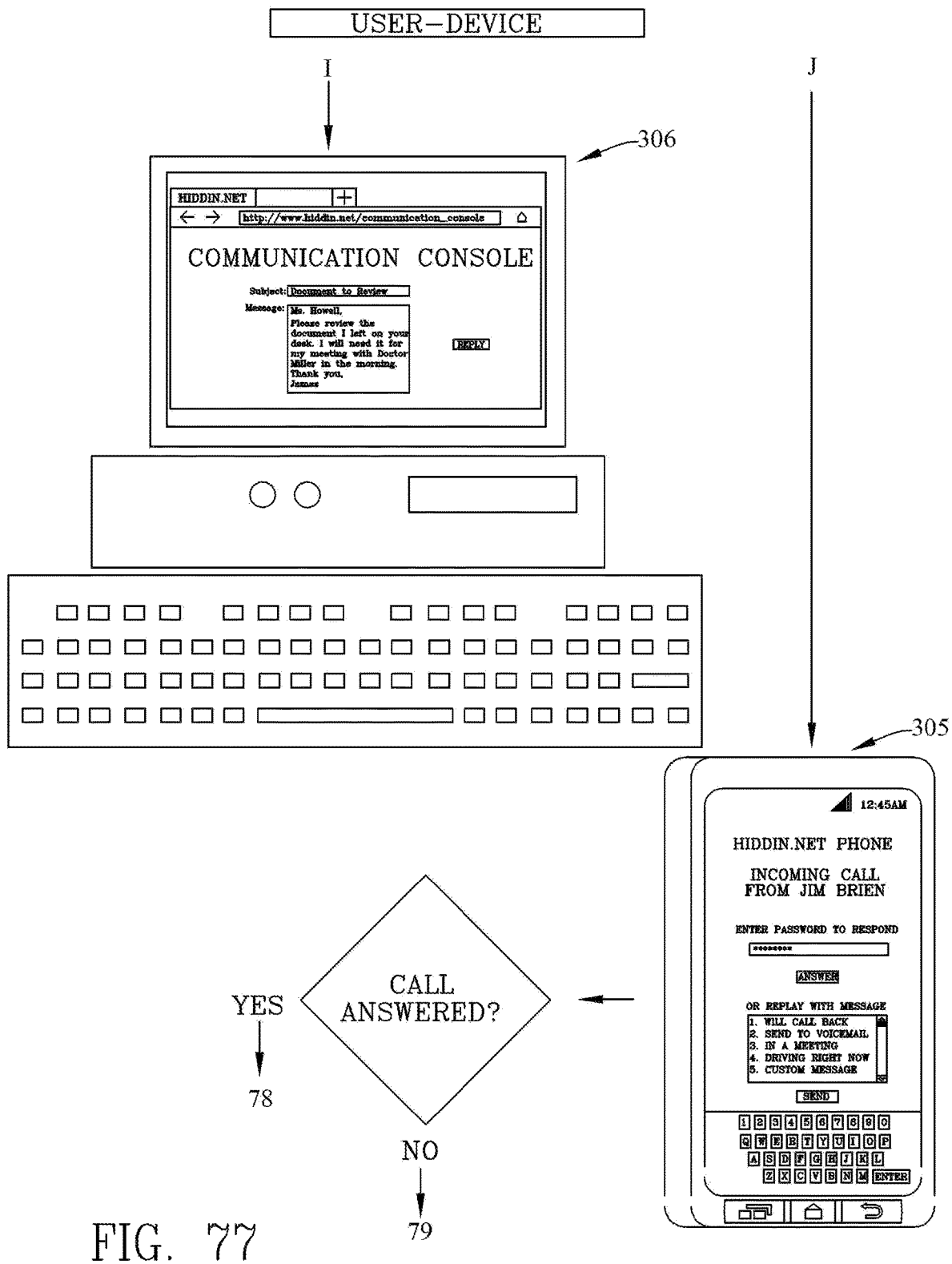
FIG. 77 shows a workstation receiving a message from another workstation or user-device and shows and a logged in user-device receiving a voice call.

FIG. 77 shows Betty Howell reading an e-mail from Jim Brien that was recorded as sent in FIG. 75. FIG. 77 also shows an incoming call from Jim Brien to Betty Howell's smart phone 305 that was logged in the communication contact log shown in FIG. 76.

If the end user, shown as Betty Howell, has their smartphone 305 logged into the HIDDIN network it will ring the smart phone 305 shown in FIG. 77. If the end user does not have their smartphone 305 logged into the HIDDIN network the call will be routed to voicemail and logged, later shown as in FIG. 79. If the call is answered by the end user using their smartphone 305, the call will be connected and logged as hooked 308 in the communication as shown in FIG. 78.

FIG. 79 is an illustration of a voicemail 309 entry in the communication log when an end user of a smartphone 305 does not answer a call from another HIDDIN network end user.

In FIG. 80 shows the process of the network server 10 creating a second server data packet 13 and later perform a table shuffle shown later in FIG. 85. In FIG. 80 also illustrates the network server 10 assembles the second server data packet 13 using data from the old server table 91, the data in the server table label 45, fourth server level value 63, the seventh arithmetic sum 126, and the eighth arithmetic sum 127. To clarify the seventh arithmetic sum 126 is derived from the seventh arithmetic formula 26, and the eighth arithmetic sum 127 is derived from the eighth arithmetic formula 27. After the network server 10 has finished assembles the second server data packet 13, the network server 10 sends the second server data packet 13 and starts the waiting period for a within time response.

Figure 81:
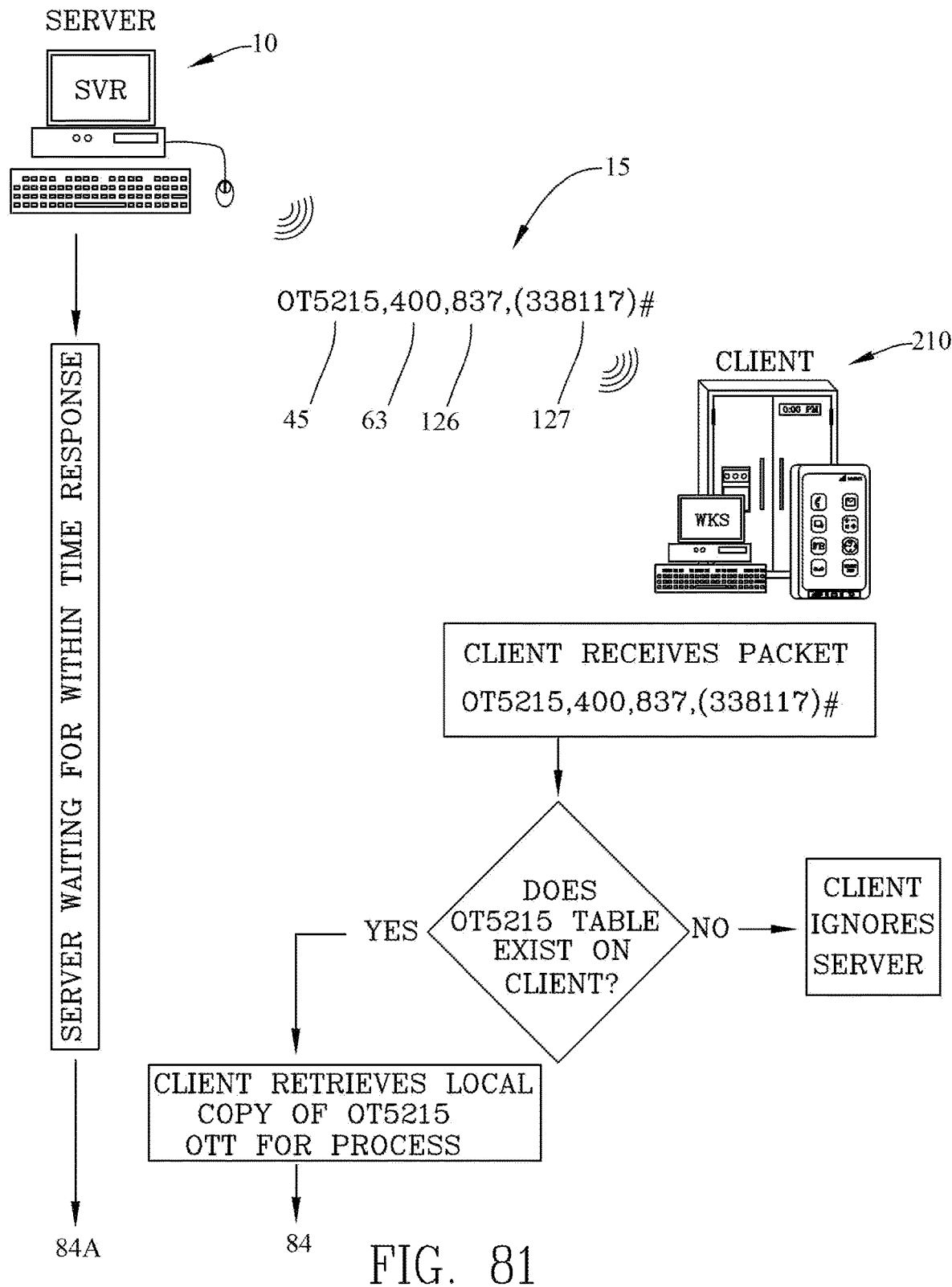
FIG. 81 shows the network server sending the second server packet to the network client, then waiting for a response, and the network client retrieving the local client table label matching the network server table label.

FIG. 81 shows the network server 10 sending the second server data packet 13 to the network client 210 and waiting for expected responses from the network client 210. Once the network client 210 receives the second server data packet 13, the network client 210 determines if an old client table 291 exists for that network server 10. If no old client table 291 exists for the network server 10, the network client 210 ignores further communications with the network server 10. If an old client table 291 exists for that network server 10, the network client 210 retrieves the local copy of the old client table 291 matching that network server 10.

Figure 82:
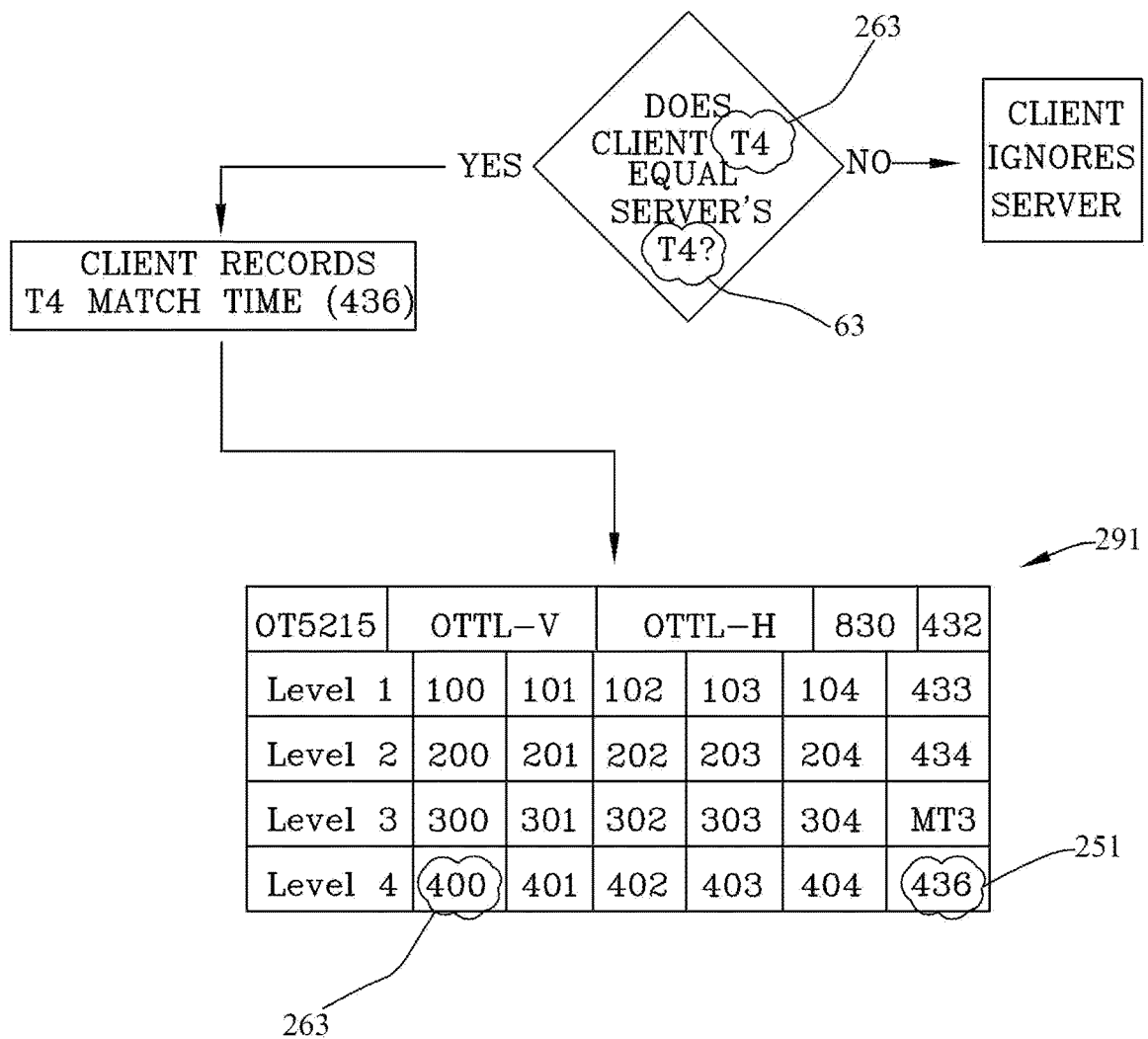
FIG. 82 shows the network client verifying the identity of the network server then the network client records the match time.

In FIG. 82 the network client 210 obtains the fourth server level value 63 from the second server data packet 13 and then determines if the fourth server level value 63 matches the fourth client level value 263. If the fourth server level value 63 does not match the fourth client level value 263, the network client 210 ignores further communication from the network server 10. If the fourth server level value 63 matches the fourth client level value 263 the network client 210 records the current time into the third client match time 250.

Figure 83:
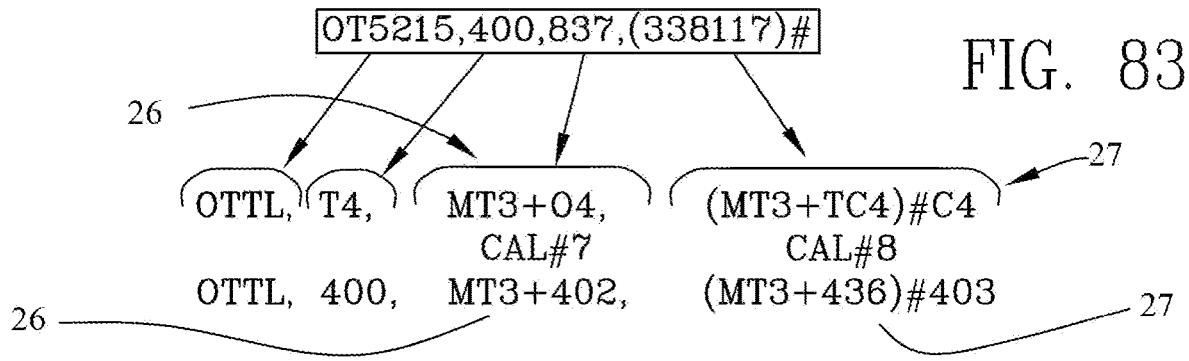
FIG. 83 illustrates the network client using the second server data packet and calculations to update the match time within the local client table.

As shown in FIG. 83, the network client 210 then takes the seventh arithmetic sum 126 found in the second server data packet 13 to ultimately obtain the third server match time 50.

Shown in FIG. 83, the network client 210 finds the third server match time 50 by setting the sum of the seventh arithmetic formula 26 to the sum found in the second server data packet 13. The network client 210 then fills in the seventh arithmetic formula 26 with values from the old client table 291 known to the network client 210 and solving for the third server match time 50 as the variable. After finding the third server match time 50, the network client 210 takes that value and saves it into the third client match time 250 in the old client table 291.

Figure 84:
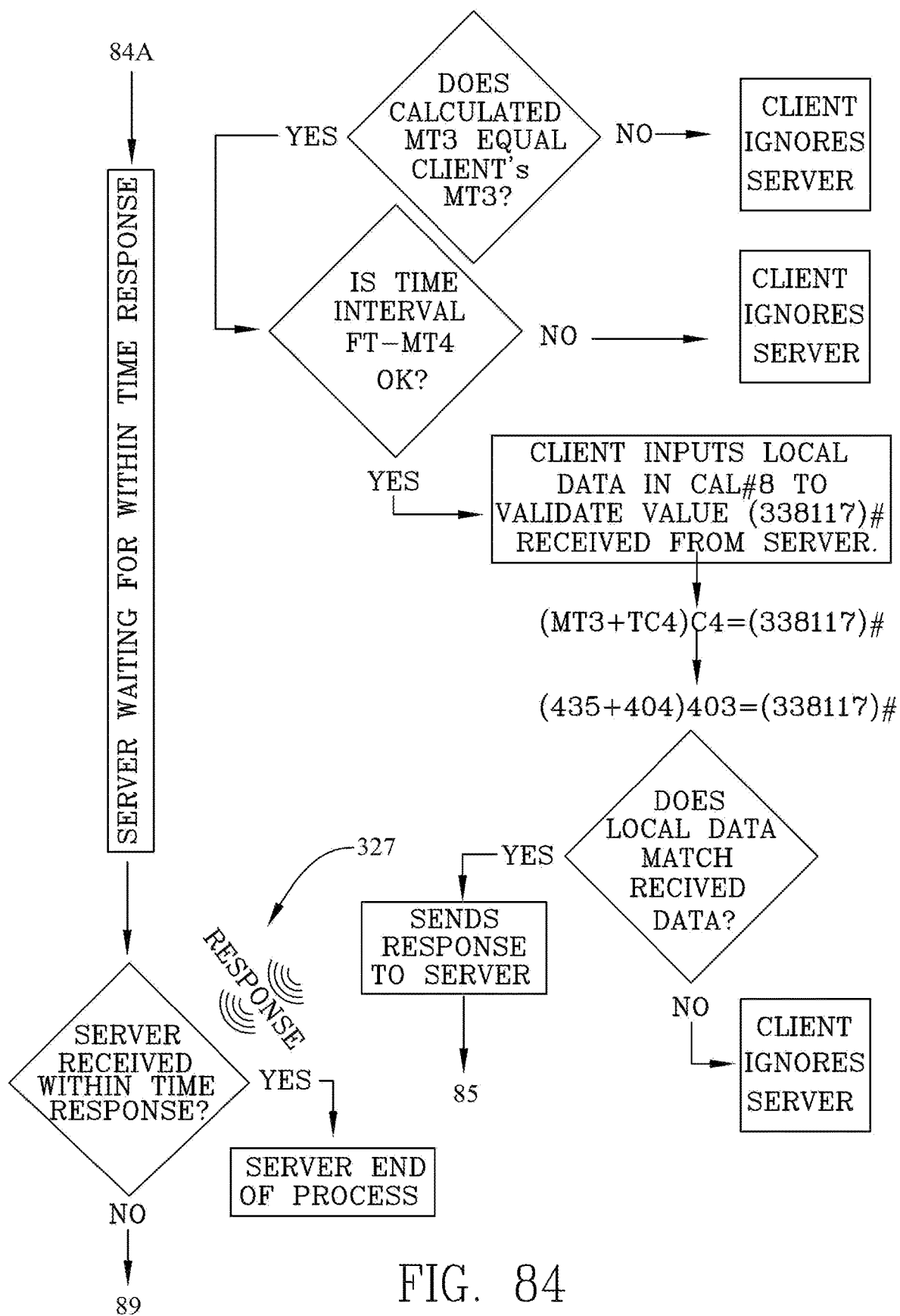
FIG. 84 illustrates the network client computing the expected travel time then verifies the identity of the network server and sending successful response to network server.

Shown in FIG. 84 the network client 210 then verifies that the calculated value of the third server match time 50 is greater than zero. If the calculated value of third server match time 50 is zero, then the network client 210 know an error has occurred and ignores further communications with the network server 10. If the calculated value of the third server match time 50 is greater than zero, the network client 210 then checks the time it took for the second server data packet 13 to leave the network server 10 and arrive to the network client 210 by inserting the client flag time 246 and the newly calculated third client match time 250 into the fourth time interval equation 338. If the network client 210 determines that the second server data packet 13 took longer than expected, the network client 210 ignores further communications with the network server 10. If the network client 210 determines that the second server data packet 15 arrived within the expected time frame, the network client 210 then begins to verify that the network server 10 is truly the network server 10 it says it is. To verify the network server 10, the network client 210 inserts values from the old client table 91 into the eighth arithmetic formula 27 and produces a sum for that equation. If the network client's 210 sum of that equation equals the sum for the eighth arithmetic formula 27 in the second server data packet 13, the network client 210 will send a response 327 to the network server 10. If the network client's 210 sum of that equation does not equal the sum for the eighth arithmetic formula 27 in the second server data packet 13, the network client 210 ignores further communications with the network server 10 and the network server 10 stop waiting and records the time.

Figure 85:
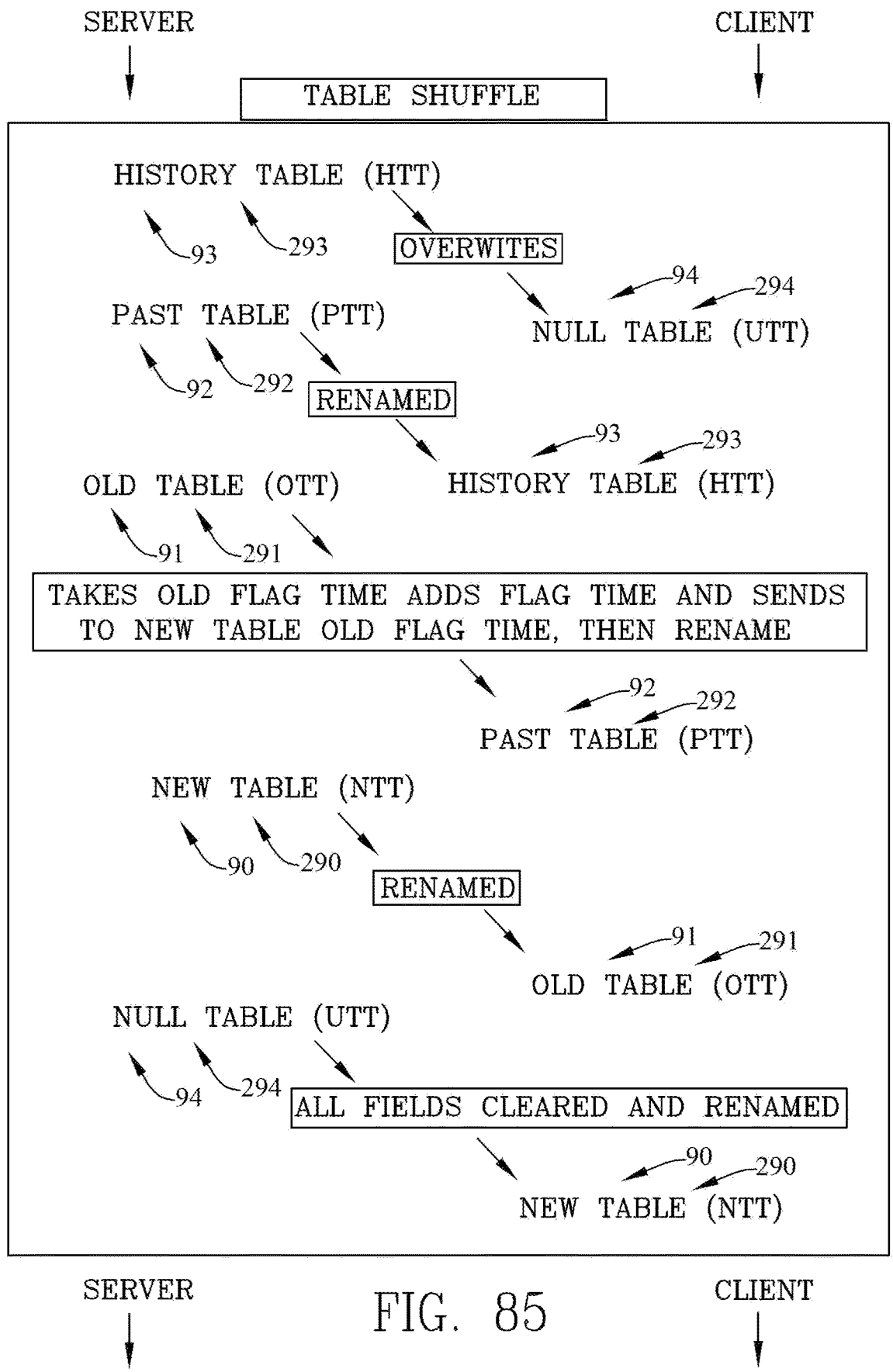
FIG. 85 show the order the network server and network client shuffle tables by renaming history to null, as an example.

FIG. 85 shows the order the network server 10 and network client 210 shuffle tables. The network server 10 renames history table 93 to null server table 94, past server table 92 to history server table 93, old server table 91 to past server table 92, new server table 90 to old server table 91 and null server table 94 to new server table 90. The network client 210 renames history table 293 to null server table 294, past server table 292 to history server table 293, old server table 291 to past server table 292, new server table 290 to old server table 291 and null server table 294 to new server table 290.

Figure 86:
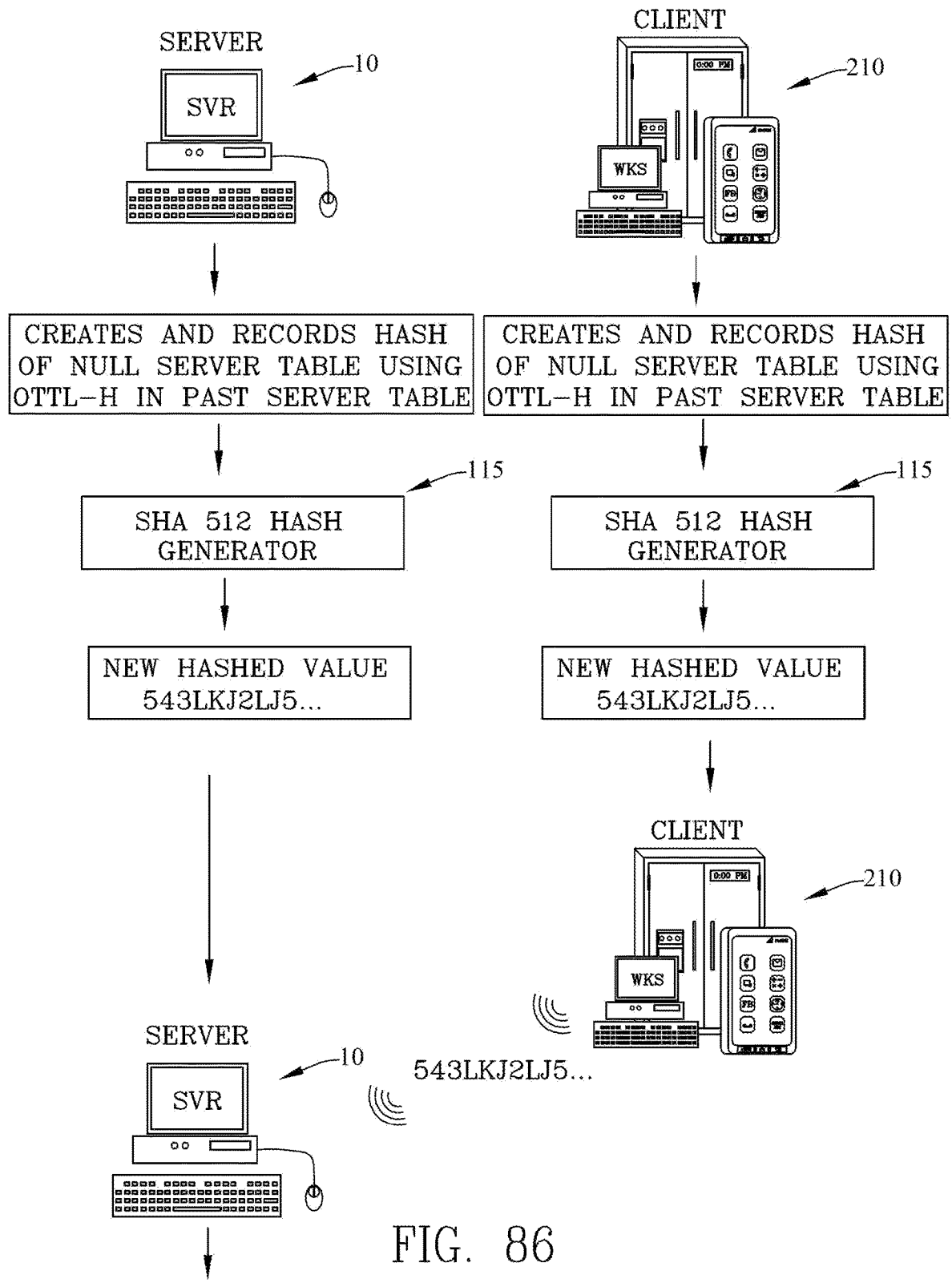
FIG. 86 illustrates the network server and network client hashing the null table similar to FIG. 55 and the network client sending its hash result to the network server.

FIG. 86 illustrates the network server 10 and network client 210 hashing the null server table 94 and null client table 294, respectively, using a hash generator 115. Once the network client 210 has hashed null client table 294 the network client 210 sends the hash of the null client table 294 to the network server 10. Network server 10 failing to receive client response within the expected time interval send failure response 328 to network client 210, best shown in FIG. 87. The network server 10 then sends a time-out packet 113 shown in FIG. 89.

Figure 87:
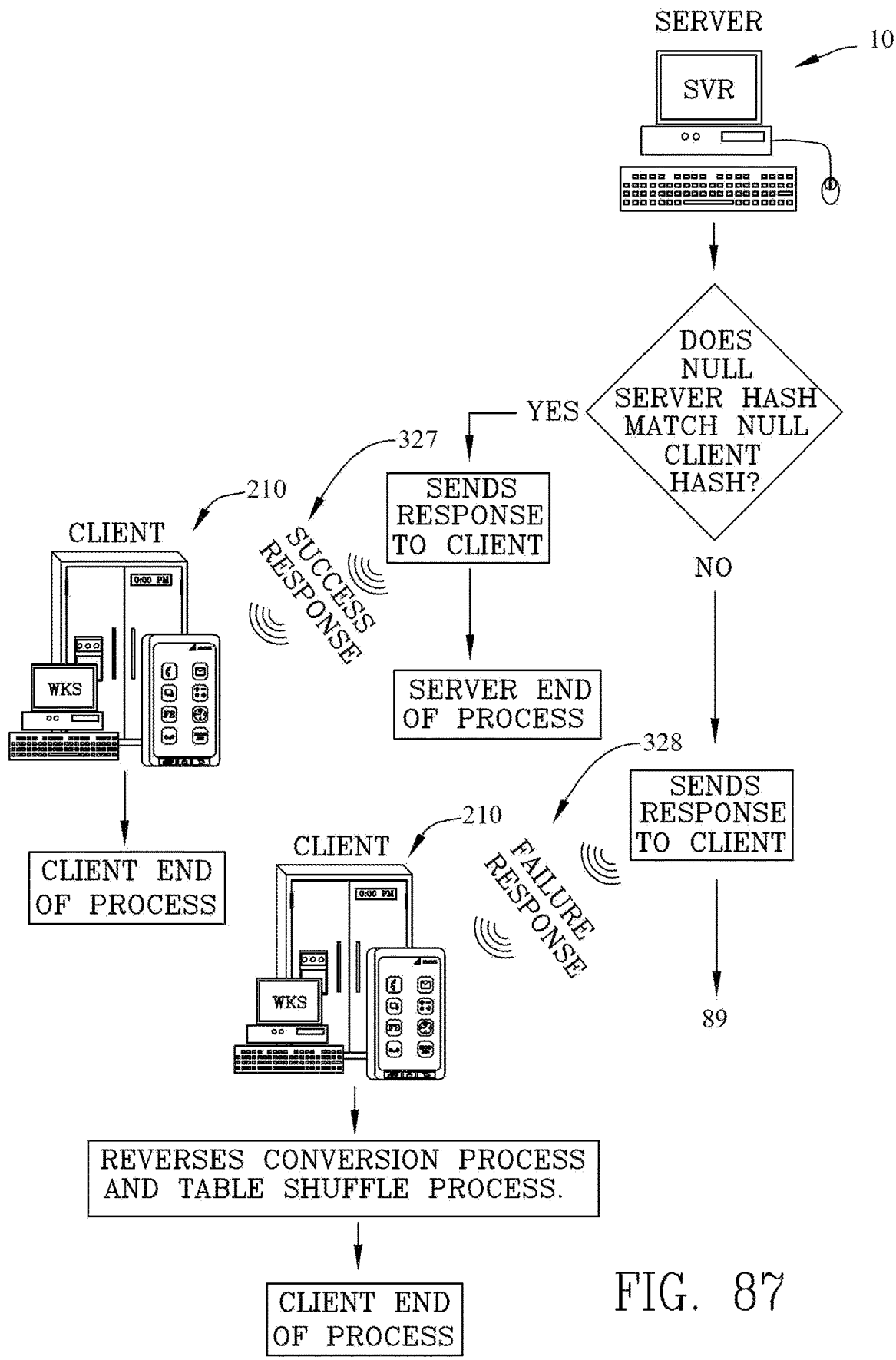
FIG. 87 shows the network server comparing the hash received from the network client to the hash created locally by the network server and sending either a successful or failure response to the network client.

FIG. 87 shows the network server 10 comparing the hash of the null client table 294 received from the network client 210 to the hash the null server table 94 created locally by the network server 10. If the hash of the null client table 294 matches the hash of the null server table 94, the network server sends a success response 327 to the network client 210. If the hash of the null client table 294 does not match the hash of the null server table 94 the network server 10 sends the network client a failure response 328.

Figure 88:
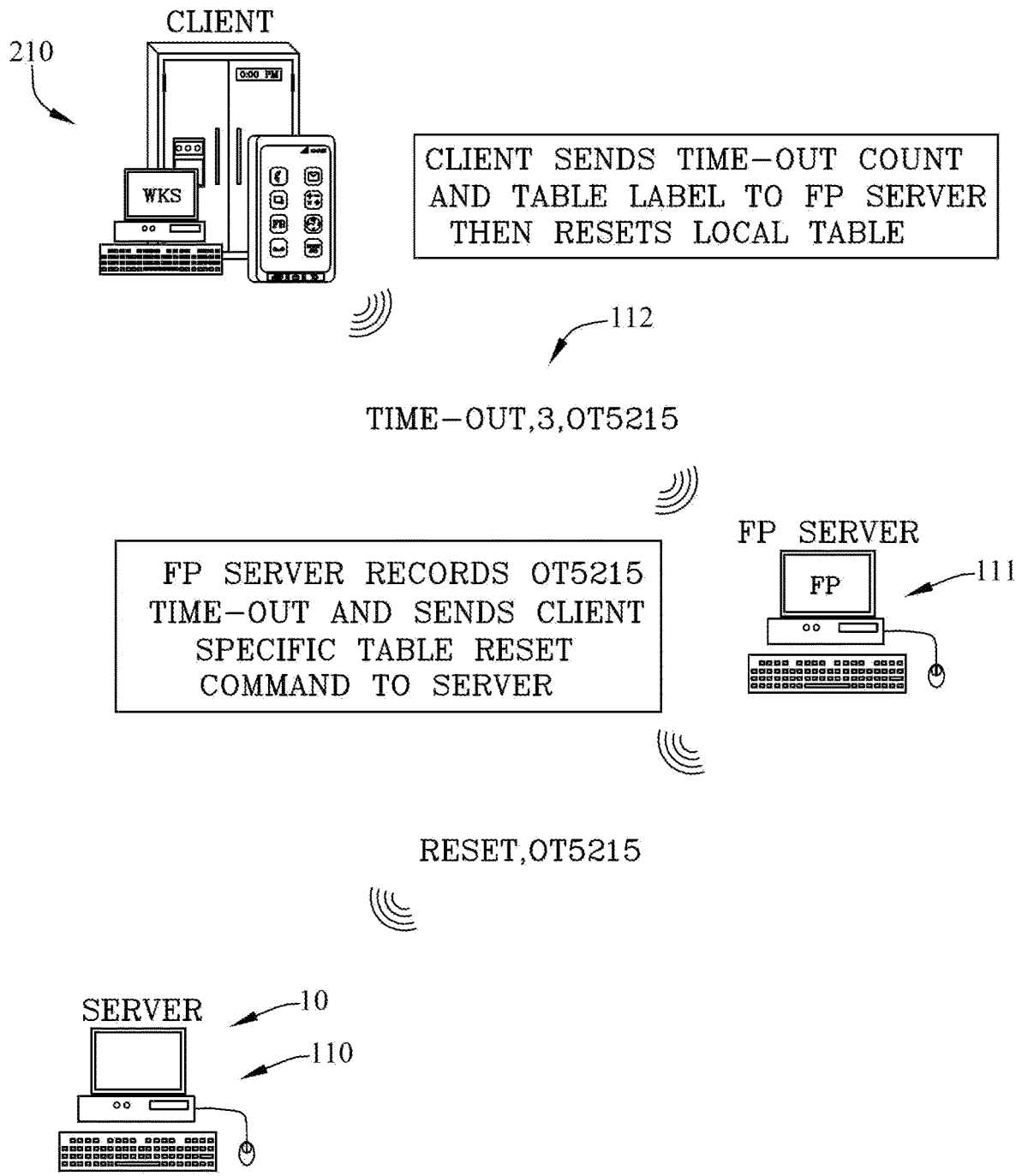
FIG. 88 illustrates the network client sending a time-out packet to a failure server in the event the network server does not respond within allowable time frame and the failure server sending a reset command to the network server.
Figure 89:
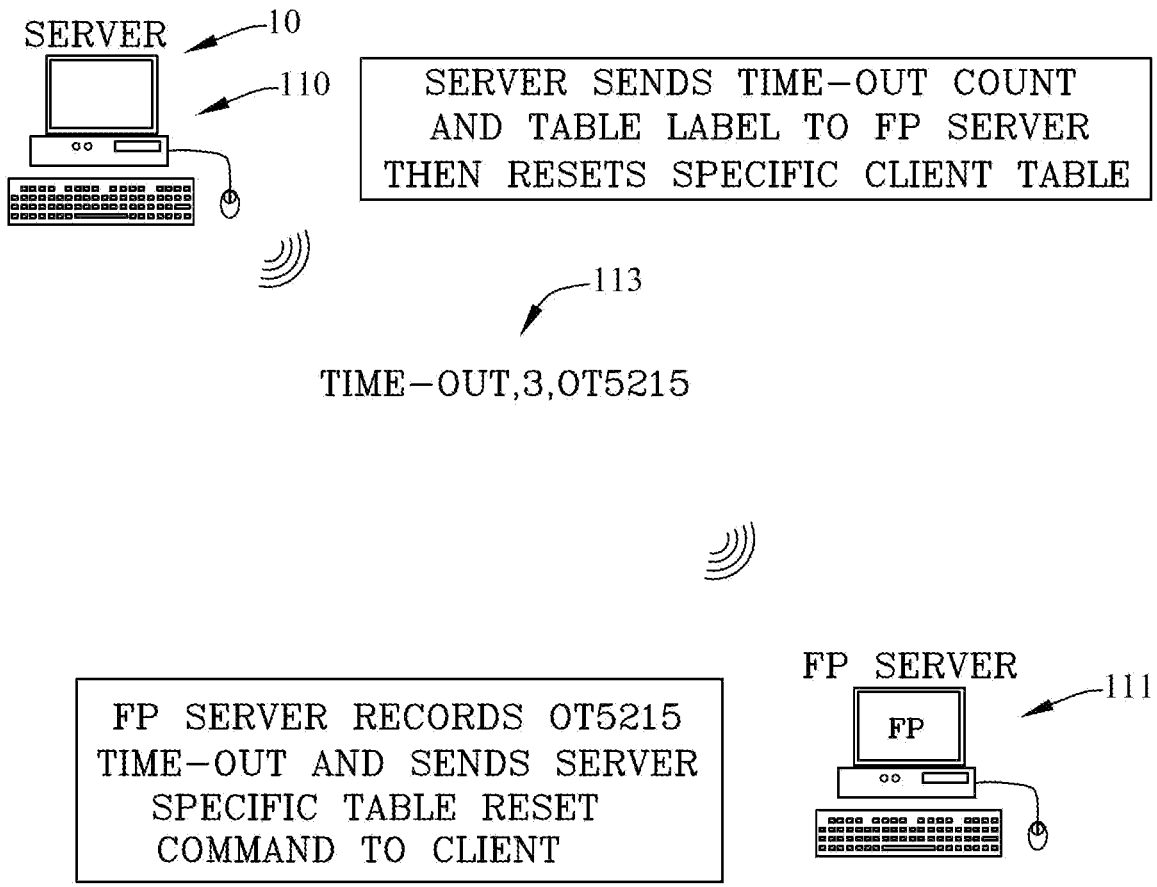
FIG. 89 is similar to FIG. 88 except the network server sends a time-out packet to a failure server in the event the network client does not respond within allowable time frame.

FIG. 88 illustrates the network client 210 sending a time-out packet 112 to a failure server 111 in the event the network server 10 does not respond within allowable time frame and the failure server 111 sending a reset command to the network server 10. FIG. 89 is similar to FIG. 88 except the network server 10 sends a time-out packet 113 to a failure server 111 in the event the network client 210 does not respond within allowable time frame but does not need to reset command to the network server 10.

FIG. 90 shows full hash values that were abbreviated in earlier figures.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A network for secure authentication between network peers, comprising:
   a network server for identifying, authenticating, sending and receiving data from a network client;
   said network client for identifying, authenticating, sending and receiving data from said network server;
   a server table in said network server for storing server table objects;
   said server table objects include a server label group, a server data group and a server time group;
   a client table in said network client for storing client table objects;
   said client table objects include a client label group, a client data group and a client time group;
   said server table objects and said client table objects maintain equivalency;
   a client time sync packet for requesting current time from said network server by said network client;
   a server report time packet containing current time from said network server for updating a client flag time object as session start time in said client time group;
   a first arithmetic formula, a second arithmetic formula, a third arithmetic formula, a fourth arithmetic formula, a fifth arithmetic formula, a sixth arithmetic formula, a seventh arithmetic formula, and an eighth arithmetic formula stored on both said network server and said network client for concealing data;
   said first arithmetic formula and said second arithmetic formula for concealing said network client table objects to be sent within a first client data packet;
   said first client data packet also includes said client table label and a first client level value exposed;
   said network server updates a first server match time in said server time group after matching a valid client table label to a corresponding valid server table label and matching a valid first client level value to a corresponding valid first server level value;
   said network server uses said first client data packet against said server table objects and said first arithmetic formula for deriving and recording said client flag time object into said server flag time object;
   said network server inserts said server table objects into said second arithmetic formula for comparing and validating said first client data packet and the identity of said network client;
   said third arithmetic formula and said fourth arithmetic formula for concealing said network server table objects to be sent within a first server data packet to said network client;
   said first server data packet also includes said server table label and a second server level value exposed;
   said network client updates a second client match time in said client time group after matching a valid said server table label to a corresponding valid client table label and a valid said second server level value to a corresponding valid second client level value;
   said network client uses said first server data packet against said client table objects and said third arithmetic formula for deriving and recording said first server match time into a first client match time;
   said network client inserts said client table objects into said fourth arithmetic formula for comparing and validating said first server data packet and the identity of said network server;
   said fifth arithmetic formula and said sixth arithmetic formula for concealing said client table objects to be sent within a second client data packet;
   said second client data packet also includes said client table label, and a third client table level value exposed;
   said network server updates a third server match time in said server time group after matching a valid client table label to a corresponding valid server table label and a valid said third client level value to a corresponding valid third server level value;
   said network server uses said second client data packet against said server table objects and said fifth arithmetic formula for deriving and recording said second client match time object into a second server match time; and
   said network server inserts said server table objects into said sixth arithmetic formula for comparing and validating said second client data packet and the identity of said network client.

2. A network for secure authentication between network peers as set forth in claim 1, wherein said network server and said network client use said server time group and said client time group, respectively, for determining delays in exchange times indicating possible man in the middle attack.

3. A network for secure authentication between network peers as set forth in claim 1, wherein said network client consist of a home appliance, such as a refrigerator, thermostat, alarm system, surveillance system, or the like.

4. A network for secure authentication between network peers as set forth in claim 1, wherein said second client data packet also includes a first client data to report exposed; and
said first client data to report contains data such as refrigerator temperature, room temperature, alarm system status, surveillance system images, or the like.

5. A network for secure authentication between network peers as set forth in claim 1, wherein said network server contains a new server table, old server table, a past server table, a history server table, and a null server table; and
said network client contains a new client table, an old client table, a past client table, a history client table, and a null client table.

6. A network for secure authentication between network peers as set forth in claim 5, wherein said network server converts said server table objects in said new server table from calculated values in said old server table;
said network client converts said client table objects in said new client table from calculated values in said old client table; and
said network server and said network client use same calculation method for maintaining said server table objects in said new server table and said client table objects in said new client table equivalency.

7. A network for secure authentication between network peers as set forth in claim 6, wherein said second client data packet includes a hashed copy of said client table objects in said new client table to said network server; and
said network server compares said hashed copy of said client table objects in said new client table against a said hashed copy of said server table objects in said new server table for verifying table data equivalence.

8. A network for secure authentication between network peers as set forth in claim 6, wherein said network server renames said history sever table to become said null server table, said past server table to said history sever table, said old server table to become said past server table, said new server table to become said old server table, and said null server table to become said new sever table;
said network client renames said history client table to become said null client table, said past client table to said history client table, said old client table to become said past client table, said new client table to become said old client table, and said null client table to become said new client table;
said network server and said network client rename tables independently;
said network server flushes said server data group and server time group in said new server table after said null server table is renamed to said new server table; and
said network client flush said client data group and client time group in said new client table after said null client table is renamed to said new client table.

9. A network for secure authentication between network peers, comprise:
a network server for identifying, authenticating, sending and receiving encrypted data from a network client;
said network client for identifying, authenticating, sending and receiving encrypted data from said network server;
a plurality of server tables in said network server for storing server table objects;
said server tables include a new server table and an old server table;
said server table objects include a server label group, a server data group and a server time group;
a plurality of client tables in said network client for storing client table objects;
said client tables include a new client table and an old client table;
said client table objects include a client label group, a client data group and a client time group;
said server table objects and said client table objects maintain equivalency;
a plurality of server encryption keys including a first server encryption key a second server encryption key and a third server encryption key used to encrypt and decrypt data;
a plurality of client encryption keys including a first client encryption key a second client encryption key and a third client encryption key used to encrypt and decrypt data;
said server encryption keys and said client encryption keys maintain equivalency;
a plurality of server calculation rules for converting said server table objects in said old server table to alter said server data objects in said mew server table;
a plurality of client calculation rules for converting said client table objects in said old client table to alter said client data objects m said new client table;
said server calculation rules and client calculation rules maintain equivalency;
a client time sync packet for requesting current time from said network server by said network client;
a server report time packet containing current time from said network server for updating a client flag time object as session start time in said client time group;
a first client data packet containing said client table label said client flag time object and a first client level value to said network server exposed;
said network server updates and records a first server match time and said client flag time in said server time group after identifying a valid server table label and a valid first server level value against said client table label and said first client level value sent in said first client data packet;
said network server converts said server table objects values in said new server table from calculated values m said old server table;
said network server hashes and records said server table objects in said new server table;
said first server data packet containing said server table label said first server match time, and a second server level value to said network client exposed;
said network client updates and records a second cheat match time and said first server match time, in said client time group after identifying a valid said client table label and a valid second client level value against said server table label and said second server level value sent in said first server data packet;
said network client converts values in said client table objects in said new client table from calculated values in said old client table;
said network client hashes and records said client table objects values m said new client table;
said second client data packet contains said client table label, said second client match time a third client table level value and a hash copy said client table objects values in said new client table to said network server;

said network client encrypts said client data to report using first client encryption key for transferring said client data to report in said second client data packet;

said network server updates and records a third server match time and said second cent match time in said server time group after identifying a valid said client table label and a valid third client level value against said server table label and said third server level value sent in said second client data packet;

said first server encryption key used to decrypt said client data to report in a second client data packet;

said network server decrypts and records said client data to report sent in said second client data packet with said first server encryption key;

said network server matches hashed values of new server table objects with hashed values of new client tables objects sent in said second client data packet to prove equivalency and readiness for a future transmission;

said network server renames said a history sever table to become said a null server table, said a past server table to said history sever table, said old server table to become said past server table, said new server table to become said old server table, and said null server table to become said new sever table;

said network server flushes said server data group and server time group in said new server table after said null server table is renamed to said new server table to prepare for said next transmission event;

said second server data packet contains said server table label and said server table fourth level value to said network client exposed;

said network client updates and records a fourth client match time and said third server match time in said client in a group after identifying a valid said server table label and a valid fourth server level value against said client table label and said fourth client level value sent in said second server data packet;

said network client renames a history client table to become a null client table, a past client table to said history client table, said old client table to become said past client table, said new client table to become said old client table, and said null client table to become said new client table; and said network client flush said client data group and client time group in said new client table after said null client table is renamed to said new client table to prepare for said next transmission event.

10. A network for secure authentication between network peers as set forth in claim 9, wherein said network server and said network client use said server time group and said client time group, respectively, for determining delays in exchange times indicating possible man in the middle attack.

11. A network for secure authentication between network peers as set forth in claim 9, wherein said network server consists of a primary server for exchange processing and a failure server for rollbacks of failed exchange events.

12. A network for secure authentication between network peers as set forth in claim 9, wherein said network server creates and records matching server tables and client tables for future network clients that will become associated with said network server; and said future network clients obtain said client tables by manufacture installation or by end-user website enrollment for download of said client tables.

13. A network for secure authentication between network peers, comprising:

a network server for identifying, authenticating, sending and receiving encrypted data from a network client;

sad network client for identifying, authenticating, sending and receive encrypted data from said network server;

a plurality of server tables in said network server for storing server table objects;

said server table objects include a server label group, a server data group and a server time group;

a plurality of client tables in said network client for storing client table objects;

said client table objects include a client label group, a client data group and a client time group;

said server table objects and said client table objects maintain equivalency;

a plurality of server encryption keys including a first server encryption key a second server encryption key and a third server encryption key used to encrypt and decrypt data;

a plurality of client encryption keys including a first client encryption key a second client encryption key and a third client encryption key used to encrypt and decrypt data;

said server encryption keys and sail client encryption keys maintain equivalency;

a plurality of calculation rules for converting the values in a old server table into said new server table;

a client time sync packet for requesting current time from said network server by said network client;

a server report time packet containing current time from said network server for updating a client flag time object as session start time in said client time group;

a first arithmetic formula, a second arithmetic formula, a third arithmetic formula, a fourth arithmetic formula, a fifth a arithmetic formula, a sixth arithmetic formula, a seventh arithmetic formula, and an eighth arithmetic formula stored on both said network server and said network client for concealing data;

said first arithmetic formula and said second arithmetic formula for concealing said client table objects to be sent within a first client data packet;

said first client data packet also includes said client table label and a first client level value exposed;

said network server updates and records a first server match time in said server time group after identifying a valid server table label and a valid first server level value against said client table label and said first client level value sent in said first client data packet;

said network server uses said first client data packet against said server table objects and said first arithmetic formula for deriving and recording said client flag time object into said server flag time abject;

said network server inserts said server table objects into said second arithmetic formula for compare and validating said first client data packet and the identity of said network client;

said third arithmetic formula and said fourth arithmetic formula for concealing said network server table objects to be sent within a first server data packet;

said network server takes values of said server table objects in said old server table and deploys a conversion process to generate and record new values of said server table objects in a new server table;

said network server hashes values of said server table objects in new server table and records the resulting value;

said network server deploys a selection process to compile and record a first encryption key for decrypting a client data to report to be sent in a second client data packet;
said network server deploys a selection process to compile and record a second encryption key for establishing encryption protocols for a future transmission;
said first server data packet also includes said server table label and a second server level value;
said network client updates a second client match time in said client time group after identifying a valid said second server level value against said server table label and said second server level value sent in said first server data packet;
said network client uses said first server data packet against said client table objects and said third arithmetic formula for deriving and recording said first server match time into a first client match time;
said network client inserts said client table objects into said fourth arithmetic formula for comparing and validating said first server data packet and the identity of said network server;
said fifth arithmetic formula and said sixth arithmetic formula for concealing said client table objects to be sent within a second client data packet;
said network client takes values of said client table objects in said old client table and deploys a conversion process to generate and record new values of said client table objects in a new client table;
said network client hashes values of said client table objects in new client table and records the resulting value;
said network client deploys a selection process to compile and record a first encryption key for encrypting said client data to report, to be sent in said second client data packet;
said network client deploys a selection process to compile and record a second encryption key for establishing encryption protocols for a future transmission;
said second client data packet includes hash of new client table objects, said client table label, and a third client table level value to said network server exposed;
said second client data packet includes said client data to report encrypted with said first client encryption key;
said network server updates and records a third server match time in said server time group after identifying a valid said client table label and a valid third client level value against said server table label and said third server level value sent in said second client data packet;
said network server uses said second client data packet against said server table objects and said fifth arithmetic formula for deriving and recording said second client match time object into a second server match time;
said network server inserts said server table objects into said fifth arithmetic formula for comparing and validating said second client data packet and the identity of said network client;
said network server decrypts and records said client data to report sent in said second client data packet with said first server encryption key;
said network server matches hash of server table objects with hash of client table objects sent in said second client data packet for proof of equivalency and readiness for a future transmission;
said network server renames a history sever table to become a null server table, a past server table to said history sever table, said old server table to become said past server table, said new server table to become said old server table, and said null server table to become said new sever table;
said network server flushes said server data group and server time group in said new server table after said null server table is renamed to sail new server table to prepare for said next transmission event;
said seventh arithmetic formula and said eighth arithmetic formula for concealing said network server table objects to be sent within a second server data packet;
said second server data packet contains said server table label, and a fourth server level value to said network client exposed;
said network client updates and records a fourth client match time, m said client time group after identifying a valid said client table label and a valid fourth server level value against said server table label and said fourth server level value sent in said second server data packet;
said network client uses said second server data packet against said client table objects and said seventh arithmetic formula for deriving and recording said third server match time into a third client match time;
said network client inserts said client table objects into said eighth arithmetic formula for comparing and validating sail second server data packet and the identity of said network server;
said network client renames a history client table to become a null client table, a past client table to said history client table, said old client table to become said past client table, said new client table to become said old client table, and said null client table to become said new client table; and
said network client flush said client data group and client time group in said new client table after said mull client table is renamed to said new client table to prepare for said next transmission event.

14. A network for secure authentication between network peers as set forth in claim 13, wherein said network server and said network client use said server time group and said client time group, respectively, for determining delays in exchange times indicating possible man in the middle attack.

15. A network for secure authentication between network peers as set forth in claim 13, wherein said network server consists of a primary server for exchange processing and a failure server for rollbacks of failed exchange events.

16. A network for secure authentication between network peers as set forth in claim 13, wherein said network server creates and records matching server tables and client tables for future network clients that will become associated with said network server; and
said future network clients obtain said client tables by manufacture installation or by end-user website enrollment for download of said client tables.

17. A network for secure authentication between network peers, comprising:
a network server for identifying, authenticating, sending and receiving encrypted data from a network client:
said network client for identifying, authenticating, sending and receiving encrypted data from said network server;
a plurality of server tables in said network server for storing server table objects:
said server table objects include a server label group, a server data group, and a server time group;

a plurality of client tables in said network client for storing client table objects;

said client table objects include a client label group, a client data group, and a client time group;

said server table objects and said client table objects maintain equivalency;

a plurality of server encryption keys including a first server encryption key a second server encryption key and a third server encryption key used to encrypt and decrypt data;

a plurality of client encryption keys including a first client encryption key a second client encryption key and a third client encryption key used to encrypt and decrypt data;

said server encryption keys and sail client encryption keys maintain equivalency;

a plurality of calculation rules for converting the values of said server table objects in old server table into the values of said server table objects in said new server table;

a client time sync packet for requesting current time from said network server by said network client;

a server report time packet containing current time from said network server for updating a client flag time object as session start time in said client time group, a first arithmetic formula, a second arithmetic formula, a third arithmetic formula, a fourth arithmetic formula, a fifth arithmetic formula, a sixth arithmetic formula, a seventh arithmetic formula, and an eighth arithmetic formula stored on both said network server and said network client for concealing data;

said first arithmetic formula and said second arithmetic formula for concealing said server table objects to be sent within a first server data packet;

said first server data packet also includes said server table label and a first server level value to said network client exposed;

said network client updates and records a first client match time, in said client time group after identifying a valid client table label and a valid first client level value against said server table label and said first server level value sent in said first server data packet;

said network client uses said first server data packet against said client table objects and said first arithmetic formula for deriving and recording said server flag time object into said client flag time object;

said network client inserts said client table objects into said second arithmetic formula for comparing and validating said first server data packet and the identity of said network server;

said third arithmetic formula and said fourth arithmetic formula for concealing said network client table objects to be sent within a first client data packet;

said network client takes values of said client table objects in said old client table and deploys a conversion process to generate and record new values of said client table objects in a new client table;

said network client hashes values of said client table objects in new client table and records the resulting value;

said network client deploys a selection process to compile and record a first client encryption key for encrypting said client data to report to be sent in said second client data packet;

said network client deploys a selection process to compile and record a second client encryption key for establishing encryption protocols for a future transmission;

said first client data packet also includes said client table label, and a second client level value to said network server exposed;

said network server updates and records a second server match time, in said server time group after identifying a valid said server table label and a valid second server level value against said client table label and said second client level value sent in said first client data packet;

said network server uses said first client data packet against said server table objects and said third arithmetic formula for deriving and recording said first client match time info a first server match time;

said network server inserts said server table objects into said fourth arithmetic formula for comparing and validating said first client data packet and the identity of said network client;

said fifth arithmetic formula and said sixth arithmetic formula for concealing said server table objects to be sent within a second server data packet;

said network server takes values of said server table objects in said old server table and deploys a conversion process to generate and record new values of said server table objects in a new server table;

said network server hashes values of said server table objects m new server table and records the resulting value;

said network server deploys a selection process to compile and record a first server encryption key for decrypting said client data to report to be sent in a second client data packet;

said network server deploys a selection process to compile and record a second server encryption key for establishing encryption protocols for a future transmission;

said second server data packet includes hash of server table objects;

said second server data packet contains said server table label, and a third server table level value to said network client exposed;

said network client updates and records a third client match time in said client time group after identifying a valid said server table label and a valid third server level value against said client table label and said third client level value sent in said second server data packet;

said network client uses said second server data packet against said client table objects and said fifth arithmetic formula for deriving and recording said second server match time object into a second client match time;

sad network client inserts said client table objects into said sixth arithmetic formula for comparing and validating said second server data packet and the identity of said network server, said network client decrypts and records said client data to report sent in said second server data packet with said first client encryption key;

said network client matches hashed values of new client table objects with hashed values of new server tables objects sent in said second server data packet to prove equivalency;

said network client renames a history client table to become a null client table, a past client table to said history client table, said old client table to become said past client table, said new client table to become said old client table, and said null client table to become said new client table;

said network client flush said client data group and client time group in said new client table after said null client table is renamed to said new client table to prepare for said next transmission event;

said seventh arithmetic formula and said eighth arithmetic formula for concealing said network client table objects to be sent within a second client data packet;

said second client data packet contains said client table label, and a fourth client level value to said network server exposed;

said network server updates and records a fourth server match time in said server time group after identifying a valid said server table label and a valid fourth server level value against said client table label and said fourth client level value sent in said second client data packet;

said network server uses said second client data packet against said server table objects and said seventh arithmetic formula for deriving and recording said third server match time into a third server match time;

said network server inserts said server table objects into said eighth arithmetic forma for comparing and validating said second client data packet and the identity of said network client;

said network server renames a history sever table to become a null server table, a past server table to said history sever table, said old server table to become said past server table, said new server table to become said old server table, and said null server table to become said new sever table; and said network server flushes said server data group and server time group in said new server table after said null server table is renamed to sail new server table to prepare for said next transmission event.

18. A network for secure authentication between network peers as set forth in claim 17, wherein said network server and said network client use said server time group and said client time group, respectively, for determining delays in exchange times indicating possible man in the middle attack.

19. A network for secure authentication between network peers as set forth in claim 17, wherein said network server consists of a primary server for exchange processing and a failure server for rollbacks of failed exchange events.

20. A network for secure authentication between network peers as set forth in claim 17, wherein said network server creates and records matching server tables and client tables for future network clients that will become associated with said network server; and said future network clients obtain said client tables by manufacture installation or by end-user website enrollment and download said client tables.

21. A network for secure authentication between network peers as set forth in claim 17, wherein said network client consists of a unidirectional communication device or a bidirectional communication device;

said unidirectional communication device consist of a send-only device, such as a refrigerator, thermostat, alarm system, surveillance system, or the like said bidirectional communication device consist of a send-receive device, such as a refrigerator, thermostat, alarm system, surveillance system, cellular or satellite phone, laptop computer, desktop computer, server computer, smart phone, drone, self-driving car, deep space craft or the like;

said network server facilitates communication between the said bidirectional communication devices wherein all data traffic passes through said network server; and said data traffic consisting of media such as e-mail, video chat, video conferencing, text messages, file transfers, network traffic, phone calls, drone flight instructions, drone video and data collected, self-driving car instructions, self-driving car data collection, deep space navigation commands, deep space video and data collected, or the like.

22. A network for secure authentication between network peers as set forth in claim 17, wherein any combination of said bidirectional communications use said encryption keys generated from said network client table objects and said network server table objects to encrypt and decrypt said bidirectional communications between said network server and said network clients; and said encryption keys uses ever changing encryption keys for bidirectional communications between said network clients and said network server for each transmission.

23. A network for secure authentication between network peers as set forth in claim 17, wherein said network server and network clients use said server time group objects and said client time group objects, respectively, to define the acceptable time intervals between data responses for deterring and detecting possible man-in-the-middle attack.

24. A network for secure authentication between network peers as set forth in claim 17, wherein said bidirectional devise obtains initial said client tables including said client table objects when end user completes a website enrollment process, downloads and installs the App associated with a specific said network server; and said App requires a password, pass code, biometric, or a combination of a password, pass code, biometric as proof of primary end user identity prior to said bidirectional devise communicating with said network server.

\* \* \* \* \*